(12) United States Patent
Uchida

(10) Patent No.: US 7,151,578 B2
(45) Date of Patent: Dec. 19, 2006

(54) TWO-LAYERED CONDUCTIVE FILM HAVING TRANSMITTING AND EXPANDING ELECTRICAL SIGNAL FUNCTIONS

(75) Inventor: Hideki Uchida, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 52 days.

(21) Appl. No.: 10/488,749

(22) PCT Filed: Jul. 4, 2003

(86) PCT No.: PCT/JP03/08566

§ 371 (c)(1),
(2), (4) Date: Mar. 9, 2004

(87) PCT Pub. No.: WO2004/008423

PCT Pub. Date: Jan. 22, 2004

(65) Prior Publication Data

US 2004/0239861 A1    Dec. 2, 2004

(30) Foreign Application Priority Data

Jul. 12, 2002  (JP) ............................. 2002-203979
Jul. 12, 2002  (JP) ............................. 2002-204155

(51) Int. Cl.
*G02F 1/135*   (2006.01)
(52) U.S. Cl. ............................. 349/49; 349/50; 349/51; 349/52; 349/53; 349/41; 349/48; 349/147; 349/45
(58) Field of Classification Search ............. 349/49–53
See application file for complete search history.

(56) References Cited

U.S. PATENT DOCUMENTS 2,818,531 A  * 12/1957  Peek, Jr. ..................... 56/320.2
3,235,938 A  *  2/1966  Greene ......................... 445/24
4,255,474 A     3/1981  Smith, Jr.
4,695,856 A  *  9/1987  Warabisako et al. .......... 257/49
5,715,026 A  *  2/1998  Shannon ....................... 349/49

FOREIGN PATENT DOCUMENTS

| EP | 224243 | 6/1987 |
|----|--------|--------|
| JP | 62-131225 | 6/1987 |
| JP | 63-017430 | 1/1988 |
| JP | 2002-139743 | 5/2002 |

OTHER PUBLICATIONS

"Handbook of Optical/Electronic Functional Organic Material", edited by Kazuyuki Horie, published Oct. 15, 1997 (second edition) by Kabushiki Kaisha Asakurashoten, pp. 91-93 and partial English translation.
Supplementary European Search Report dated Nov. 10, 2005.

* cited by examiner

*Primary Examiner*—Andrew Schechter
*Assistant Examiner*—Lucy Chien
(74) *Attorney, Agent, or Firm*—Nixon & Vanderhye P.C.

(57) ABSTRACT

A wiring structure includes: a plurality of linear conductors extending generally parallel to one another; a first input terminal for inputting an electrical signal to a first group of linear conductors selected from among the plurality of linear conductors; and a second input terminal for inputting an electrical signal to a second group of linear conductors, different conductors, selected from among the plurality of linear conductors, the second input terminal being adjacent to the first input terminal. A plurality of the linear conductors are present between the first group of linear conductors and the second group of linear conductors.

21 Claims, 33 Drawing Sheets

1   2   3

TWO-LAYERED CONDUCTIVE FILM HAVING TRANSMITTING AND EXPANDING ELECTRICAL SIGNAL FUNCTIONS This application is the US national phase of international application PCT/JP03/08566 filed 4 Jul. 2003 which designated the U.S. and claims benefit of JP's 2002-203979 and 2002-204155, dated 12 Jul. 2002, respectively, the entire content of each of which is hereby incorporated by reference.

TECHNICAL FIELD

The present invention relates to a wiring structure used for electrode lines, and the like, and to an active device substrate such as an active matrix substrate.

BACKGROUND ART

A display apparatus such as a liquid crystal display apparatus displays an image typically by controlling a display medium such as a liquid crystal material by using a substrate on which a plurality of electrode lines are provided in a stripe pattern or a matrix pattern. Examples of liquid crystal display apparatuses include those of a passive matrix type and those of an active matrix type.

In a passive matrix liquid crystal display apparatus, each pixel is defined by one of column electrodes arranged in a stripe pattern on one substrate and one of row electrodes arranged in a stripe pattern on the other substrate so as to extend perpendicular to the column electrodes, and the optical transmittance of the liquid crystal layer is modulated for each pixel, thereby displaying an image.

Electrode lines including the column electrodes and the row electrodes are produced through the following steps, for example. A transparent conductive film such as an ITO film is deposited on a substrate by a sputtering method, or the like. A photoresist is applied on the transparent conductive film and is prebaked. The photoresist is exposed to UV light via a mask having a stripe pattern. The photoresist is developed, and unnecessary portions thereof are removed. The exposed transparent conductive film is etched, and the remaining photoresist is peeled off.

Next, an active matrix liquid crystal display apparatus using an active matrix substrate will be described. FIG. 39 is a plan view schematically illustrating a conventional active matrix substrate. The active matrix substrate includes a plurality of pixel electrodes arranged in a matrix pattern, and a plurality of active devices associated respectively with the plurality of pixel electrodes for performing a switching control. In a liquid crystal display apparatus using an active matrix substrate, the optical transmittance of the liquid crystal layer between the pixel electrodes of the active matrix substrate and the opposing counter substrate is modulated for each pixel, thereby displaying an image.

The pixel electrodes are formed by patterning, through a photolithography process, an ITO (indium tin oxide) film or a metal film deposited across the entire surface of the substrate. Therefore, some of the metal material, etc., is wasted. In recent years, there is a strong demand for conserving energy and resources in a display device manufacturing process from an environmental point of view. By eliminating patterning processes as much as possible, it is possible to shorten the process for manufacturing a display device, reduce the number of pieces of manufacturing equipment and reduce the floor area required for installing the manufacturing equipment, thereby reducing the cost for the manufacturing process, and to reduce the amount of contaminant or hazardous substance used or produced in the patterning process, thereby achieving a cleaner process.

On the other hand, there are various image resolutions in terms of definition such as VGA (video graphics array) and XGA (extended video graphics array), and the pixel pitch varies for different resolutions. With the conventional process, it is necessary to provide a suitable photolithography mask and an optimal resist material according to the pixel pitch.

Moreover, some display apparatuses use a pixel division method for realizing a gray scale display. In the pixel division method, each electrode is patterned, or divided into portions, according to the gray scale. For example, when each electrode is patterned into two portions with an area ratio of 1:2, only a gray scale of 1:2:3 is realized, and when it is patterned into three portions with an area ratio of 1:2:4, only a gray scale of 1:2:3:4:5:6:7 can be realized. Thus, the pixel division gray scale display is limited by the initial division of each electrode and the area ratio among the portions thereof.

DISCLOSURE OF THE INVENTION

An object of the present invention is to provide a wiring structure capable of accommodating various resolutions and various gray scales. Another object of the present invention is to provide an active device substrate that does not require a patterning process, in other words, a "patterning-free" active device substrate. Still another object of the present invention is to provide an active device substrate capable of accommodating various resolutions and various gray scales.

A wiring structure of the present invention includes: a plurality of linear conductors extending generally parallel to one another; a first input terminal for inputting an electrical signal to a first group of linear conductors selected from among the plurality of linear conductors; and a second input terminal for inputting an electrical signal to a second group of linear conductors, different from the first group of linear conductors, selected from among the plurality of linear conductors, the second input terminal being adjacent to the first input terminal, wherein a plurality of the linear conductors are present between the first group of linear conductors and the second group of linear conductors.

The wiring structure may further include an expansion section provided between the plurality of linear conductors and the first and second input terminals for transmitting the electrical signal from the first input section or the second input section to the first group of linear conductors or the second group of linear conductors while expanding the electrical signal in a width direction.

A width of the first group of linear conductors or the second group of linear conductors may be changed according to a magnitude of the electrical signal input from the first group of linear conductors or the second group of linear conductors.

A display apparatus of the present invention includes: a pair of substrates on each of which the wiring structure of the present invention is formed; and a display medium layer provided between the pair of substrates, wherein the wiring structures formed on the pair of substrates oppose each other so that the plurality of linear conductors of one wiring structure cross the plurality of linear conductors of the other wiring structure.

An active device substrate according to a first aspect of the present invention includes: active devices formed on a substrate; and a conductive film formed over the active devices, wherein the conductive film transmits an electrical signal output from each active device within a finite range.

An active device substrate according to a second aspect of the present invention includes: active devices formed on a substrate; and a conductive film formed over the active devices, wherein the conductive film controls expansion of the electrical signal output from each active device within a predetermined period of time.

An active device substrate according to a third aspect of the present invention includes: active devices formed on a substrate; and a conductive film formed over the active devices, wherein the conductive film is not patterned.

An active device substrate according to a fourth aspect of the present invention includes: active devices formed on a substrate; and a conductive film formed over the active devices, wherein the conductive film controls a range within which an electrical signal output from each active device is transmitted according to a magnitude of the electrical signal.

An active device substrate according to a fifth aspect of the present invention includes: active devices formed on a substrate; and a conductive film formed over the active devices, wherein the conductive film defines a direction in which an electrical signal is transmitted according to an orientational order of a material of the conductive film.

An active device substrate according to a sixth aspect of the present invention includes: active devices formed on a substrate; and a conductive film formed over the active devices, wherein the conductive film has a function of transmitting an electrical signal output from each active device across a predetermined area, and a proportion of an area across which the electrical signal is transmitted with respect to a total area of an upper surface of the conductive film varies depending on an arrangement of the active devices.

The conductive film may have a two-layer structure, including an upper layer and a lower layer, the lower layer having a function of transmitting an electrical signal from each active device to the upper layer, and the upper layer having a function of expanding the electrical signal.

It is preferred that the conductive film comprises at least one material selected from the group consisting of a metal nanoparticle, a metal microparticle, a metal-coated nanoparticle, a conductive polymer, a carbon nanotube and a deoxyribonucleic acid.

An active device substrate according to a seventh aspect of the present invention is one of the active device substrates according to the first to sixth aspects of the present invention, wherein: the active devices are three-terminal devices connected to upper electrode lines and lower electrode lines; and the upper electrode lines and the lower electrode lines each include: a plurality of linear conductors extending generally parallel to one another, a first input terminal for inputting an electrical signal to a first group of linear conductors selected from among the plurality of linear conductors; and a second input terminal for inputting an electrical signal to a second group of linear conductors, different from the first group of linear conductors, selected from among the plurality of linear conductors, the second input terminal being adjacent to the first input terminal, wherein a plurality of the linear conductors are present between the first group of linear conductors and the second group of linear conductors, and wherein the upper electrode lines and the lower electrode lines are arranged so that the plurality of linear conductors of the upper electrode lines cross the plurality of linear conductors of the lower electrode lines.

The active devices may be arranged randomly on the substrate. The active devices may each be a system active device having a switching function and at least one other function.

It is preferred that the active devices each include an elliptical upper electrode terminal connected to the upper electrode lines, an elliptical lower electrode terminal connected to the lower electrode lines, and a main body connected to the upper electrode terminal and the lower electrode terminal; and $d1>d2$, $d3>d4$, $d3>>P1$ and $d4<P2$, where P1 is a pitch of linear conductors of the upper electrode lines, P2 is a pitch of linear conductors of the lower electrode lines, d1 is a length of a long side of the upper electrode terminal, d2 is a length of a short side thereof, d3 is a length of a long side of the lower electrode terminal, and d4 is a length of a short side thereof.

A method for manufacturing the active device substrate according to the seventh aspect of the present invention is a method for manufacturing an active device substrate, wherein the active devices each include an elliptical upper electrode terminal connected to the upper electrode lines, an elliptical lower electrode terminal connected to the lower electrode lines, and a main body connected to the upper electrode terminal and the lower electrode terminal, the method including the steps of: forming the lower electrode lines; forming the lower electrode terminal on the lower electrode lines; forming the upper electrode lines after forming the lower electrode terminal; and forming the upper electrode terminal on the upper electrode lines.

An active functional device of the present invention includes: the active device substrate of the present invention; a counter electrode opposing the active device substrate; and a functional layer provided between the active device substrate and the counter electrode.

The functional layer may be a display function layer. The display function layer may be a light modulating layer or a light emitting layer. The display function layer may be one of a liquid crystal layer, an inorganic or organic electroluminescence layer, a light emitting gas layer, an electrophoretic layer and an electrochromic layer.

A multi-color display apparatus of the present invention includes at least two active functional devices of the present invention stacked on one another, wherein the at least two active functional devices display hues that are different from one another.

Input terminals for inputting electrical signals respectively to the at least two active functional devices may be shifted from one another as viewed from above.

A display module of the present invention includes: the active functional device of the present invention; a control section for driving and controlling the active functional device; and an input terminal connecting the active functional device and the control section with each other. The control section and the input terminal are formed along one edge of the active functional device, or under the active functional device.

The active functional device and the display module of the present invention may be formed by a plurality of printing systems integrated into a single unit.

BEST MODE FOR CARRYING OUT THE INVENTION

Embodiment 1

Figure 1A:
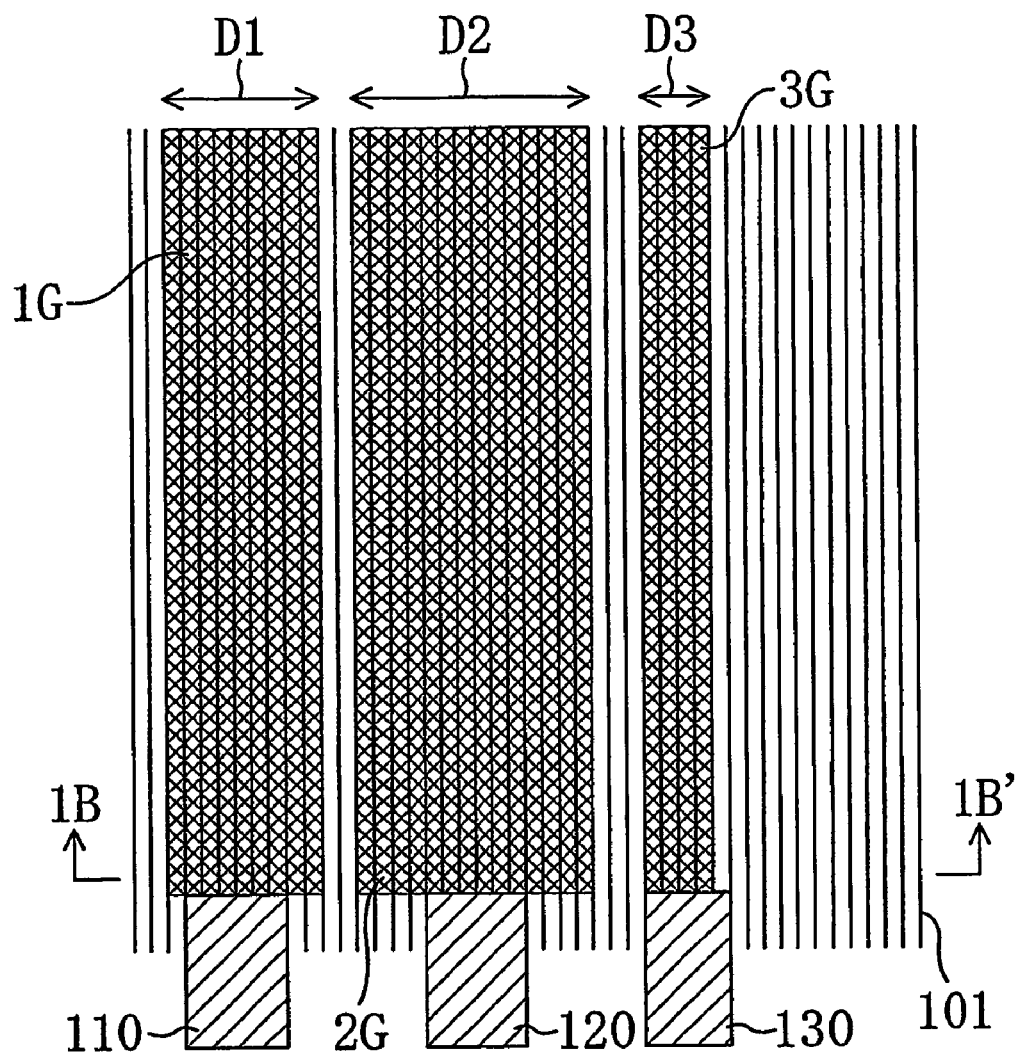
FIG. 1A is a plan view schematically illustrating a wiring structure of Embodiment 1.
Figure 1B:
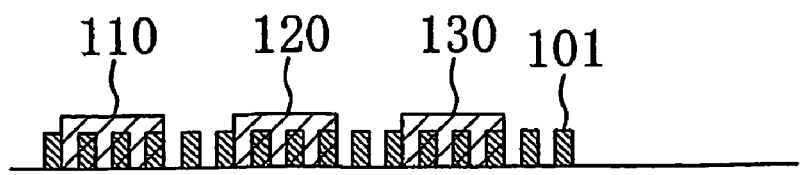
FIG. 1B is a cross-sectional view taken along line 1B–1B' of FIG. 1A.

FIG. 1A is a plan view schematically illustrating a wiring structure of Embodiment 1, and FIG. 1B is a cross-sectional view taken along line 1B–1B' of FIG. 1A. The wiring structure includes at least a first linear conductor group 1G and a second linear conductor group 2G, different from the first linear conductor group 1G. The wiring structure of the present embodiment further includes a third linear conductor group 3G, different from the first linear conductor group 1G and the second linear conductor group 2G. The first linear conductor group 1G, the second linear conductor group 2G and the third linear conductor group 3G each include a plurality of linear conductors 101. No linear conductor 101 belongs to more than one of the first linear conductor group 1G, the second linear conductor group 2G and the third linear conductor group 3G. Some of the linear conductors 101 of the wiring structure do not belong to any of the linear conductor groups. The linear conductors 101 extend generally parallel to one another.

The wiring structure includes at least a first input terminal 110 for inputting an electrical signal to the first linear conductor group 1G, and a second input terminal 120 for inputting an electrical signal to the second linear conductor group 2G. The wiring structure of the present embodiment further includes a third input terminal 130 for inputting an electrical signal to the third linear conductor group 3G.

The linear conductors 101 are each made of a conductive material, and each line of the linear conductor 101 is electrically conductive. Each linear conductor 101 is not in contact with an adjacent linear conductor 101. The interval between adjacent linear conductors 101 is about some tens of nm, and is preferably 10 nm or more and 50 nm or less. The thickness of the linear conductor 101 is about 10 nm or more and is some μm or less.

The width of each of the input terminals 110, 120 and 130 (the dimension thereof in a direction generally perpendicular to the direction in which the linear conductors 101 extend) is significantly larger than the interval between the linear conductors 101. Specifically, the width is 10 μm or more and 100 μm or less, and is 300 μm or less in view of a pixel pitch of 70 ppi. Moreover, the interval between adjacent input terminals is about some μm to some tens of μm.

For example, in a case where the pitch of the input terminals (the sum of the width of an input terminal and the interval between two adjacent input terminals) is 100 μm and the interval between the input terminals is 20 μm, some hundreds of linear conductors 101, which are arranged at intervals of some tens of nm, are present between two adjacent input terminals.

By joining the input terminals 110, 120 and 130 with some linear conductors 101, an electrical signal can be input to the linear conductors 101 that are joined with the input terminals 110, 120 and 130. Moreover, by increasing the magnitude of the electrical signal input to the input terminals 110, 120 and 130, the electrical signal can be input not only to the linear conductors 101 that are joined with the input terminals 110, 120 and 130, but also to other adjacent linear conductors 101. When the linear conductors 101 are arranged at a nano-order pitch, a leak current may occur between adjacent linear conductors 101 depending on the magnitude of the electrical signal. Thus, the total width D1 of a group of linear conductors 101 (the first linear conductor group 1G) to which an electrical signal is input from the first input terminal 110, for example, can be larger than the total width of the group of linear conductors 101 that are joined with the first input terminal 110. In other words, the extent of an input terminal in the width direction is dependent on the magnitude of the input signal to the input terminal, whereby the line width of a linear conductor group can be controlled by adjusting the magnitude of the potential signal to be supplied thereto. Note that the term "width direction" as used herein refers to the direction that is generally perpendicular to the direction in which the linear conductors extend.

Similarly, the total width D2 of the second linear conductor group 2G to which an electrical signal is input from the second input terminal 120, and the total width D3 of the third linear conductor group 3G to which an electrical signal is input from the third input terminal 130, can be adjusted, as necessary, by adjusting the magnitude of the electrical signal to be input to the input terminals 120 and 130, respectively.

Conductive materials that can be used for the linear conductors 101 include metal (nano) particles, metal-coated nanoparticles, conductive polymers, carbon nanotubes, deoxyribonucleic acids, and the like. The conductivity of metal (nano) particles can be increased by arranging the particles so that they are in contact with one another. The conductivity of a conductive polymer, or the like, can be increased by higher-order arrangement and efficient doping.

Next, the process of manufacturing the wiring structure of the present embodiment will be described. First, a plurality of linear conductors 101 are formed on an insulative substrate such as a glass substrate or a plastic substrate. The linear conductors 101 can be formed by arranging material particles in a nano-order or near-nano-order arrangement. Methods for realizing a nano-order or near-nano-order arrangement include a gas deposition method, a laser transfer method, a micromesopic pattern method using an application method, and the like. Moreover, in a case where a conductive polymer is used, a nano-pattern of a conductive polymer can be produced by a nano-line photopolymerization method by irradiating monomers arranged in a high order with laser light.

Figure 2:
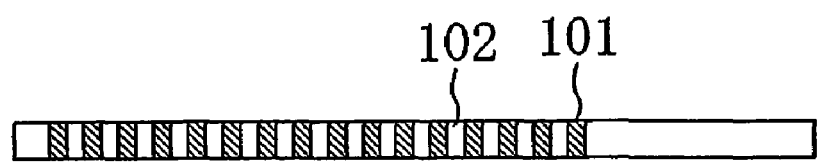
FIG. 2 is a cross-sectional view schematically illustrating linear conductors 101 protected by a binder resin 102.
Figure 3:
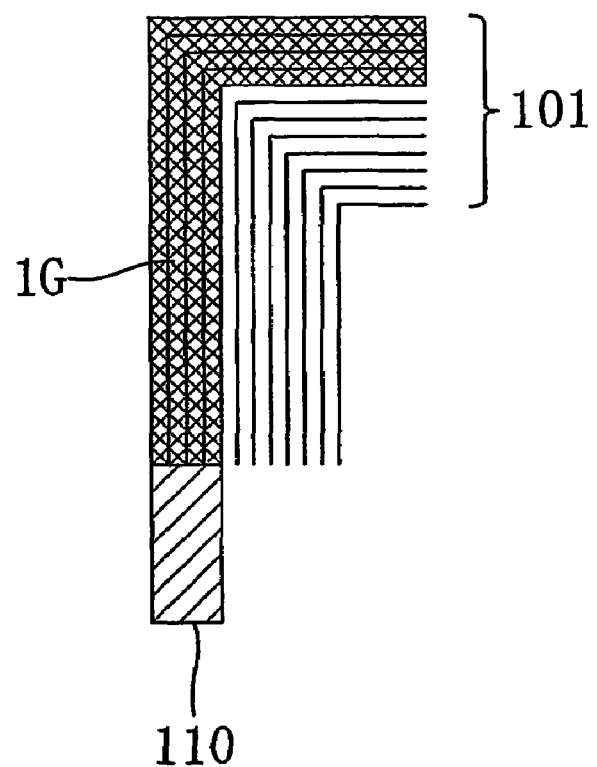
FIG. 3 is a plan view illustrating the linear conductors 101 having a bent or curved pattern.

The linear conductors 101 may be uncovered as illustrated in FIG. 1B, or may be protected by a binder resin 102, or the like, as illustrated in FIG. 2. The binder resin 102 may be formed simultaneously with, before, or after, the formation of the linear conductors 101. Moreover, the linear conductors 101 may be formed not only in a straight pattern, but also in any pattern such as a bent or curved pattern, as illustrated in FIG. 3, with some methods, particularly a laser transfer method. Thus, the first linear conductor group 1G to which an electrical signal is input from the first input terminal 110 can be formed in any pattern.

After forming a plurality of linear conductors 101 on an insulative substrate, input terminals to be joined with the linear conductors 101 are formed. The input terminals joined with the linear conductors 101 connect the terminals of a driver IC (integrated circuit) for driving a display device, or the like, with the linear conductors 101. The terminals of the driver IC may be connected directly with the input terminals, or via terminals of a flexible printed circuit. The input terminals and the terminals of the driver IC or the flexible printed circuit may be electrically connected with each other by thermo-compression bonding via an anisotropic conductive film therebetween.

Figure 4A:
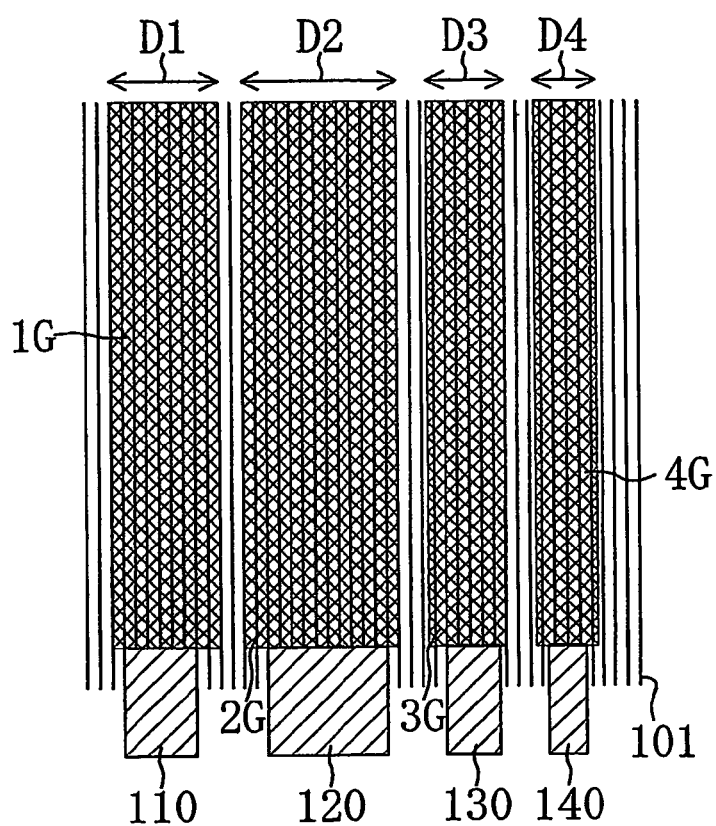
FIG. 4A and FIG. 4B are plan views schematically illustrating the relationship between the width of each input terminal and the width of each group of linear conductors.
Figure 4B:
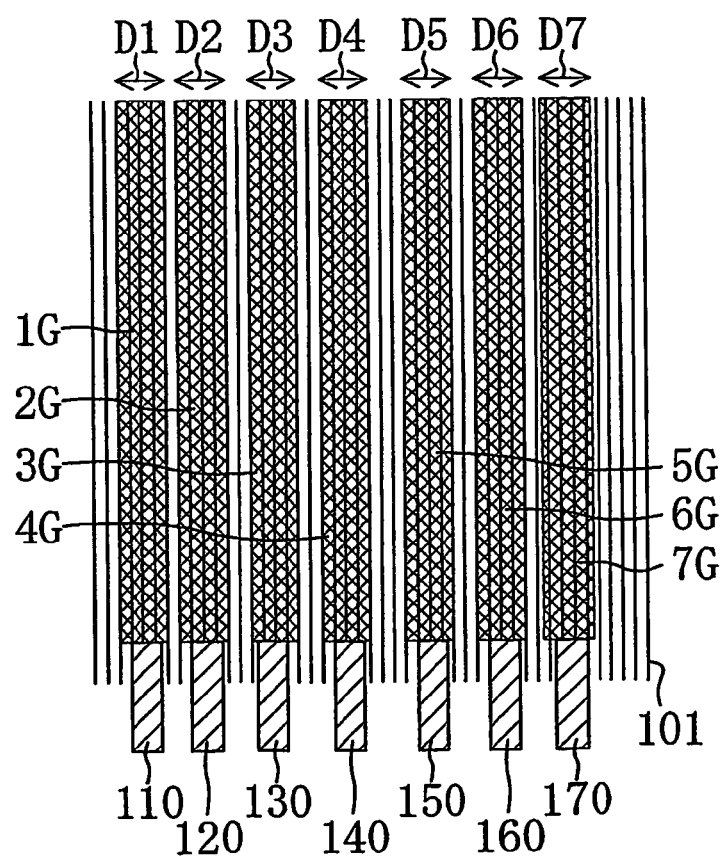

With the wiring structure of the present invention, the width of a linear conductor group, to which an electrical signal is input from an input terminal, can be changed only by changing the width of the input terminal. For example, the widths D1 to D4 of linear conductor groups 1G to 4G can be varied from one another by forming input terminals 110 to 140 having different widths, as illustrated in FIG. 4A. Moreover, the widths D1 to D7 of linear conductor groups 1G to 7G can be reduced, thereby realizing a higher definition, by reducing the widths of input terminals 110 to 170, as illustrated in FIG. 4B.

With the conventional wiring technique, in order to obtain pixel electrodes of a liquid crystal display device, for example, it is necessary to pattern an electrode material such as ITO by a photolithography process according to the definition of the display device. With the wiring structure of the present invention, the width of pixel electrodes can be changed only by changing the width of an input terminal. Therefore, the wiring structure can be commonly used in display devices of various definitions. As a result, with any pattern of an input terminal, e.g., a pattern with a VGA pitch or a pattern with an XGA pitch, the definition can be accommodated. With the conventional process, it is necessary to provide a suitable photolithography mask and an optimal resist material according to the pitch. In contrast, the wiring structure of the present invention can be commonly used for various pitches, and is thus very effective in shortening the process and reducing the cost.

Moreover, the definition can be changed easily. For example, the definition of FIG. 4A can be changed to that of FIG. 4B simply by replacing the input terminals. In the prior art, it is necessary to replace the whole display panel to change the definition of a display device. In contrast, with the wiring structure of the present invention, the definition of the display device can be changed only by replacing the input terminals.

With the wiring structure of the present invention, electrode lines having a constant width can be obtained without a patterning process such as a photolithography process. Moreover, lines of any pitch can be provided simply by adjusting the pitch of the input terminals.

In the present embodiment, the linear conductors are formed in a nano-order or near-nano-order arrangement and the input terminals are formed in a micron-order arrangement. However, the wiring structure of the present invention is not limited to this as long as the pitch of the linear conductors is smaller than that of the input terminals. For example, the linear conductors and the input terminals may both be formed in a nano-order arrangement, or may both be formed in a micron-order arrangement. Thus, either a nano-order pattern or a micron-order pattern may suitably be selected as necessary.

Embodiment 2

Figure 5:
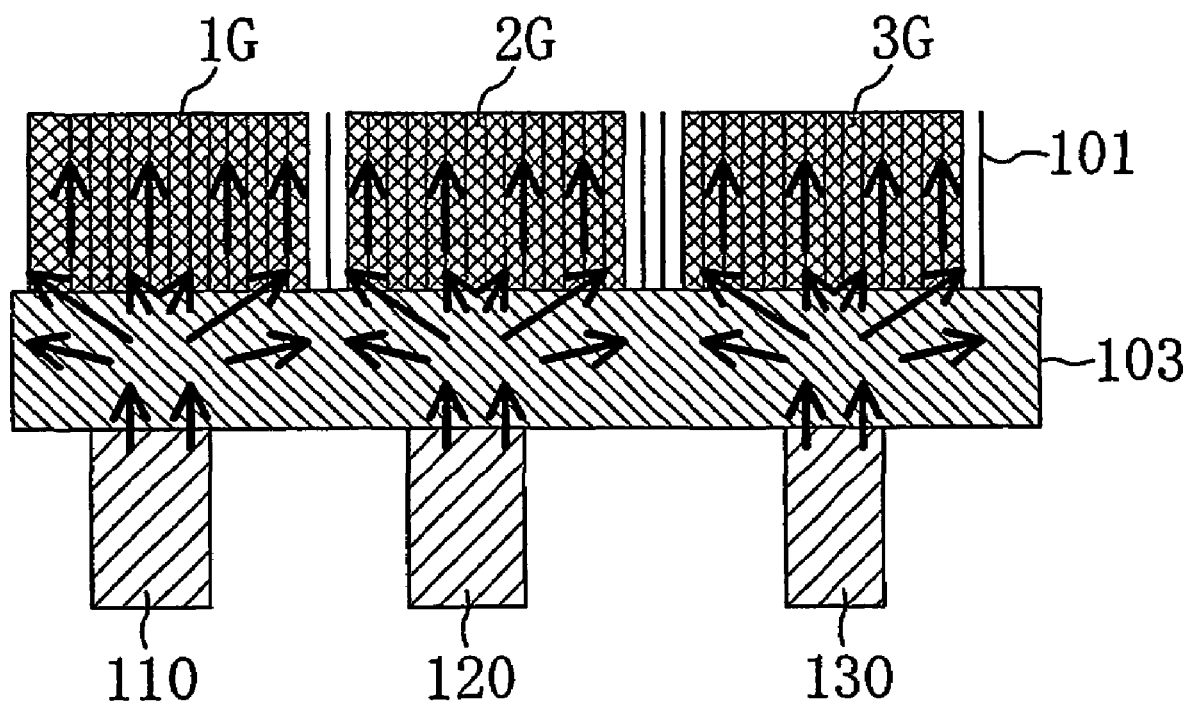
FIG. 5 is an enlarged plan view schematically illustrating a portion of a wiring structure of Embodiment 2 in the vicinity of input terminals.

FIG. 5 is an enlarged plan view schematically illustrating a portion of a wiring structure of Embodiment 2 in the vicinity of input terminals. In Embodiment 2, an expansion section 103 is provided between the linear conductor 101 and the input terminals 110, 120 and 130, in addition to the elements of Embodiment 1. The expansion section 103 is made of a conductive material, and expands the electrical signals input from the input terminals 110, 120 and 130 in a direction generally perpendicular to the direction in which the linear conductors 101 extend. The conductive material of the expansion section 103 may be a metal or any other suitable material with which the expansion of the electrical signal can be controlled. Such materials include metal nanoparticles, metal microparticles, metal-coated nanoparticles, conductive polymers, carbon nanotubes, deoxyribonucleic acids, and composite materials thereof.

The electrical signals input from the input terminals 110, 120 and 130 are passed to the linear conductors 101 while being expanded beyond the widths of the input terminals 110, 120 and 130. Moreover, the expansion of an electrical signal at the expansion section 103 is dependent on the magnitude of the electrical signal input to the input terminals 110, 120 and 130, whereby the widths D1 to D3 of the linear conductor groups 1G to 3G can be changed by the intensities of the electrical signals input to the input terminals 110, 120 and 130, respectively.

For example, some display apparatuses use a pixel division method for realizing a gray scale display. In the pixel division method, each electrode is patterned, or divided into portions, according to the gray scale. For example, when each electrode is patterned into two portions with an area ratio of 1:2, only a gray scale of 1:2:3 is realized, and when it is patterned into three portions with an area ratio of 1:2:4, only a gray scale of 1:2:3:4:5:6:7 can be realized. Thus, the pixel division gray scale display is limited by the initial division of each electrode and the area ratio among the portions thereof With the wiring structure of the present invention, any pixel division gray scale display can be realized since the pixel width can be changed by changing the magnitude of the input electrical signal, as necessary.

Embodiment 3

Figure 6A:
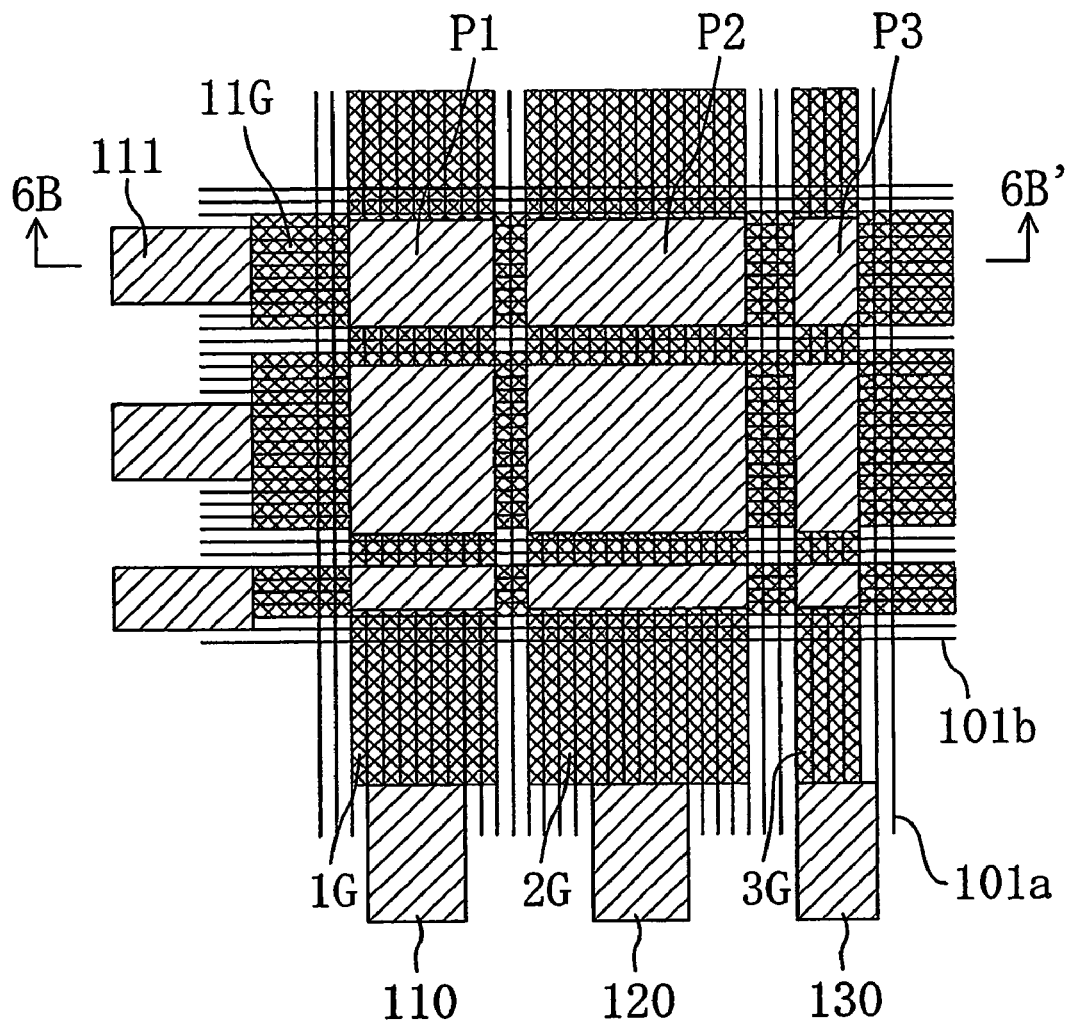
FIG. 6A is a plan view schematically illustrating a display apparatus of Embodiment 3.
Figure 6B:
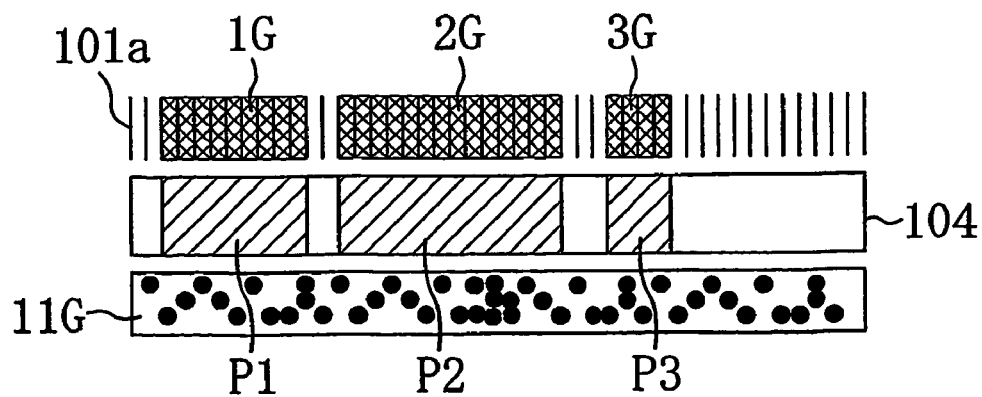
FIG. 6B is a cross-sectional view taken along line 6B–6B' of FIG. 6A.

The wiring structure of the present invention can be used for pixel electrodes of display apparatuses. FIG. 6A is a plan view schematically illustrating a display apparatus of Embodiment 3, and FIG. 6B is a cross-sectional view taken along line 6B–6B' of FIG. 6A.

The display apparatus of the present embodiment includes a pair of substrates on each of which the wiring structure of Embodiment 1 is formed, and a display medium layer 104 provided between the pair of substrates. The pair of substrates are arranged so that the wiring structures formed thereon oppose each other with the linear conductors 101 of one substrate crossing (typically being generally perpendicular to) those of the other substrate.

The display medium layer 104 is a layer whose optical transmittance is modulated by the potential difference between the opposing electrodes, or a layer that itself emits light by a current flowing between the opposing electrodes. Examples of the display medium layer 104 include, but not limited to, a liquid crystal layer, an inorganic or organic light emitting layer, an electrochromic layer, a light emitting gas layer, an electrophoretic layer, and the like. In the present embodiment, a passive matrix liquid crystal display apparatus using a nematic liquid crystal layer will be described.

The liquid crystal display apparatus can be produced through the following steps, for example. First, a polyimide film is provided on a substrate with a wiring structure formed thereon and is subjected to a rubbing treatment for aligning liquid crystal molecules. A pair of substrates are attached to each other via a sealant therebetween so that the linear conductors 101 formed on the substrates cross each other. A nematic liquid crystal material is injected into a gap between the pair of substrates, thereby forming the nematic liquid crystal layer 104. A polarizing plate is provided on one side of each substrate that is away from the liquid crystal layer 104. Thus, the liquid crystal display apparatus is produced.

The linear conductors 101 themselves may be made of a transparent material, or may be made of a non-transparent material having a nano-order shape so as to maintain transparency to visible light. Thus, with the liquid crystal layer 104 interposed between the substrates, a display apparatus of either a transmission type or a reflection type can be provided.

The definition of the liquid crystal display apparatus of the present embodiment can be changed only by changing the size of the input terminals. For example, when the input terminal 110 of a VGA level is connected, the display apparatus becomes a VGA display apparatus. When a terminal of an. XGA level having a higher definition is connected, the display apparatus becomes an XGA display apparatus. Thus, display apparatuses of various definitions can be easily provided only by replacing the terminal section without replacing the entire display apparatus.

With the conventional process, it is necessary to pattern electrodes differently for each definition by performing a photolithography process using a mask suitable for the definition. With the present invention, it is possible to provide a display apparatus at a low cost without requiring such a process. Moreover, when the user wishes to change the definition after using the display apparatus, the user can obtain a display apparatus of a different definition only by replacing the terminal section without having to purchase another display apparatus.

Furthermore, the width of a linear conductor group can be changed by using the expansion section 103 illustrated in Embodiment 2 or by increasing the magnitude of the electrical signal supplied to the input terminals. This can be used to realize a gray scale display, as will be described in greater detail referring to FIG. 6A and FIG. 6B.

Among a plurality of linear conductors 101a extending in the column direction, those that receive an electrical signal from the first input terminal 110 are referred to as the first linear conductor group 1G. Similarly, those of the linear conductors 101a that receive an electrical signal from the second input terminal 120 are referred to as the second linear conductor group 2G, and those that receive an electrical signal from the third input terminal 130 are referred to as the third linear conductor group 3G. On the other hand, among a plurality of linear conductors 101b extending in the row direction, those that receive an electrical signal from a fourth input terminal 111 are referred to as a fourth linear conductor group 11G.

A pixel region is formed at each area where one of column electrodes provided in a stripe pattern intersects with one of row electrodes generally perpendicular to the column electrodes. In the present embodiment, a pixel region is formed in each area where one of the first linear conductor group 1G, the second linear conductor group 2G and the third linear conductor group 3G, which function as column electrodes, intersects with the fourth linear conductor group 11G, which functions as a row electrode. Specifically, a first pixel region P1 is formed in the intersection area between the first linear conductor group 1G and the fourth linear conductor group 11G, a second pixel region P2 is formed in the intersection area between the second linear conductor group 2G and the fourth linear conductor group 11G, and a third pixel region P3 is formed in the intersection area between the third linear conductor group 3G and the fourth linear conductor group 11G.

By controlling one or both of the magnitude of the electrical signal for the row direction and that for the column direction, the size of a pixel can be varied as illustrated in FIG. 6A, whereby each pixel can be divided into portions of any size for gray scale display. This is a very effective gray scale display method that can be used of course with an ordinary nematic liquid crystal display apparatus, and also with a ferroelectric liquid crystal display device in which a pixel basically takes one of only two states, a bright state and a dark state, i.e., an ON state and an OFF state. Thus, with the passive liquid crystal display apparatus using the wiring structure of the present invention, the definition can be changed arbitrarily. Moreover, it is possible to provide, at a low cost, a display device capable of producing a pixel division gray scale display. Particularly, even with a display medium that can only take two, i.e., ON and OFF, states, or a display medium with which it is difficult to produce a gray scale display by controlling the strength of an electric field, it is possible to provide a display device capable of producing a gray scale display by dividing each pixel arbitrarily.

The present embodiment is directed to a liquid crystal display apparatus in which the display medium layer 104 is provided between the opposing electrodes. Alternatively, a passive functional device can be produced by providing a layer of a functional material, other than the display medium layer 104, to replace the display medium layer 104.

Embodiment 4

Figure 7A:
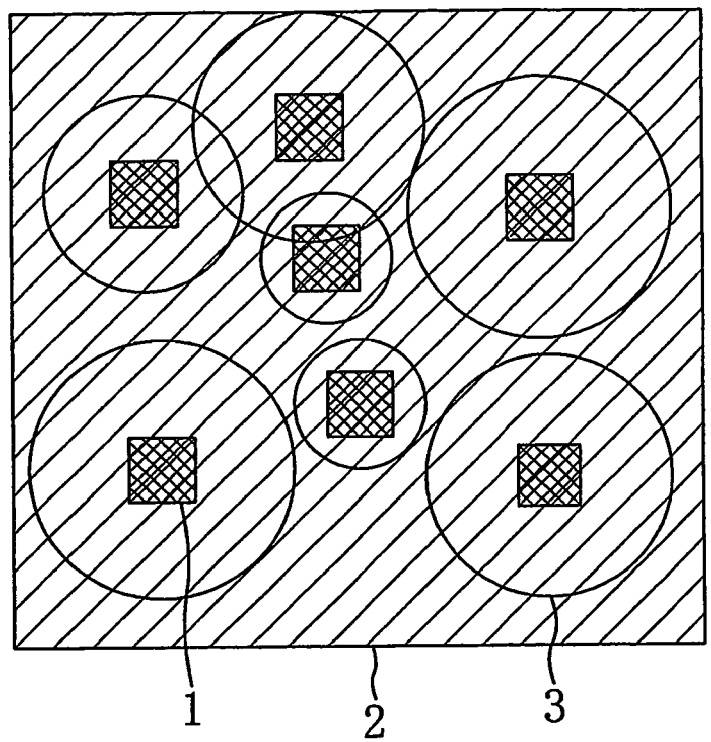
FIG. 7A is a plan view illustrating an active device substrate of Embodiment 4.
Figure 7B:
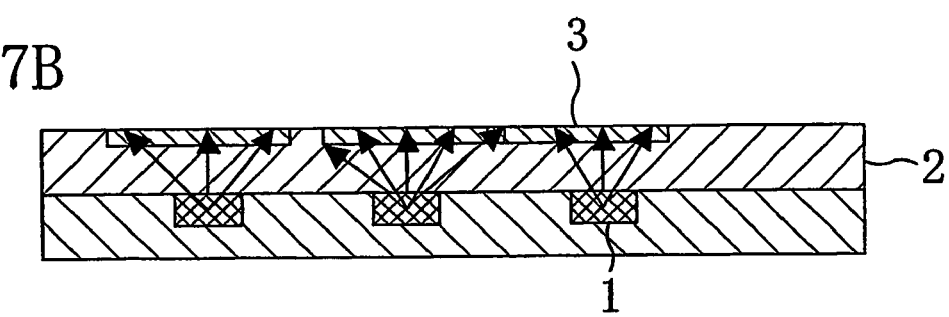
FIG. 7B and FIG. 7C are cross-sectional views thereof.

FIG. 7A is a plan view illustrating an active device substrate of Embodiment 4, and FIG. 7B is a cross-sectional view thereof. The active device substrate of the present embodiment includes active devices 1 formed on a substrate, and a conductive film 2 formed over the active devices 1.

The active device 1 may be a three-terminal device such as a TFT (Thin Film Transistor), or a two-terminal device such as an MIM (Metal Insulator Metal) or a TFD (Thin Film Diode). The active devices 1 are connected to electrode lines (not shown) formed on the substrate. For example, in a case where the active devices 1 are FETs (Field Effect Transistors), a plurality of scanning lines extending in parallel to one another and a plurality of signal lines extending generally perpendicular to the scanning lines are formed on the substrate. The scanning lines are connected to the gate electrodes of the FETs, and the signal lines are connected to the source lines of the FETs. An electrical signal supplied to the active device 1 diffuses and expands through the conductive film 2. The transmission range (expansion) of the electrical signal within a certain period of time can be controlled by controlling the conductivity and the retention (capacity) of the conductive film 2. Hereinafter, the area across which an electrical signal expands from one active device 1 within a certain period of time will be referred to as "a control area 3".

Figure 39:
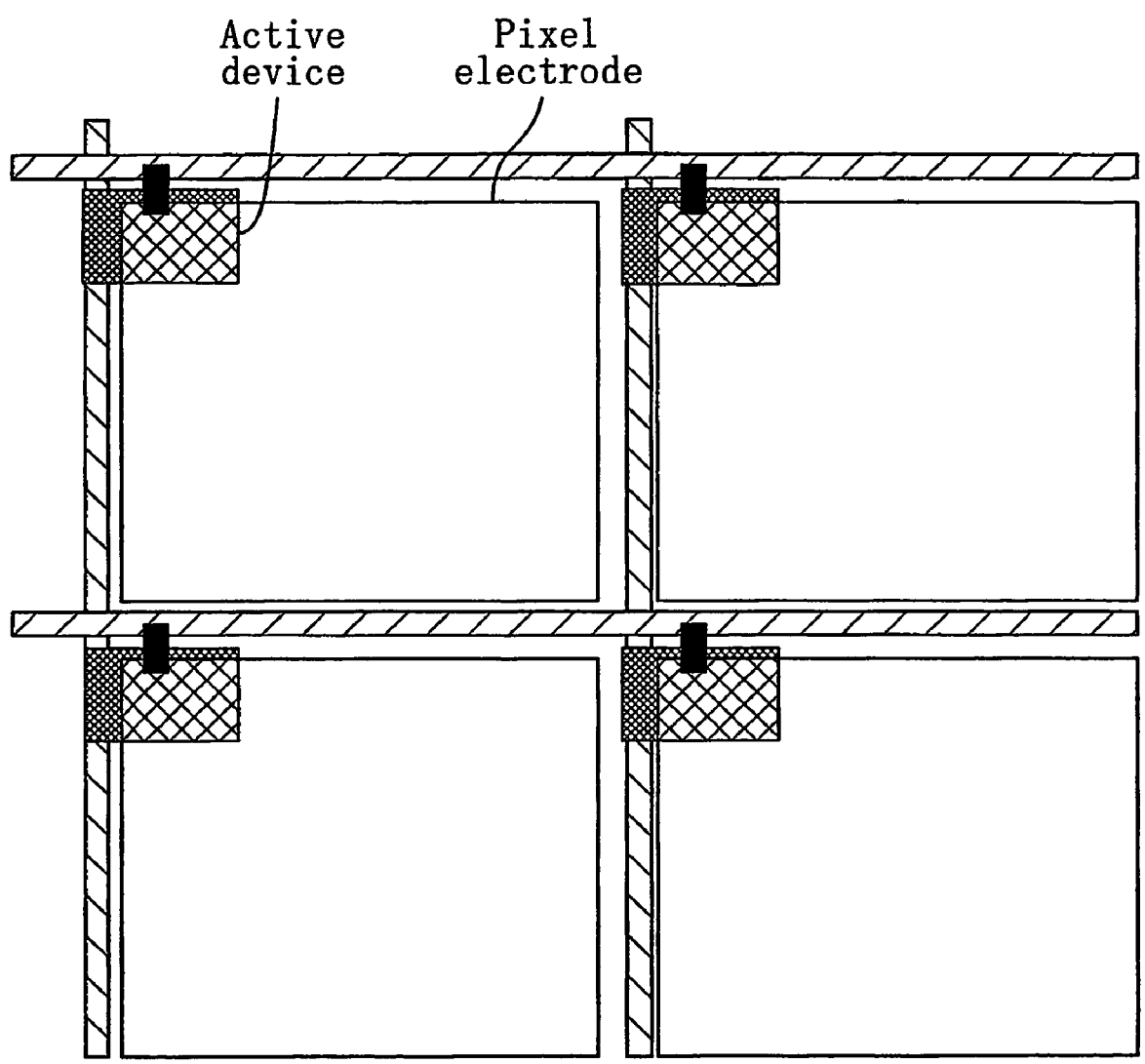
FIG. 39 is a plan view schematically illustrating a conventional active matrix substrate.

In a case where the conductive film 2 is a metal film or a transparent electrode (ITO), even if one attempts to control an electrical signal of a particular area with one active device, the electrical signal from the active device merges with another electrical signal from another adjacent active device because of the high conductivity of the conductive film 2, thereby failing to control an electrical signal of a particular area. Therefore, the conductive film is normally patterned to limit the area of the conductive film to be controlled by one active device, as illustrated in FIG. 39. To do so, it is typical that a metal film is formed across the entire surface and the metal film is then patterned by a photolithography process. Therefore, there are areas on the substrate where the metal film does not exist, i.e., a so-called "voids".

With the active device substrate of the present embodiment, the expansion of an electrical signal from one active device 1 is controlled by controlling the expansion of the electrical signal through the conductive film 2. The materials of the conductive film 2 include metal nanoparticles, metal microparticles, metal-coated nanoparticles, conductive polymers, carbon nanotubes, deoxyribonucleic acids, and composite materials thereof The conductivity of metal (nano or micro) particles can be increased by arranging the particles so that they are in contact with one another. The conductivity of a conductive polymer, or the like, can be increased by higher-order arrangement and efficient doping.

Typically, the magnitude of an electrical charge (electrical signal) attenuates as the charge travels over a greater distance due to the resistance of the conductive film through which the charge travels. With metal nanoparticles, a charge can freely travel across a molecule and between molecules through hopping conduction. If the movement of a charge is represented by an equivalent circuit, it will be a series or parallel combined circuit of the resistance component and the capacitance component. Moreover, when the molecules are arranged orderly or crystallized, a charge can travel freely across the crystal or between molecules, and travel between crystals through hopping conduction. This conduction is isotropic. Note that the general description of how an electrical charge spreads can be found in, for example, Horie and Taniguchi, ed., "Handbook of Optically and Electronically Functional Organic Materials", Asakura Shoten, Tokyo (1995), pp. 91–93.

Metal microparticles may be used while being dispersed in a binder resin, or the like. When metal microparticles are in contact with one another, an ohmic conduction is realized. Moreover, when metal microparticles are dispersed in a binder resin, or the like, a charge may travel through hopping conduction even if adjacent metal microparticles are apart from each other by a minute distance, depending on the resin material surrounding the metal microparticles. Also with metal-coated polymer particles, similar phenomena occur as with metal microparticles. However, since the inside is a polymer, the resistance value thereof is different from that of a metal microparticle of the same diameter. The resistance value of a conductive polymer may be adjusted by adjusting the orientation, the molecular length, or how it is doped. Moreover, it is possible to make the conduction direction anisotropic by adjusting the orientational order.

Conductive polymers exhibit a conductivity within individual molecules through conjugation in the molecules and a conductivity between molecules through hopping conduction. Carbon nanotubes and deoxyribonucleic acids also allow a charge to move around in the molecules, and thus can transmit electrical signals. By using these materials either alone or in combination, the area across which an electrical signal is transmitted is limited, and it is possible to limit the area to be controlled by a single active device. The present invention is not limited to those conductive materials set forth above. A film can be formed from any of these materials by applying a liquid containing the material over the active devices 1. In this way, the area across which an electrical signal from the active device 1 expands can be controlled, and it is not necessary to perform a patterning process. Of course, the method for forming the film is not limited to an application method, but may alternatively be any other suitable method such as a vapor deposition method or a spray method. The thickness of the conductive film 2 is about 10 nm or more and some μm or less.

Figure 7C:
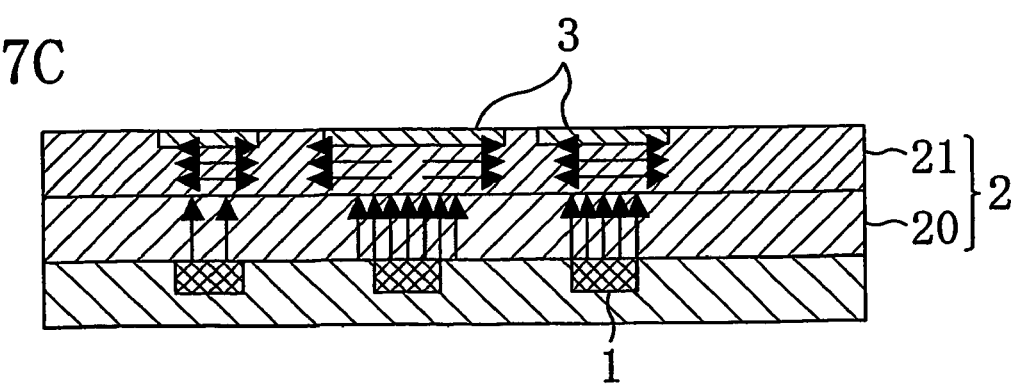

The conductive film 2 illustrated in FIG. 7B is a single layer that directly controls the control area 3 by having the function of transmitting an electrical signal from the active device 1 to the upper surface of the conductive film 2 and the function of suppressing the diffusion of the electrical signal. The conductive film 2 is not limited to this single-layer structure, but may alternatively have a multi-layer structure in which each layer has a different function. For example, the conductive film 2 may have a multi-layer structure including a layer 20 for upwardly transmitting an electrical signal from the active device 1, and another layer 21 for expanding the electrical signal from the layer 20, as illustrated in FIG. 7C.

Figure 8A:
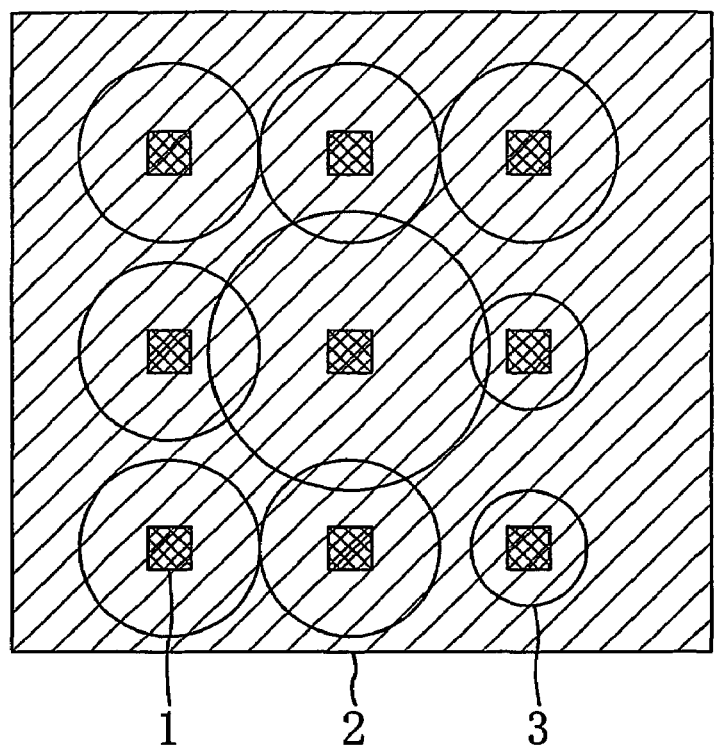
FIG. 8A and FIG. 8B are plan views illustrating control areas 3.
Figure 8B:
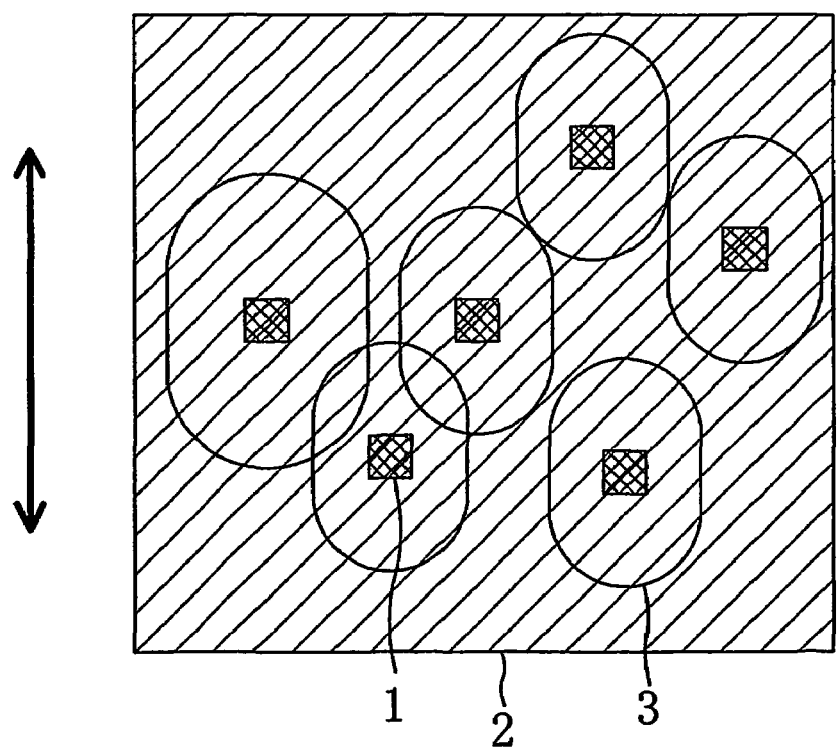

FIG. 8A is a plan view illustrating the control areas 3, which are formed by regularly arranging the active device 1. When the material of the conductive film 2 has no orientational order, or the like, an electrical signal from the active device 1 spreads isotropically from the active device 1 in the plane of the conductive film 2, whereby each control area 3 has a circular shape, as illustrated in FIG. 8A. However, the direction in which an electrical signal is transmitted can be defined by the orientational order, or the like, of the material, particularly when a conductive polymer is used. Therefore, the control area 3 can be formed into other shapes such as an oval shape as illustrated in FIG. 8B. An orientational order can be provided by controlling the direction of application by a rubbing treatment or by using a bar coater.

Thus, an electric device can be formed by transmitting an electrical signal from the active device 1 to a specific area of the conductive film 2, and providing a layer of a functional material on the conductive film 2. In other words, the specific area of the conductive film 2 can function as an electrode for driving the electric device. For example, by forming an organic light emitting layer on the active device substrate of the present invention, and by further providing a counter electrode, it is possible to provide a light emitting device in which the light emission along the plane of the device can be controlled by the active devices. The device can be used not only as a light emitting device but also as a liquid crystal display device or other functional devices by using other functional materials.

Figure 9A:
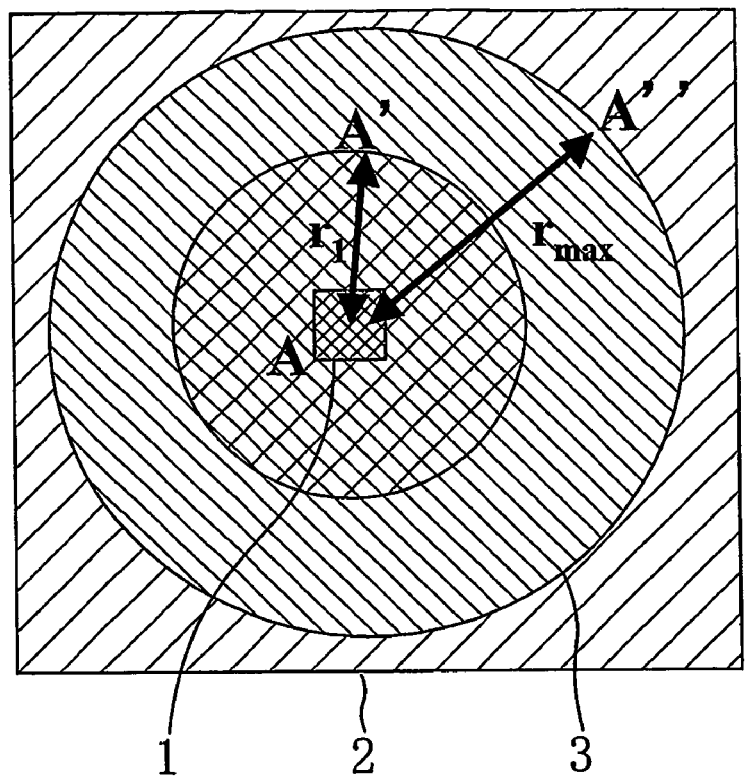
FIG. 9A is a plan view illustrating the relationship between the magnitude of an electrical signal from an active device 1 and the extent of the control area 3.
Figure 9B:
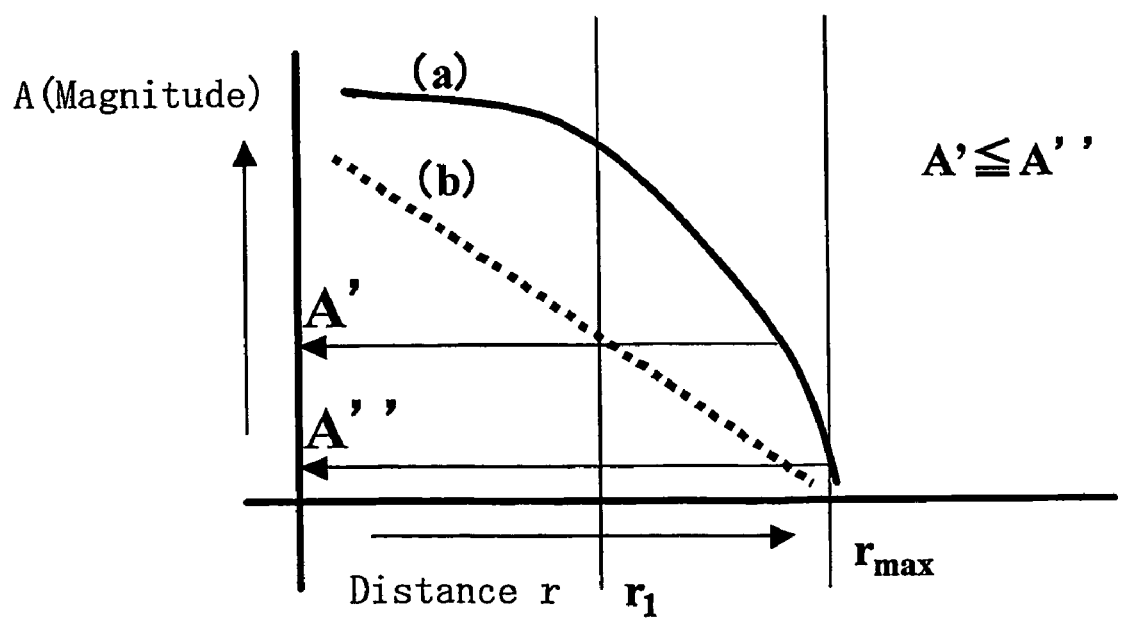
FIG. 9B is a graph illustrating the relationship between the magnitude of an electrical signal and the distance from the active device 1.

The characteristics of the functional material and the control area of the active device 1 will be described. FIG. 9A is a plan view illustrating the relationship between the magnitude of an electrical signal from the active device 1 and the extent of the control area 3 (the distance from the signal output point of the active device 1), and FIG. 9B is a graph illustrating the relationship between the magnitude of the electrical signal and the distance from the active device 1. The "magnitude of an electrical signal" as used herein refers to, for example, a voltage level, an amount of electrical charge, or the like, depending on the type of the electric device.

The charge output from the active device 1 moves through the conductive film 2 by the conduction mechanism as described above. In a case where an electrical signal is transmitted from the active device 1 in a circular pattern, the magnitude of the electrical signal decreases as the distance from the active device 1 increases. In other words, the magnitude of the electrical signal attenuates as the charge travels over a greater distance. How an electrical signal attenuates varies depending on the equivalent circuit or the frequency. For example, referring to FIG. 9B, the signal (a) attenuates along an arc-like line, whereas the signal (b) attenuates along a straight line. This is also dependent on the material used, and on whether a DC power or an AC power is used for the same material. Moreover, for an AC power, the attenuation with a lower frequency is different from that with a higher frequency.

At the distance $r_1$ in FIG. 9B, the signal (a) retains about 80% of the original magnitude, whereas the magnitude of the signal (b) is reduced to one half of the original magnitude. When the conductive film 2 is made up only of a material that exhibits a resistance component in the equivalent circuit, the attenuation is along a straight line as with the signal (b). When a material that exhibits a capacitance component is used in the conductive film 2, the signal attenuates along one of various curves.

Figure 10A:
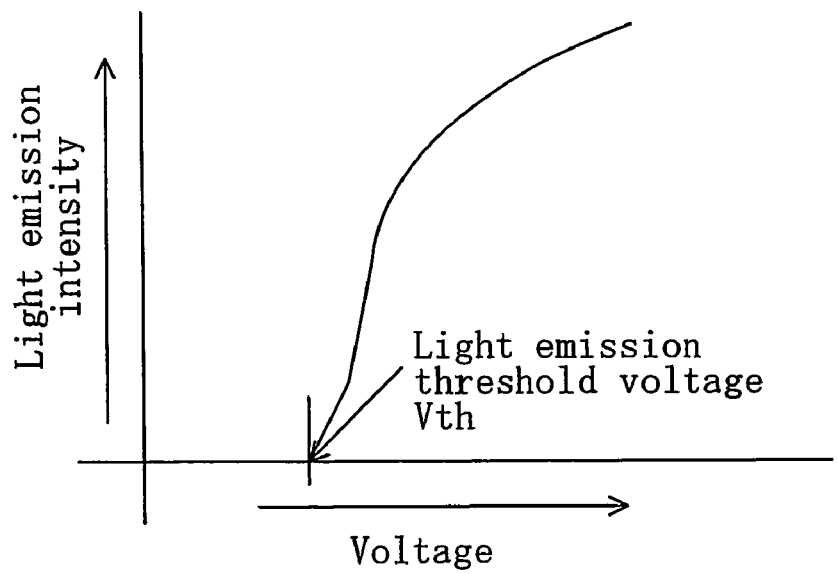
FIG. 10A is a graph illustrating the voltage-luminance characteristics of a light emitting device.

The designation "$r_{max}$" in FIG. 9A and FIG. 9B denotes the maximum distance for which an electrical signal can be transmitted effectively. For example, when an organic electroluminescence device (hereinafter referred to as "organic EL device") is formed on the conductive film 2, the light emitting device has a threshold voltage $V_{th}$ at which the device starts emitting light. FIG. 10A is a graph illustrating the voltage-luminance characteristics of a light emitting device.

Figure 10B:
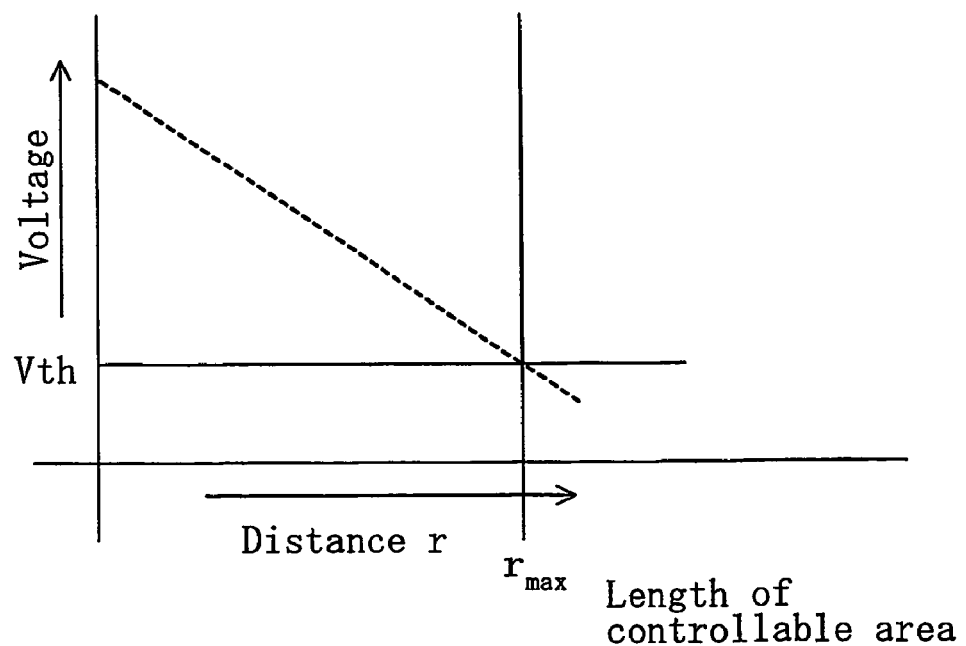
FIG. 10B is a graph illustrating the relationship between the voltage and the distance.

Moreover, the attenuation of a charge (a voltage in the illustrated example) for a distance r from the signal output point of the active device 1 (e.g., a TFT) is along a straight line, as illustrated in FIG. 10B, when a DC voltage is used. The distance $r_{max}$ is a distance at which the voltage attenuates to the threshold voltage $V_{th}$, and the light emitting device cannot emit light past the distance $r_{max}$. In other words, $r_{max}$ is the longest distance of an area that can be controlled by a charge output from the TFT. Thus, $r_{max}$ is the longest distance for which the area can be controlled that is defined by the threshold value of the device to be formed on the conductive film 2. Note that for some organic devices that do not have definite threshold values, $r_{max}$ is the distance at which the device exhibits the minimum characteristic value required.

Figure 11:
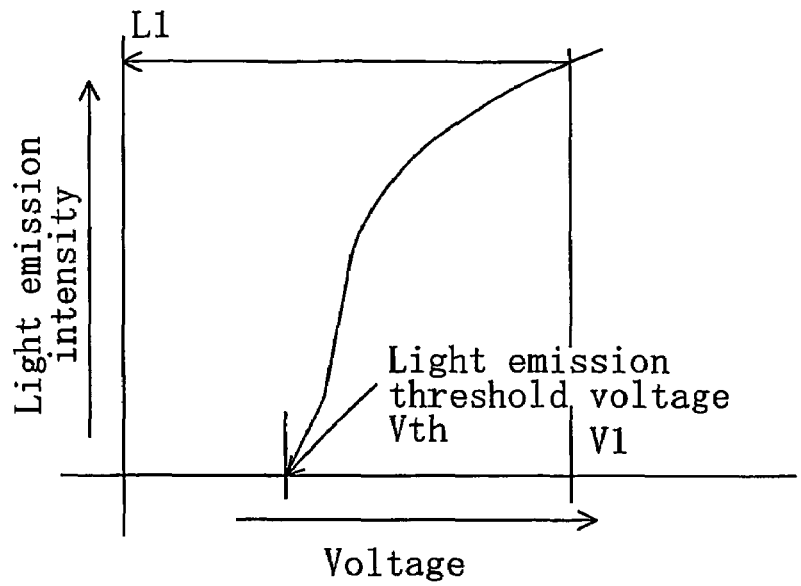
FIG. 11 is a graph illustrating the voltage-luminance characteristics of a light emitting device.
Figure 12A:
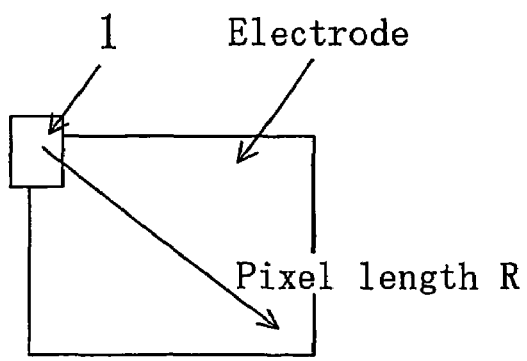
FIG. 12A is a plan view schematically illustrating one pixel of a conventional organic EL device.
Figure 12B:
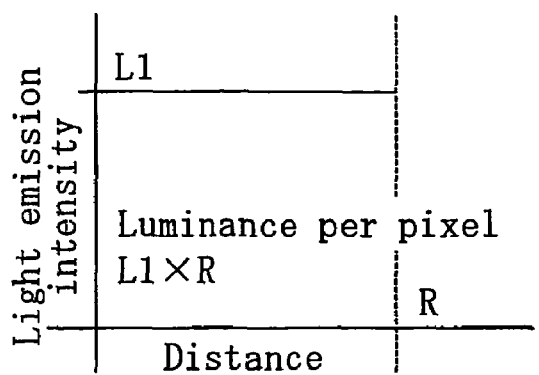
FIG. 12B is a graph illustrating the luminance per pixel.

The device of the present invention and a conventional device will be compared with each other while using an organic EL device as an example. FIG. 11 is a graph illustrating the voltage-luminance characteristics of a light emitting device, where the light emission intensity of the device is L1 when the output (voltage) from the TFT is V1. FIG. 12A is a plan view schematically illustrating one pixel of a conventional organic EL device. The size of one pixel is defined by the size of one transparent electrode formed by patterning an ITO film, or the like. The pixel illustrated in FIG. 12A is rectangular, and the pixel length (the diagonal length of one pixel) is denoted by "R". When the voltage V1 is output from the active device 1, the voltage V1 is applied uniformly across the transparent electrode of one pixel, whereby the luminance is uniform across the pixel irrespective of the distance from the active device 1. Therefore, the luminance per one pixel can be represented by L1*R (strictly speaking, L1 multiplied by the area of one pixel), as illustrated in FIG. 12B.

Figure 13A:
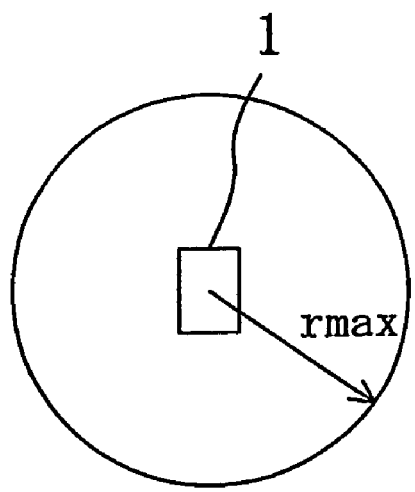
FIG. 13A is a plan view schematically illustrating one pixel of an organic EL device of the present invention.
Figure 13B:
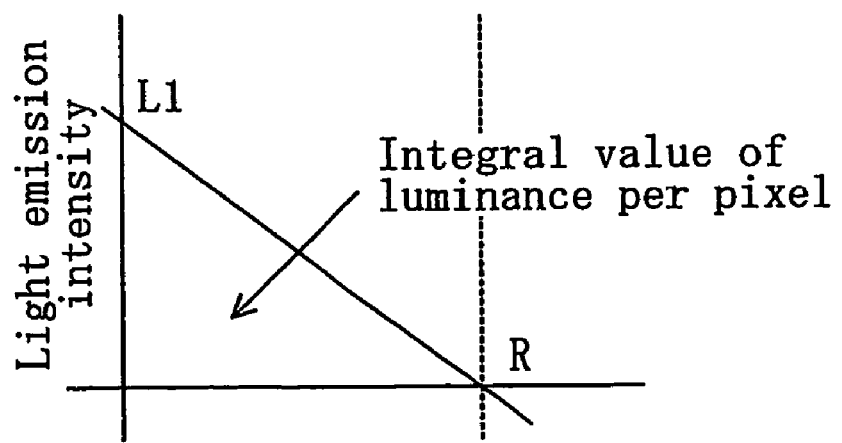
FIG. 13B is a graph illustrating the luminance per pixel.

FIG. 13A is a plan view schematically illustrating one pixel of an organic EL device of the present invention. In the organic EL device of the present invention, each pixel has a circular shape having a radius of $r_{max}$ and being centered at the signal output point of the active device 1. The size of one pixel is defined by the distance $r_{max}$ over which the electrical signal attenuates from the voltage V1 to the threshold voltage $V_{th}$. As illustrated in FIG. 10B, as the distance r from the signal output point of the active device 1 increases, the voltage in the pixel attenuates linearly, whereby the luminance in the pixel also attenuates linearly. Therefore, the lumianance per one pixel can be represented by the integral value obtained by integrating the light emission intensity with the distance up to $r_{max}$ (strictly speaking, the surface integral of the obtained integral value), as illustrated in FIG. 13B.

Thus, the characteristic value of the device, which is formed on the conductive film 4 functioning as an electrode, can be obtained by integration up to $r_{max}$. The characteristic value can be represented not only in terms of the light emission intensity but also in terms of other device characteristics such as the optical transmittance or reflectance of a light modulating device such as a liquid crystal device. Moreover, by changing the amount of output from the TFT, $r_{max}$ changes and the integral value also changes, whereby the characteristic value can be changed according to the output from the TFT.

Figure 14A:
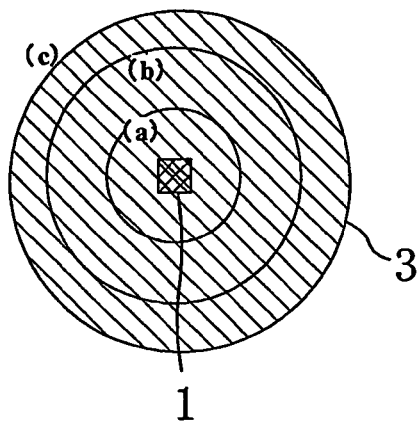
FIG. 14A is a plan view illustrating the relationship between the magnitude of an electrical signal sent to the active device 1 and the extent of the control area 3.

The area across which a functional material can be controlled is defined according to the extent of the control area 3 and the characteristics of the functional material. FIG. 14A is a plan view illustrating the relationship between the magnitude of an electrical signal sent to the active device 1 and the extent of the control area 3, where the magnitudes of the electrical signals (a), (b) and (c) are in the relationship of (a)<(b)<(c). For example, when the electrical signal (a) is sent to the active device 1, the electrical signal is transmitted from the active device 1 across an area whose extent is denoted as "(a)".

Figure 14B:
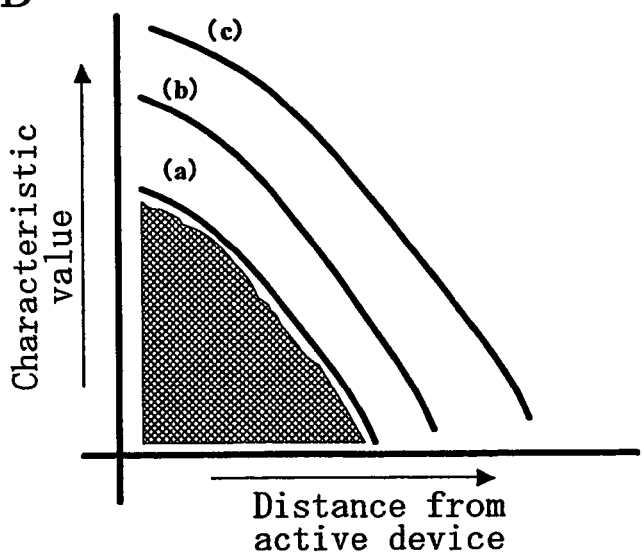
FIG. 14B is a graph illustrating the relationship between the distance from the active device 1 and the characteristic value of a functional material.

FIG. 14B is a graph illustrating the relationship between the distance from the active device 1 and the characteristic value of the functional material. The hatched area of FIG. 14B indicates the integral amount of the characteristic value of the functional material in a case where the electrical signal (a) is sent to the active device 1. As the magnitude of the electrical signal is increased from (a) to (b) and to (c), the area across which the functional material is controlled increases. Then, the characteristic curve also changes, and the integral value also increases.

Figure 14C:
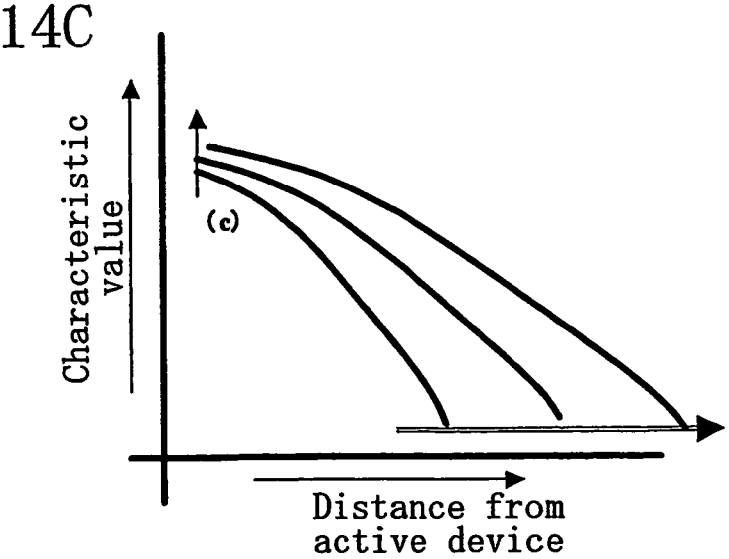
FIG. 14C is a graph illustrating the relationship between the distance from the active device 1 and the characteristic value of the functional material in a case where the magnitude of the electrical signal is increased to such a degree that the characteristic value of the functional material is saturated.

On the other hand, as the magnitude of the electrical signal is increased, the characteristic value of the functional material is saturated. FIG. 14C is a graph illustrating the relationship between the distance from the active device 1 and the characteristic value of the functional material in a case where the magnitude of the electrical signal is increased to such a degree that the characteristic value of the functional material is saturated. It is typical with a device using an organic material that the characteristic change with respect to an electric field, or the like, does not include a definite threshold value (voltage) for a characteristic to be exhibited. Therefore, it is difficult to control such a device in a gray scale. Moreover, it is also difficult to realize a smooth gray scale display with a device that either exhibits or does not exhibit a characteristic, i.e., that takes one of only two states of an ON state and an OFF state. As illustrated in FIG. 14C, even if the characteristic value of the functional material is saturated, the distance from the active device where the functional material can be controlled increases, thereby increasing the total characteristic value (i.e., the integral value of the characteristic value). Thus, by using the magnitude of the electrical signal, the total characteristic value of the functional material can be controlled both in terms of the size of the control area and the characteristic value of the functional material. Therefore, it is possible to realize a smooth gray scale display even with a device using an organic material.

Figure 15A:
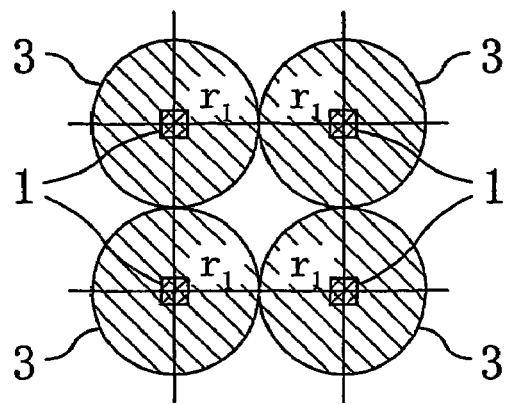
FIG. 15A to FIG. 15D are plan views each illustrating the control area 3 of the active device 1 and a controllable area of the conductive film 2.
Figure 15B:
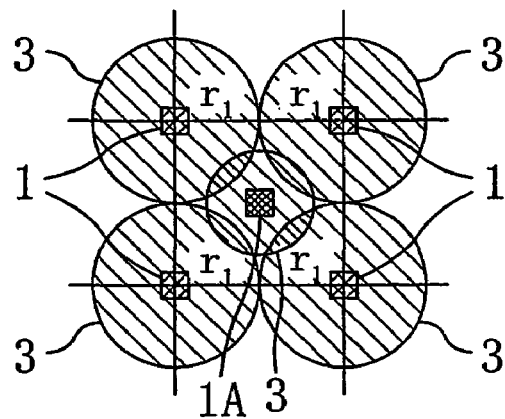

Moreover, the proportion of the controllable area of the conductive film 2 can be adjusted by appropriately rearranging the active devices 1. FIG. 15A to FIG. 15D are plan views each illustrating the control area 3 of the active device 1 and the controllable area of the conductive film 2. Where the maximum length of the control area 3 extending from each active device 1 is r1, the controllable area accounts for about 80% of the total area of the conductive film 2 if the active devices 1 are arranged as illustrated in FIG. 15A. The proportion of the controllable area can be brought to substantially 100% by providing another active device 1A in a void area surrounded by the control areas 3, as illustrated in FIG. 15B.

Figure 15C:
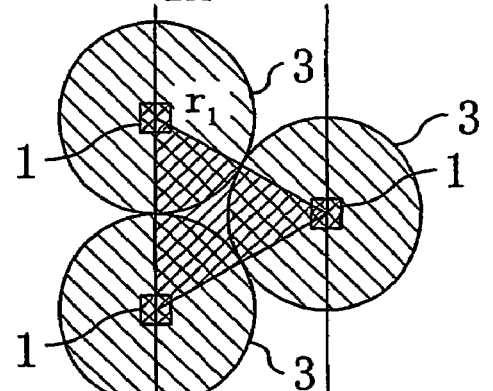
Figure 15D:
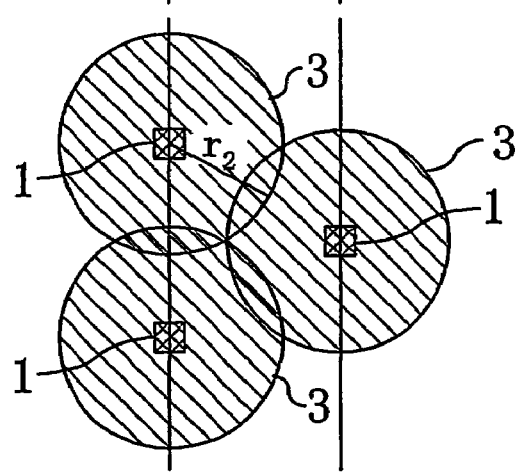

Moreover, when the active devices 1 are arranged as illustrated in FIG. 15C, about 90% of the total area of the conductive film 2 can be controlled. As illustrated in FIG. 15D, when the magnitude of the electrical signal of the active device 1 is increased so that the maximum length of the control area 3 is r2 (>r1), the control areas 3 overlap with one another, the proportion of the controllable area can be brought to 100%. Changing the controllable area as described above is not possible with the conventional method of forming pixels by patterning a conductive film. According to the present invention, pixels can be formed while efficiently using the area of the conductive film 2. Thus, by controlling the active device 1 and the conductive film 2 formed over the active device 1, it is possible to define the control area 3 around the active device 1 without a patterning process, thus providing pixels capable of gray scale display. In other words, it is possible to provide patterning-free pixels.

Embodiment 5

Figure 16A:
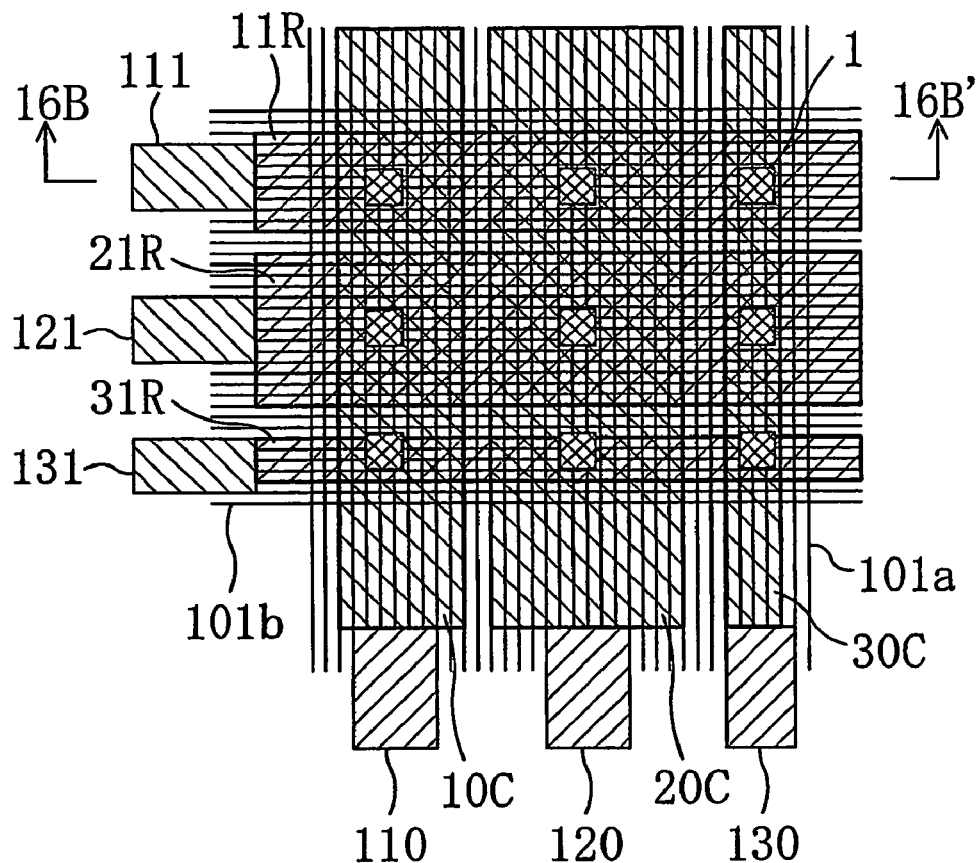
FIG. 16A is a plan view of a display device of Embodiment 5.
Figure 16B:
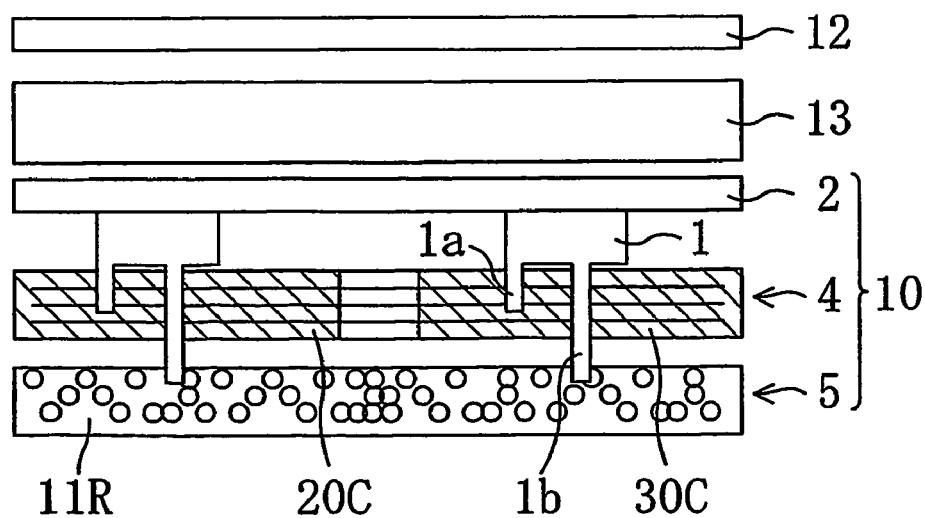
FIG. 16B is a cross-sectional view taken along line 16B–16B' of FIG. 16A.

FIG. 16A is a plan view of a display device of Embodiment 5, and FIG. 16B is a cross-sectional view taken along line 16B–16B' of FIG. 16A. The display device of the present embodiment is an active driving display device including an active device substrate 10, a counter electrode 12 opposing the active device substrate 10, and a display function layer 13 provided between the conductive film 2 and the counter electrode 12. The display function layer 13 is a layer whose optical transmittance is modulated by the potential difference between the opposing electrodes (light modulating layer) or a layer that itself emits light by a current flowing between the opposing electrodes (light emitting layer). For example, the display function layer 13 is a liquid crystal layer, an inorganic or organic EL layer, a light emitting gas layer, an electrophoretic layer, an electrochromic layer, or the like. Note however that the display function layer may be changed to any other suitable functional layer. Thus, the display device of the present embodiment can be used as an active driving functional device.

The active device substrate 10 includes the active devices 1 formed on a substrate, and the conductive film 2 formed over the active devices 1. In the present embodiment, FETs are used as the active devices 1, and patterning-free electrode lines as will be described below are used as upper electrode lines 4 and lower electrode lines 5 for supplying electrical signals to the FETs.

Figure 17A:
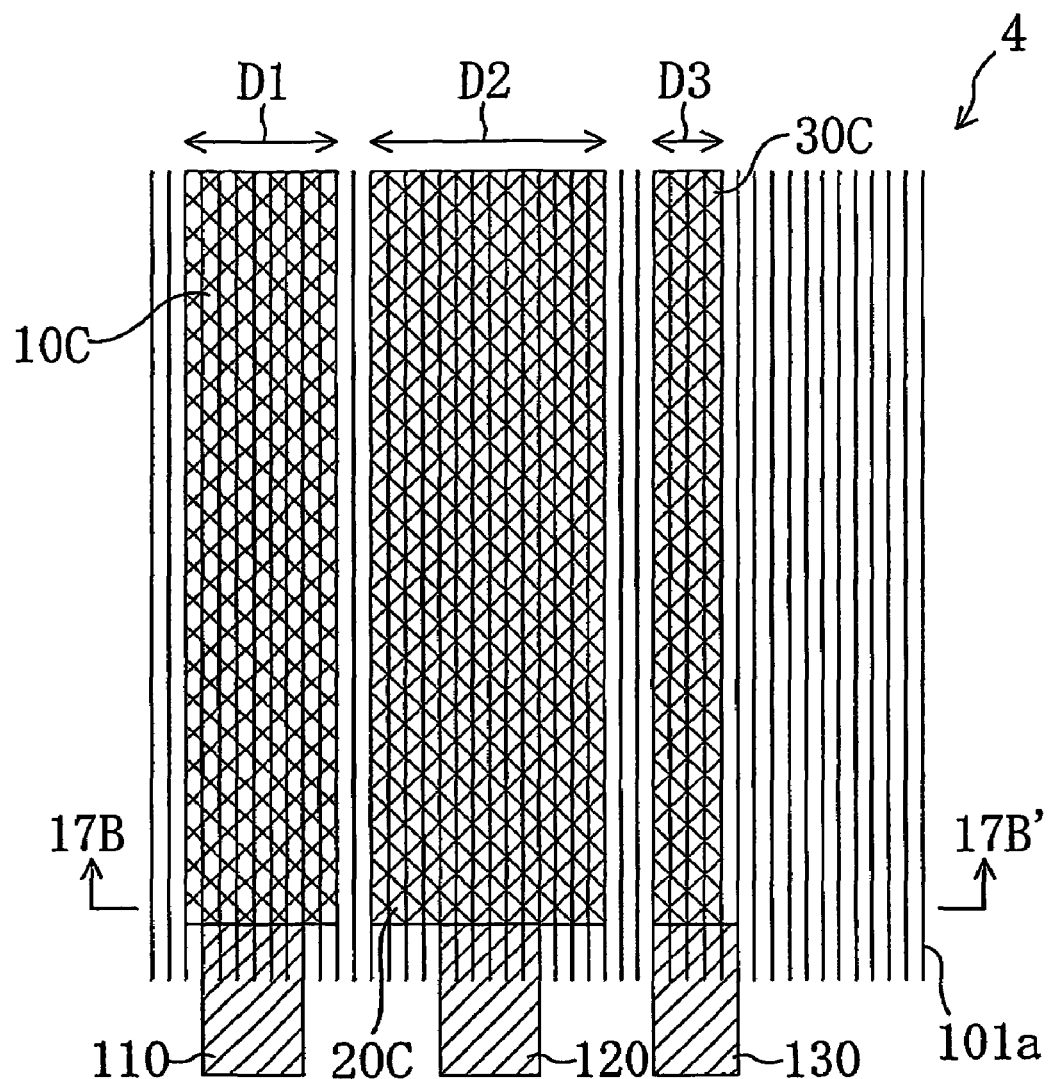
FIG. 17A is a plan view schematically illustrating upper electrode lines 4.
Figure 17B:
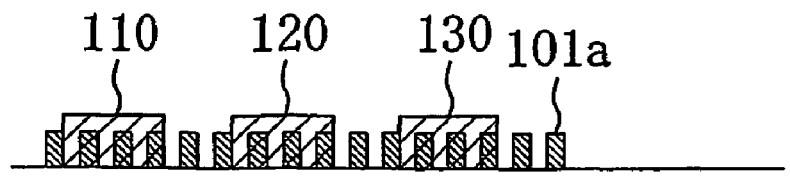
FIG. 17B is a cross-sectional view taken along line 17B–17B' of FIG. 17A.

FIG. 17A is a plan view schematically illustrating the upper electrode lines 4, and FIG. 17B is a cross-sectional view taken along line 17B–17B' of FIG. 17A. The upper electrode lines 4 include a first linear conductor group 10C, a second linear conductor group 20C and a third linear conductor group 30C, which are separate from one another. The first linear conductor group 10C, the second linear conductor group 20C and the third linear conductor group 30C each include a plurality of linear conductors 101a. No linear conductor 101a belongs to more than one of the first linear conductor group 10C, the second linear conductor group 20C and the third linear conductor group 30C. The upper electrode lines 4 include linear conductors 101a that do not belong to any of the linear conductor groups. The linear conductors 101a extend generally parallel to one another.

The upper electrode lines 4 include the first input terminal 110 for inputting an electrical signal to the first linear conductor group 10C, the second input terminal 120 for inputting an electrical signal to the second linear conductor group 20C, and the third input terminal 130 for inputting an electrical signal to the third linear conductor group 30C. The linear conductors 101a are each made of a conductive material, and each line of the linear conductor 101a is electrically conductive. Each linear conductor 101a is not in contact with an adjacent linear conductor 101a. The interval between adjacent linear conductors 101a is about some tens of nm, and is preferably 10 nm or more and 50 nm or less. The thickness of the linear conductor 101a is about 10 nm or more and is some μm or less.

The width of each of the input terminals 110, 120 and 130 (the dimension thereof in a direction generally perpendicular to the direction in which the linear conductors 101a extend) is significantly larger than the interval between the linear conductors 101a. Specifically, the width is 10 μm or more and 100 μm or less, and is 300 μm or less in view of a pixel pitch of 70 ppi. Moreover, the interval between adjacent input terminals is about some μm to some tens of μm.

For example, in a case where the pitch of the input terminals (the sum of the width of an input terminal and the interval between two adjacent input terminals) is 100 μm and the interval between the input terminals is 20 μm some hundreds of linear conductors 101a, which are arranged at intervals of some tens of nm, are present between two adjacent input terminals.

By joining the input terminals 110, 120 and 130 with some linear conductors 101a, an electrical signal can be input to the linear conductors 101a that are joined with the input terminals 110, 120 and 130. Moreover, by increasing the magnitude of the electrical signal input to the input terminals 110, 120 and 130, the electrical signal can be input not only to the linear conductors 101a that are joined with the input terminals 110, 120 and 130, but also to other adjacent linear conductors 101a. When the linear conductors 101a are arranged at a nano-order pitch, a leak current may occur between adjacent linear conductors 101a depending on the magnitude of the electrical signal. Thus, the total width D1 of a group of linear conductors 101a (the first linear conductor group 10C) to which an electrical signal is input from the first input terminal 110, for example, can be larger than the total width of the group of linear conductors 101a that are joined with the first input terminal 110. In other words, the extent of an input terminal in the width direction is dependent on the magnitude of the input signal to the input terminal, whereby the line width of a linear conductor group can be controlled by adjusting the magnitude of the potential signal to be supplied thereto. Note that "joined" as used herein means "physically connected", and "electrically connected" or simply "connected" will be used where an electrical signal is transmitted by a leak current between two conductors that are not physically connected with each other.

Similarly, the total width D2 of the second linear conductor group 20C to which an electrical signal is input from the second input terminal 120, and the total width D3 of the third linear conductor group 30C to which an electrical signal is input from the third input terminal 130, can be adjusted, as necessary, by adjusting the magnitude of the electrical signal to be input to the input terminals 120 and 130, respectively.

The conductive material of the linear conductor 101a may be one of those listed for the conductive film 2. Specifically, examples of the conductive material include metal (nano) particles, metal-coated nanoparticles, conductive polymers, carbon nanotubes, deoxyribonucleic acids, and the like. The linear conductors 101a can be formed by arranging material particles in a nano-order or near-nano-order arrangement. Methods for realizing a nano-order or near-nano-order arrangement include a gas deposition method, a laser transfer method, a micromesopic pattern method using an application method, and the like. Moreover, in a case where a conductive polymer is used, a nano-pattern of a conductive polymer can be produced by a nano-line photopolymerization method by irradiating monomers arranged in a high order with laser light. A nano-order or near-nano-order arrangement of a material may alternatively be produced by a printing process.

The input terminals 110, 120 and 130 joined with the linear conductors 101a connect the terminals of a driver IC (integrated circuit) for driving a display device with the linear conductors 101a. The terminals of the driver IC may be connected directly with the input terminals 110, 120 and 130, or via terminals of a flexible printed circuit.

The input terminals 110, 120 and 130 and the terminals of the driver IC or the flexible printed circuit may be electrically connected with each other by thermo-compression bonding via an anisotropic conductive film therebetween.

Figure 18:
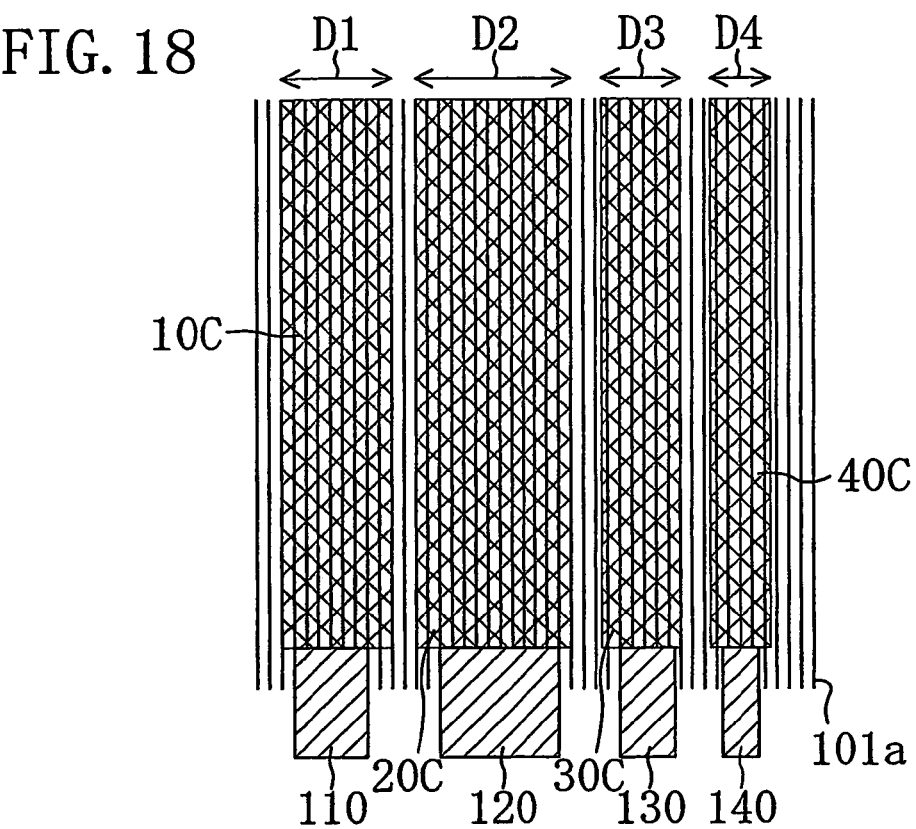
FIG. 18 is a plan view illustrating the relationship between the width of an input terminal and the width of a linear conductor group.
Figure 19:
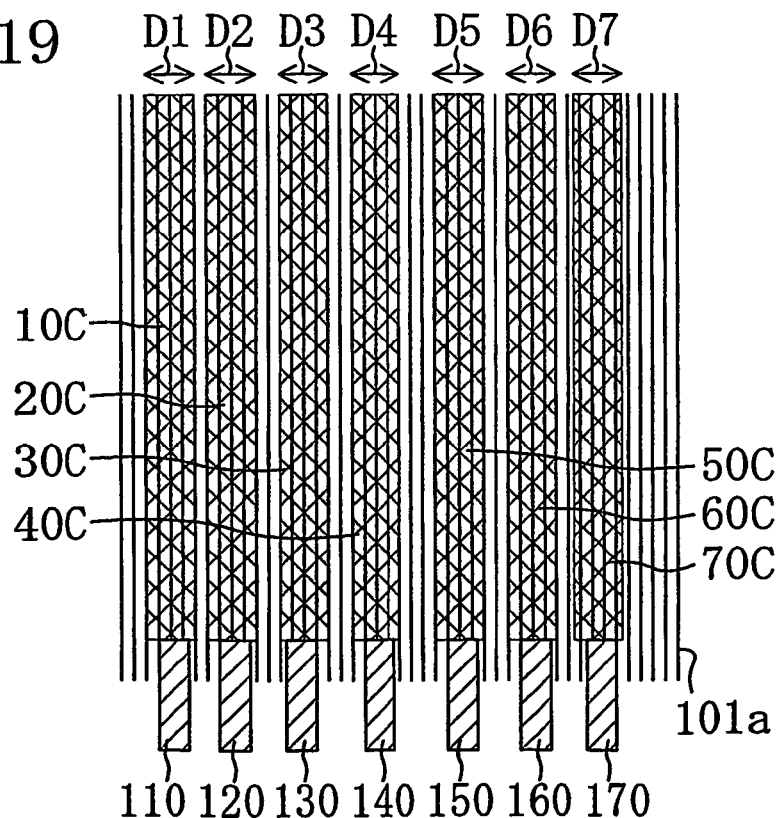
FIG. 19 is a plan view illustrating the relationship between the width of an input terminal and the width of a linear conductor group.

The width of a linear conductor group, to which an electrical signal is input from one of the input terminals 110, 120 and 130, can be changed only by changing the width of the input terminals 110, 120 and 130. For example, the widths D1 to D4 of linear conductor groups 10C to 40C can be varied from one another by forming the input terminals 110 to 140 having different widths, as illustrated in FIG. 18. Moreover, the widths D1 to D7 of the linear conductor groups 10C to 70C can be reduced, thereby realizing a higher definition, by reducing the widths of the input terminals 110 to 170, as illustrated in FIG. 19.

As do the upper electrode lines 4, the lower electrode lines 5 include linear conductor groups 11R, 21R and 31R to which an electrical signal is input from input terminals 111, 121 and 131, respectively. The upper electrode lines 4 and the lower electrode lines 5 are arranged so that the linear conductor groups 10C, 20C and 30C of the is upper electrode lines 4 cross the linear conductor groups 11R, 21R and 31R of the lower electrode lines 5. Note that although not shown in the figures, a protective layer (insulating layer) made of a resin, or the like, is formed between the upper electrode lines 4 and the lower electrode lines 5. Thus, according to the present embodiment, the electrode lines 4 and 5 of intended line widths can be formed without using a photolithography method. In other words, it is possible to obtain patterning-free electrode lines 4 and 5.

In the present embodiment, existing FETs are used as the active devices 1. Existing FETs are devices that are formed in advance on a silicon substrate, and can be arranged at predetermined positions corresponding to the intersections between the linear conductor groups 10C, 20C and 30C of the upper electrode lines 4 and the linear conductor groups 11R, 21R and 31R of the lower electrode lines 5 by using methods such as a transfer method or a spray method. An upper electrode terminal 1a and a lower electrode terminal 1b of each FET preferably have different terminal lengths so that they are connected to the electrode lines 4 and 5, respectively. Specifically, the terminal length of the lower electrode terminal 1b is set to be longer than that of the upper electrode terminal 1a. It is preferred that the lower electrode terminal 1b is made of a metal. Thus, when FETs are formed by a transfer method, or the like, the lower electrode terminal 1b reaches the lower electrode lines 5 while piercing through a soft resin layer (insulating layer) provided between the upper electrode lines 4 and the lower electrode lines 5 so that the lower electrode terminal 1b is electrically connected with the lower electrode lines 5.

Figure 20A:
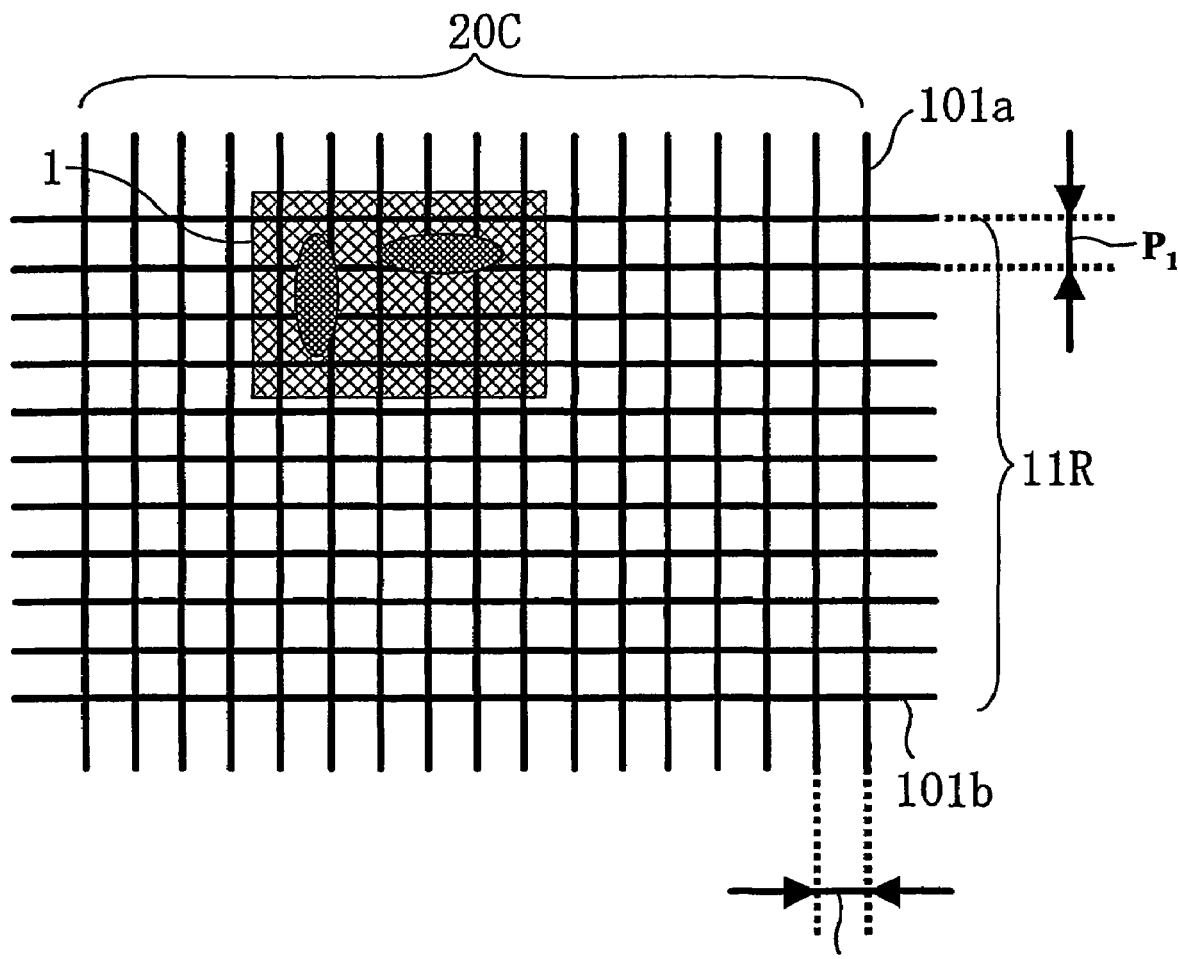
FIG. 20A is a plan view illustrating an area where a second linear conductor group 20C of the upper electrode lines 4 intersects with a linear conductor group 11R of lower electrode lines 5.
Figure 20B:
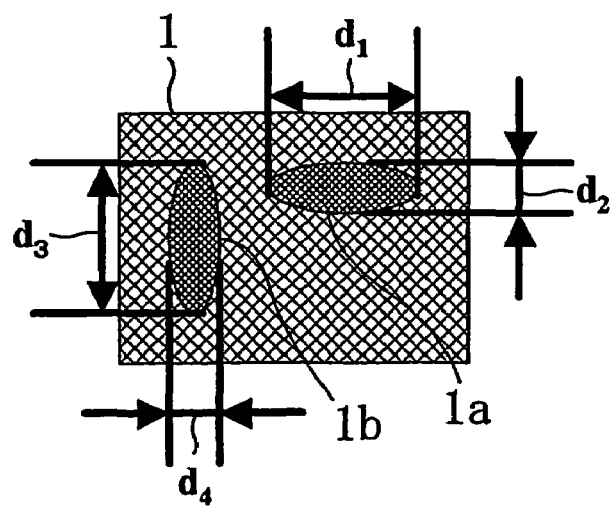
FIG. 20B is a plan view of the active device 1.

The shape of the terminals of the active device 1 will be described with reference to FIG. 20A, FIG. 20B and FIG. 21. FIG. 20A is a plan view illustrating an area where the second linear conductor group 20C of the upper electrode lines 4 intersects with the linear conductor group 11R of the lower electrode lines 5, and FIG. 20B is a plan view of the active device 1. The upper electrode terminal 1a and the lower electrode terminal 1b of the active device 1 each has an elliptical shape as viewed from above. The long side of the upper electrode terminal 1a (corresponding to the major axis of the ellipse) is generally perpendicular to the direction in which the linear conductors of the second linear conductor group 20C extend, and the long side of the lower electrode terminal 1b is generally perpendicular to the direction in which the linear conductors of the linear conductor group 11R extend.

Assume that the pitch of the linear conductors of the linear conductor group 11R of the lower electrode lines 5 is P1, the pitch of the linear conductors of the second linear conductor group 20C of the upper electrode lines 4 is P2, the length of the long side of the upper electrode terminal 1a is d1, the length of the short side thereof (corresponding to the minor axis of the ellipse) is d2, and the lengths of the long side and the short side of the lower electrode terminal 1b are d3 and d4, respectively. Then, an electrical signal is efficiently input from the upper electrode lines 4 to the active device 1 if d1>d2. Similarly, an electrical signal is efficiently input from the lower electrode lines 5 to the active device 1 if d3>d4.

Figure 26:
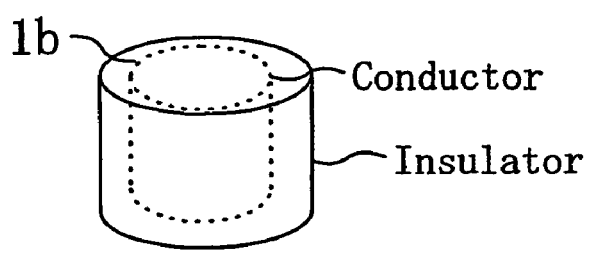
FIG. 26 is a perspective view illustrating a lower electrode terminal 1b.

Moreover, it is preferred that d3>>P1 and d4<P2 in order to avoid the influence of the upper electrode lines 4 when the lower electrode terminal 1b pierces through the layer of the upper electrode lines 4. However, when the lower electrode terminal 1b pierces through the layer of the upper electrode lines 4, the lower electrode terminal 1b may cut off a portion of the second linear conductor group 20C of the upper electrode lines 4. Since the line width of the second linear conductor group 20C is about some tens of microns to some hundreds of microns, and the interval between adjacent linear conductors 101a is about some tens of nm, the second linear conductor group 20C includes some hundreds to some tens of thousands of linear conductors 101a. Therefore, even if the lower electrode terminal 1b cuts off one to several linear conductors 101a, the conductivity of the second linear conductor group 20C as an electrode is not substantially influenced. Moreover, if the linear conductors 101a of the upper electrode lines 4 are cut off, a portion around the lower electrode terminal 1b is insulated from the upper electrode lines 4, whereby there is little adverse influence. Note however that when the lower electrode terminal 1b contacts the linear conductors 101a of the upper electrode lines 4, an electrical signal to the upper electrode lines 4 is input to the lower electrode terminal 1b, thereby causing an erroneous operation. In such a case, it is preferred that the conductor portion of the terminal 1b is surrounded by an insulator, as illustrated in FIG. 26. In this way, an electrical signal from a linear conductor can be efficiently input to the active device 1, while minimizing the influence of electrode lines in the vertical direction.

Figure 21:
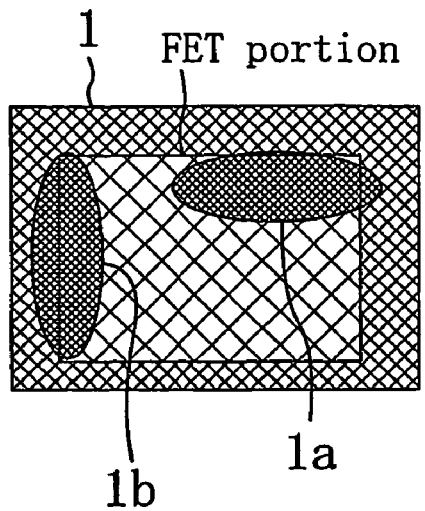
FIG. 21 is a plan view illustrating the active device 1 such as an FET.
Figure 22:
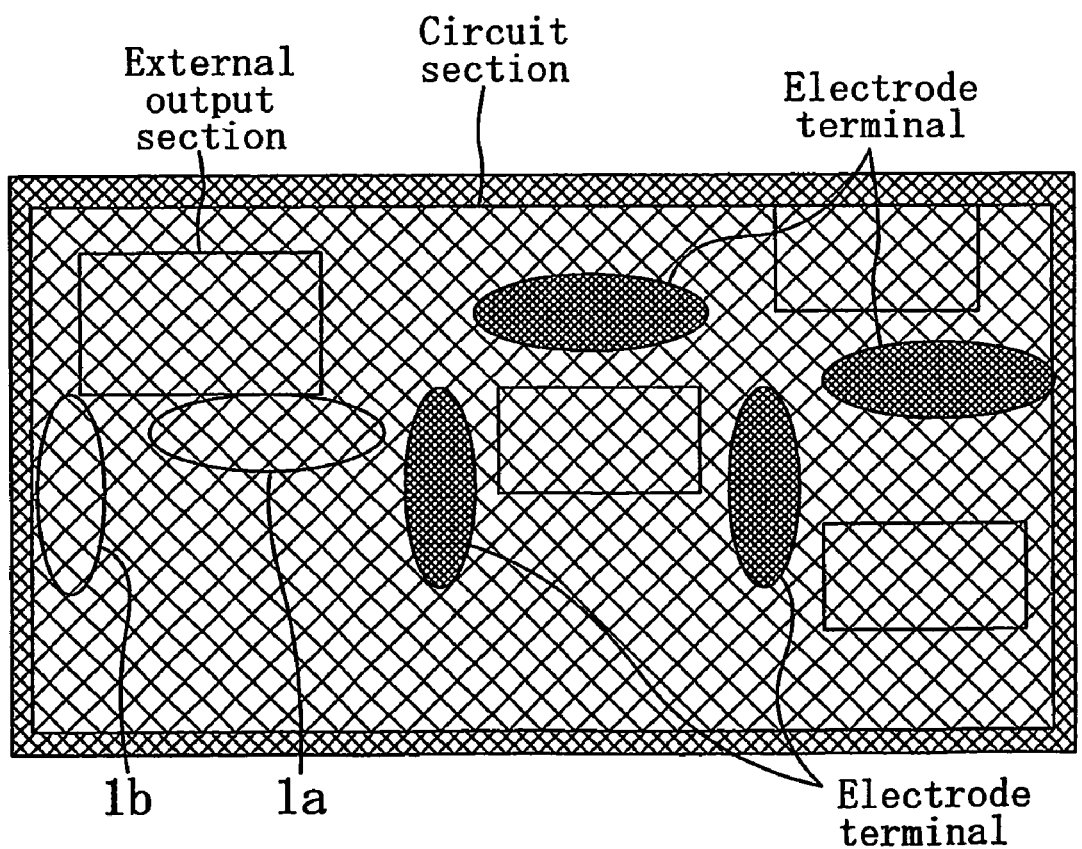
FIG. 22 is a plan view schematically illustrating a system active device 1 with a built-in circuit.

FIG. 21 is a plan view illustrating the active device 1 such as an FET. A basic function of the active device 1 is to control the switching of the display function layer 13 provided on the active device 1, and the active device 1 is normally a transistor simply including an FET portion as illustrated in FIG. 21. FIG. 22 is a plan view schematically illustrating a system active device 1 with a built-in circuit. As illustrated in FIG. 22, the active device 1 may be provided with other functions in addition to the switching function, thereby further enhancing the function of the display function layer. For example, the active device 1 may be a system active device with a built-in circuit for providing a function of storing information for a certain period of time by using a capacitor, or a memory function. In such a case, the active device 1 includes a circuit section, a plurality of electrode terminals, an external output section for outputting an electrical signal to the conductive film 2 on the active device 1, etc. By using the upper electrode lines 4 and the lower electrode lines 5 described in the present embodiment, electrical conduction can be obtained with electrode terminals other than the upper electrode terminal 1a and the lower electrode terminal 1b.

Next the arrangement of pixels of the present embodiment will be described. First, a conventional pixel control method using active devices will be described with reference to FIG.

39. As in some display devices such as an active matrix liquid crystal display device, an active device as a switching device is provided for each pixel, with a patterned pixel electrode being provided on each active device, and the liquid crystal molecules are driven via the pixel electrodes.

Figure 23A:
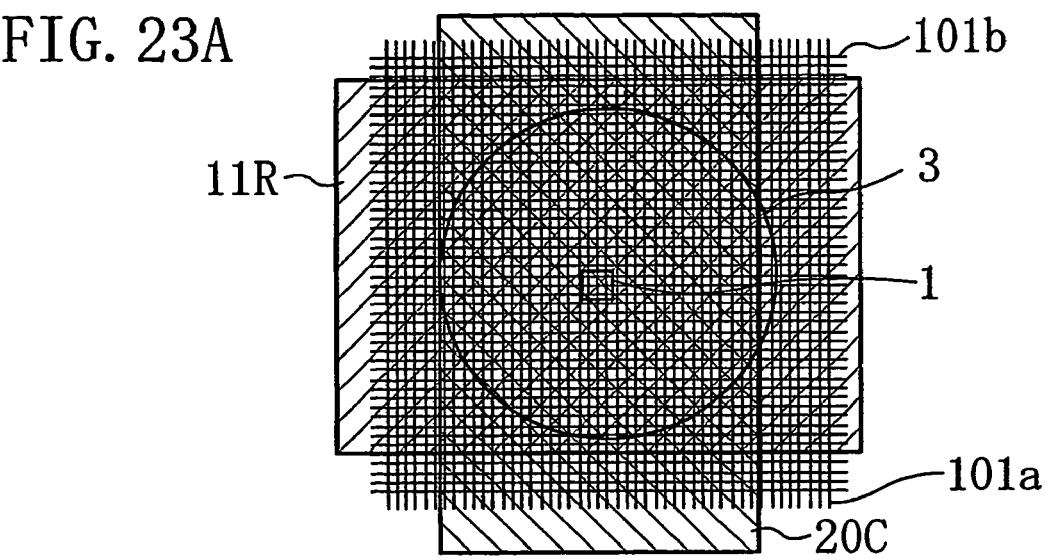
FIG. 23A is a plan view illustrating the arrangement of the active device 1 according to Embodiment 5.

In the present embodiment, the active devices 1 are arranged at predetermined positions corresponding to the intersection areas between the linear conductor groups of the upper electrode lines 4 and those of the lower electrode lines 5, as illustrated in FIG. 16A. FIG. 23A is a plan view illustrating the arrangement of the active devices 1 of the present embodiment, where the active device 1 is located in an area where the second linear conductor group 20C of the upper electrode lines 4 intersects with the linear conductor group 11R of the lower electrode lines 5. The active device 1 forms the control area 3 in the conductive film 2, whereby the display function layer 13 in the control area 3 can be controlled. In other words, a pixel region is defined by the active device 1 in the area where the second linear conductor group 20C of the upper electrode lines 4 intersects with the linear conductor group 11R of the lower electrode lines 5 (hereinafter also referred to simply as "intersection area").

Figure 23B:
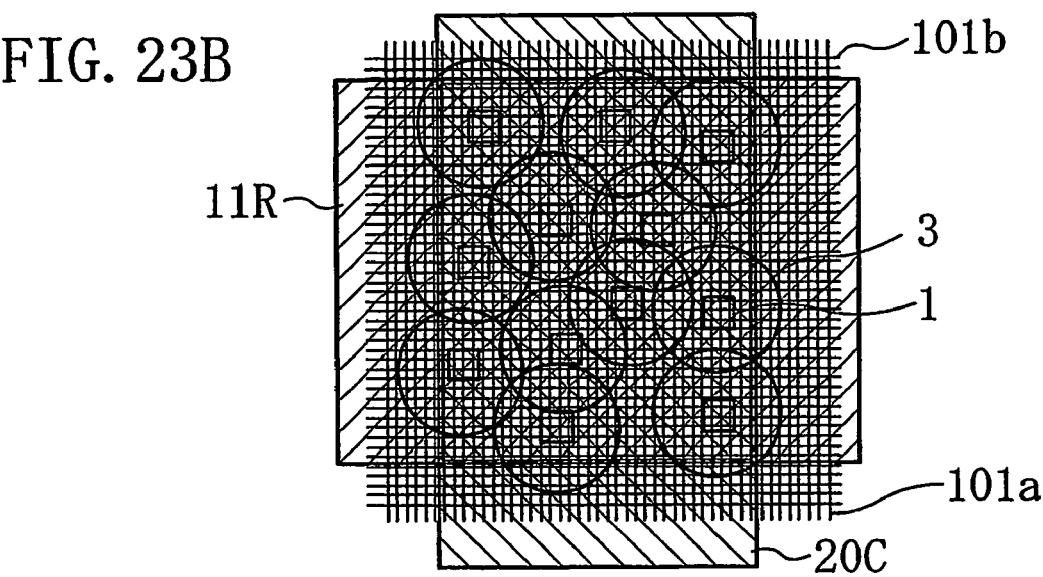
FIG. 23B is a plan view illustrating an arrangement where the active devices 1 are arranged randomly in an intersection area.

The arrangement of the active devices 1 is not limited to an arrangement where they are arranged at predetermined positions, but the active devices 1 may alternatively be arranged randomly. FIG. 23B is a plan view illustrating an arrangement where the active devices 1 are arranged randomly in an intersection area. In the example illustrated in FIG. 23B, the control area 3 formed by each active device 1 is smaller than the control area 3 of the active device 1 illustrated in FIG. 23A. Thus, the magnitude of the electrical signal output from each active device 1 of FIG. 23B is smaller than the magnitude of the electrical signal output from the active device 1 of FIG. 23A.

When an electrical signal is input from an input terminal, the electrical signal is supplied to the plurality of active devices 1 in the intersection area, and each of the active devices 1 functions as a switching device. When a plurality of active devices 1 are arranged randomly in an intersection area, some of the active devices 1 may not operate normally due to poor connection, or the like. However, as long as some of the active devices 1 function normally, a plurality of control areas 3 are formed in the conductive film 2, thereby forming a pixel region. Thus, the pixel can be controlled. For example, when a plurality of active devices 1 are arranged in an intersection area, as illustrated in FIG. 23B, a plurality of control areas 3 are formed by some of the active devices 1 that operate normally. In such a case, some areas are formed in the intersection area other than the control areas 3. However, the majority of the intersection area is occupied by the control areas 3, whereby the intersection area can generally be controlled as a pixel region. Thus, it is not necessary that all of the active devices 1 in an intersection area operate normally. Of course, the active devices 1 can be provided or arranged so that all of the randomly-arranged active devices 1 function normally.

Figure 23C:
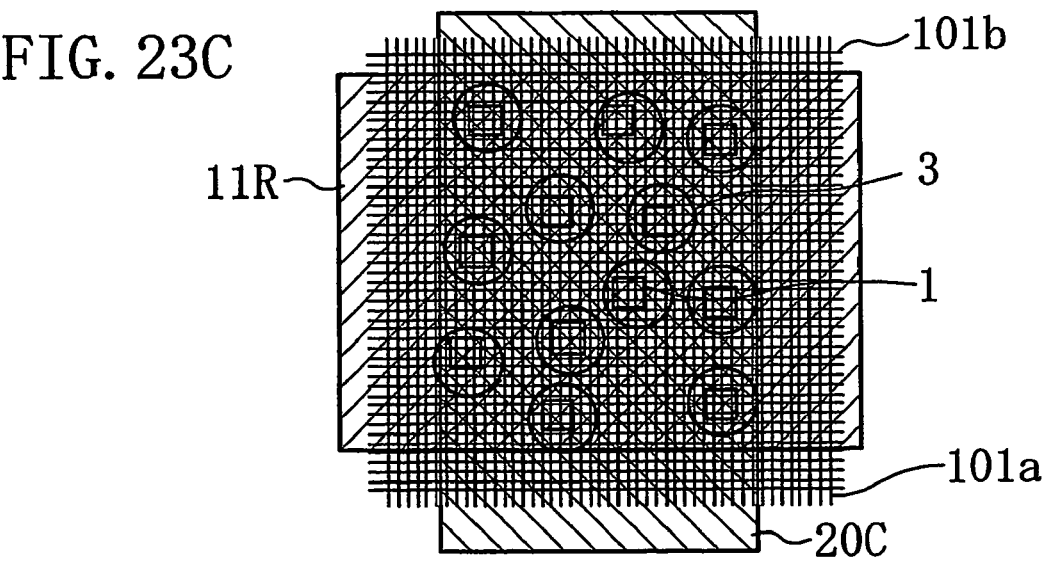
FIG. 23C is a plan view illustrating the control areas 3 in an arrangement of FIG. 23B where the magnitude of the input signal to each active device 1 is reduced.

According to the present embodiment, by using the patterning-free electrode lines, the patterning-free pixels (the control areas 3), and the randomly-arranged active devices 1, it is possible to produce a control system to be controlled by the active devices 1, without having to perform a photolithography process at all. By appropriately setting a definition of input terminals, it is possible to provide a control system capable of controlling pixels of a definition corresponding to the definition of the input terminals. Moreover, depending on the magnitude of the input signal to the active device 1, the output from the active device 1 changes, and the area 3 to be controlled also changes. This can be utilized to produce a gray scale display. FIG. 23C is a plan view illustrating the control areas 3 in an arrangement of FIG. 23B where the magnitude of the input signal to each active device 1 is reduced. As illustrated in FIG. 23C, by reducing the magnitude of the input signal to each active device 1, the control area 3 is reduced, and the proportion of the area of the pixel region with respect to the entire intersection area is reduced, thereby allowing for a gray scale display.

Moreover, a plurality of active devices 1 arranged in an intersection area do not need to be the same in terms of performance. Active devices 1 of different levels of performance may alternatively be arranged in an intersection area so as to realize a finer pattern of control areas 3 in the intersection area, whereby the intersection area is used efficiently and a finer gray scale display can be produced.

Not only can the display device of the present embodiment be manufactured in a patterning-free process, but also it can be manufactured only by an application process or a printing process. Therefore, it is possible to produce the electrode lines 4 and 5, the active devices 1 and the conductive film 2 on a flexible substrate such as a plastic substrate. Moreover, the active device 1 itself can be a high-mobility, high-performance active device made on silicon. Therefore, it is possible to avoid poor characteristics that result when conventional organic active devices are produced on a plastic substrate. Thus, according to the present embodiment, it is possible to produce a high-performance active functional device without performing a patterning process.

Embodiment 6

Figure 24:
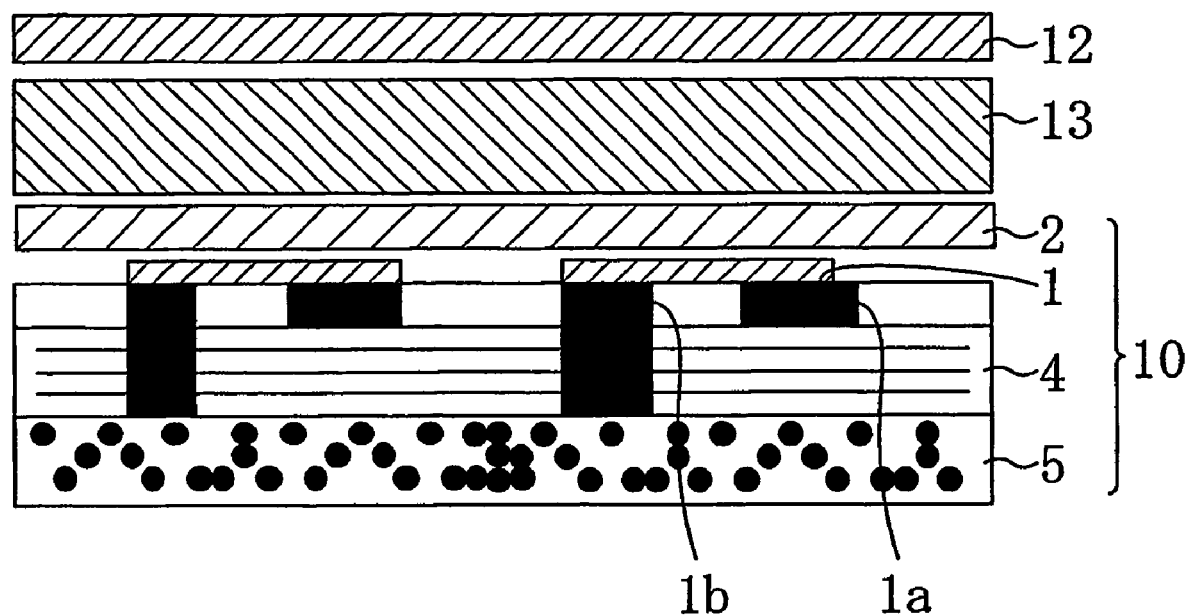
FIG. 24 is a cross-sectional view schematically illustrating a display device of Embodiment 6.

FIG. 24 is a cross-sectional view schematically illustrating a display device of Embodiment 6. In FIG. 24, those components that are substantially the same in function as those of the display device of Embodiment 5 are denoted by the same reference numerals and will not be further described below.

The display device of the present embodiment is substantially the same in structure as the display device of Embodiment 5. A difference therebetween is that in Embodiment 5, the active devices 1 are joined with the electrode lines 4 and 5 by embedding prefabricated active devices 1 in the electrode lines 4 and 5, whereas in the present embodiment, the active devices 1 are formed directly on the patterning-free electrodes 4 and 5.

Figure 25A:
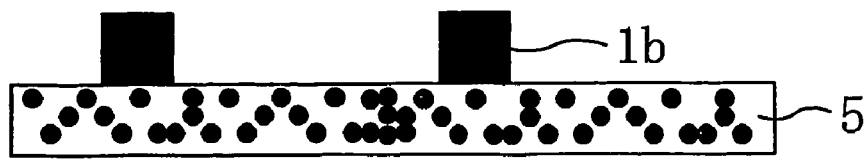
FIG. 25A to FIG. 25D are cross-sectional views illustrating steps for manufacturing an active device substrate 10 of Embodiment 6.

FIG. 25A to FIG. 25D are cross-sectional views illustrating steps for manufacturing the active device substrate 10 of the present embodiment. First, as illustrated in FIG. 25A, the lower electrode lines 5 are formed on a substrate (not shown), and the lower electrode terminal 1b of the active device 1 is formed on the lower electrode lines 5. Although the lower electrode terminal 1b has a columnar shape in the present embodiment, it may alternatively have an elliptical shape as viewed from above with a long side and a short side as described above in Embodiment 5. FIG. 26 is a perspective view illustrating the lower electrode terminal 1b. By forming an insulator around the conductor portion of the terminal 1b, as illustrated in FIG. 26, it is possible to prevent the terminal 1b from being contacting the upper electrode lines 4 to be formed in the following step. Note that the insulator surrounding the terminal 1b may be formed by printing a resin solution on the terminal 1b using an ink jet method, an electrostatic printing method, or the like.

Figure 25B:
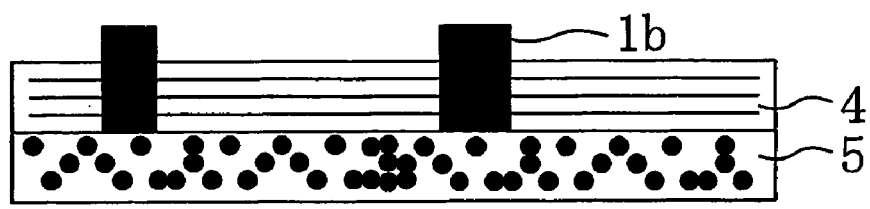
Figure 25C:
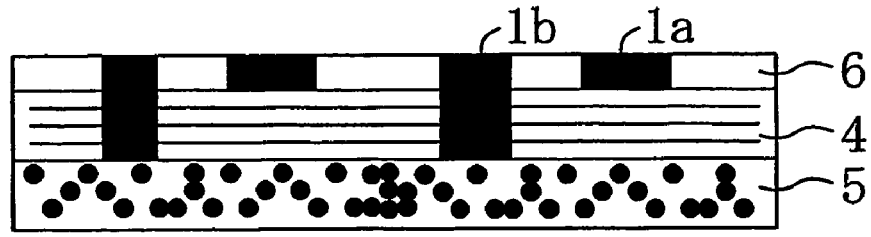
Figure 27A:
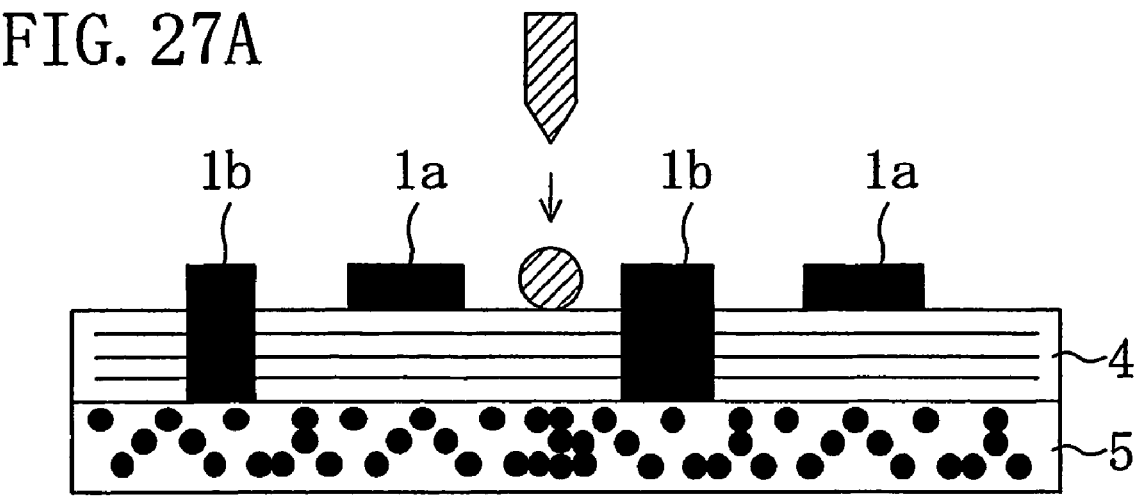
FIG. 27A and FIG. 27B are cross-sectional views illustrating steps for applying a resin solution on the upper electrode lines 4 to form an insulating layer 6.
Figure 27B:
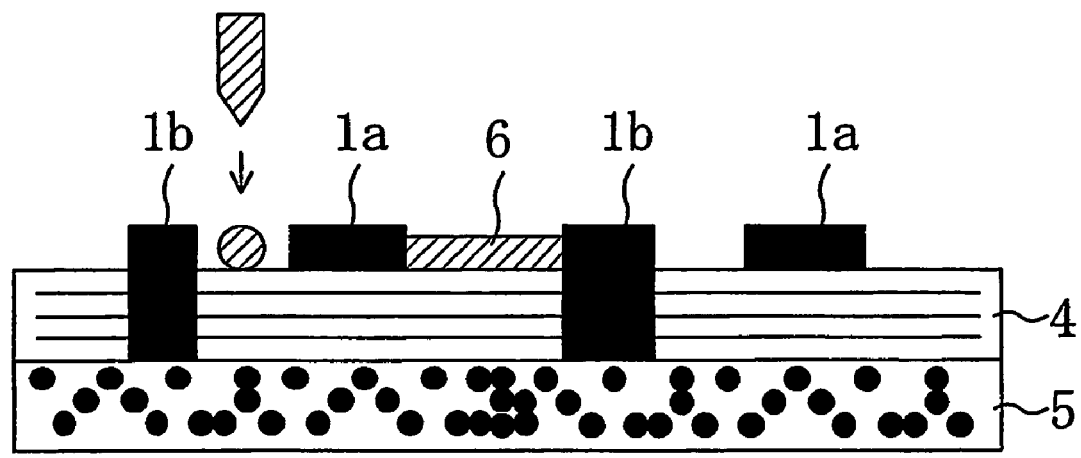

After forming the lower electrode terminal 1b, the upper electrode lines 4 are formed (FIG. 25B). Then, as illustrated in FIG. 25C, the upper electrode terminal 1a to be electrically connected with the upper electrode lines 4 is formed, and an insulating layer 6 is formed to such a thickness that the upper surfaces of the upper electrode terminal 1a and the lower electrode terminal 1b are exposed. As illustrated in FIG. 27A and FIG. 27B, if a resin solution is dripped onto an area between electrode terminals so that it is not dripped onto electrodes by using an ink jet method, or the like, the resin solution spreads across the exposed surface of the upper electrode lines 4 to form a film. In this way, the insulating layer 6 for protecting and insulating the upper electrode lines 4 is formed. The upper electrode lines 4 and the lower electrode lines 5 can be formed by a printing method, or the like, as described above in Embodiment 5. Moreover, the upper electrode terminal 1a and the lower electrode terminal 1b can be formed by printing a conductive material (e.g., a metal particle dispersion) by an ink jet method or an electrostatic printing method.

Figure 25D:
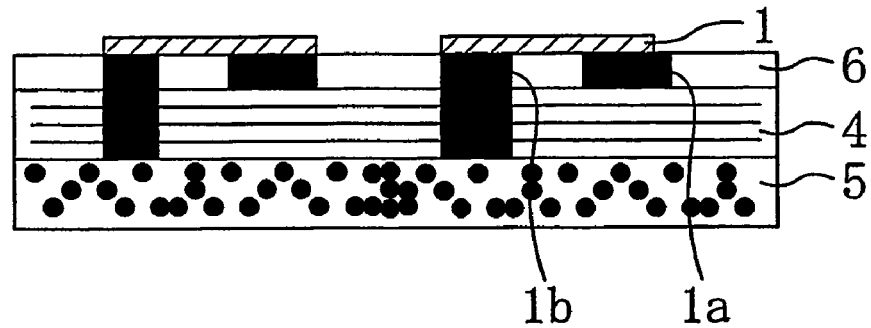

The main body of the active device 1 is formed on the upper surfaces of the upper electrode terminal 1a and the lower electrode terminal 1b (FIG. 25D). FIG. 28A to FIG. 28D are cross-sectional views schematically illustrating steps for manufacturing the main body of the active device 1. The steps for manufacturing the main body of the active device 1 will be described with reference to FIG. 28A to FIG. 28D. Note that it is assumed in the present embodiment that the upper electrode lines 4 form a plurality of scanning lines and the lower electrode lines 5 form a plurality of signal lines.

Figure 28A:
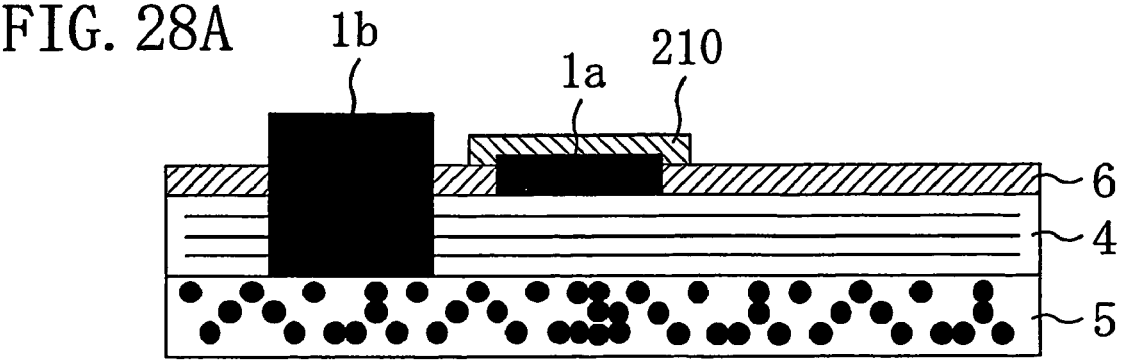
FIG. 28A to FIG. 28D are cross-sectional views schematically illustrating steps for manufacturing the main body of the active device 1.
Figure 28B:
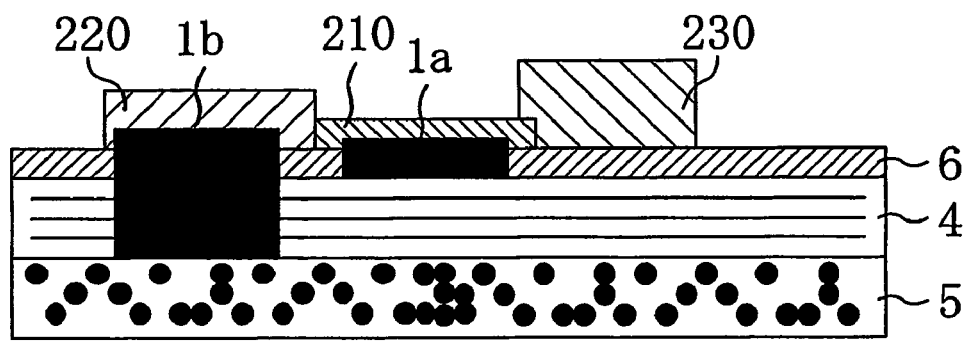

First, as illustrated in FIG. 28A, a gate insulating film 210 is formed over the upper electrode terminal 1a to be the gate electrode. The gate insulating film 210 can be formed by printing a resin solution by an ink jet method or an electrostatic printing method. After forming the gate insulating film 210, a source electrode 220 and a drain electrode 230 to be joined with the gate insulating film 210 are formed, as illustrated in FIG. 28B. The source electrode 220 and the drain electrode 230 can be formed by printing a conductive material by an ink jet method or an electrostatic printing method, as the upper electrode terminal 1a or the lower electrode terminal 1b. The source electrode 220 is formed on the lower electrode terminal 1b, which is connected to the signal lines. The thickness of the drain electrode 230 is set to be greater than the height of the source electrode 220 (the distance from the surface of the insulating layer 6). For example, in a case where the source electrode 220 and the drain electrode 230 are formed by an ink jet method, the height can be adjusted by adjusting the size of the droplet.

Figure 28C:
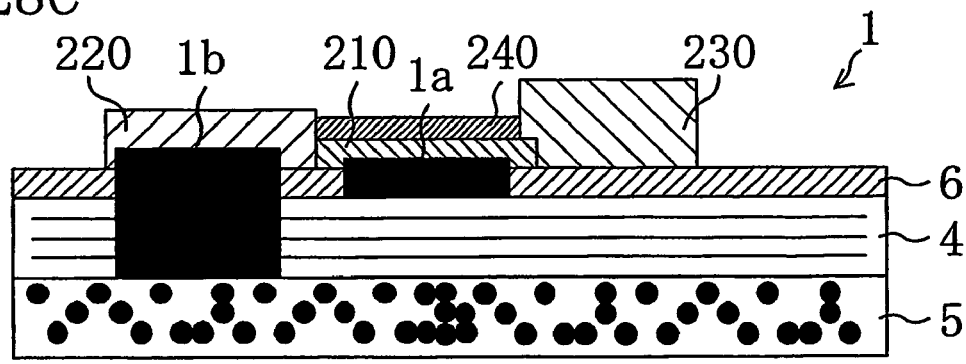
Figure 28D:
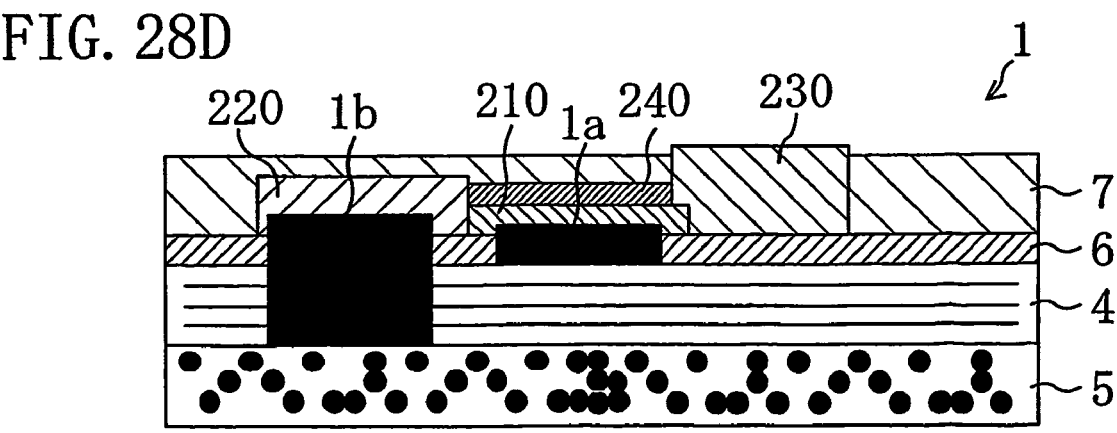

As illustrated in FIG. 28C, a semiconductor layer 240 connecting the source electrode 220 and the drain electrode 230 with each other is formed by an ink jet method, an electrostatic printing method, or the like, using an organic semiconductor material. A protective layer 7 is formed to such a thickness that the upper surface of the source electrode 220 is covered while the upper surface of the drain electrode 230 is exposed. The protective layer 7 can be formed by printing a resin solution by an ink jet method, an electrostatic printing method, or the like. After forming the active device 1 through the steps described above, the conductive film 2 is formed over the active device 1 to obtain the active device substrate 10.

The active device substrate 10 of the present embodiment can be used as an active driving display device by forming a liquid crystal layer, an organic light emitting layer, or the like, as the display function layer 13, as in Embodiment 5. Of course, any other suitable functional layer may alternatively be formed.

In the present embodiment, the active devices 1 themselves can be formed integrally with other components, the active devices 1 can be arranged at specific positions, rather than in a random arrangement as in Embodiment 5. Thus, unnecessary active devices 1 can be eliminated. Moreover, not only the electrode lines 4 and 5 but also the active devices 1 can be formed by an organic process using a printing method, or the like, whereby the display device can be easily produced. Furthermore, the structure can be formed on a flexible substrate such as a plastic substrate.

Embodiment 7

Figure 29:
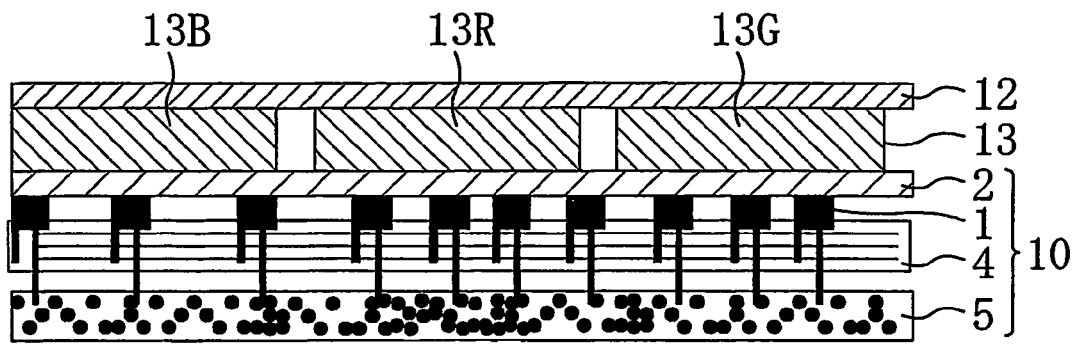
FIG. 29 is a cross-sectional view schematically illustrating an organic EL device of Embodiment 7.

FIG. 29 is a cross-sectional view schematically illustrating an organic EL device of Embodiment 7. In FIG. 29, those components that are substantially the same in function as those of the display device of Embodiment 5 are denoted by the same reference numerals and will not be further described below.

The display function layer 13 of the present embodiment includes polymer light emitting layers 13R, 13G and 13B that emit red (R), green (G) and blue (13) light beams, respectively.

The electrode lines 4 and 5 are formed in a pattern with a pitch of 100 nm by using metal nanoparticles, conductive polymers, template molecules for increasing the orientational order, or the like. Herein, template molecules are rigid molecules with high linearity, e.g., DNAs or carbon nanotubes. When nanoparticles or conductive polymers are adsorbed onto, or ion-bonded to, template molecules, the nanoparticles or conductive polymers are arranged with high linearity. Moreover, if the template molecules themselves are arranged into a pattern by a rubbing treatment, or the like, the metal particles or conductive polymers will be arranged accordingly. This improves the conductivity.

Figure 30:
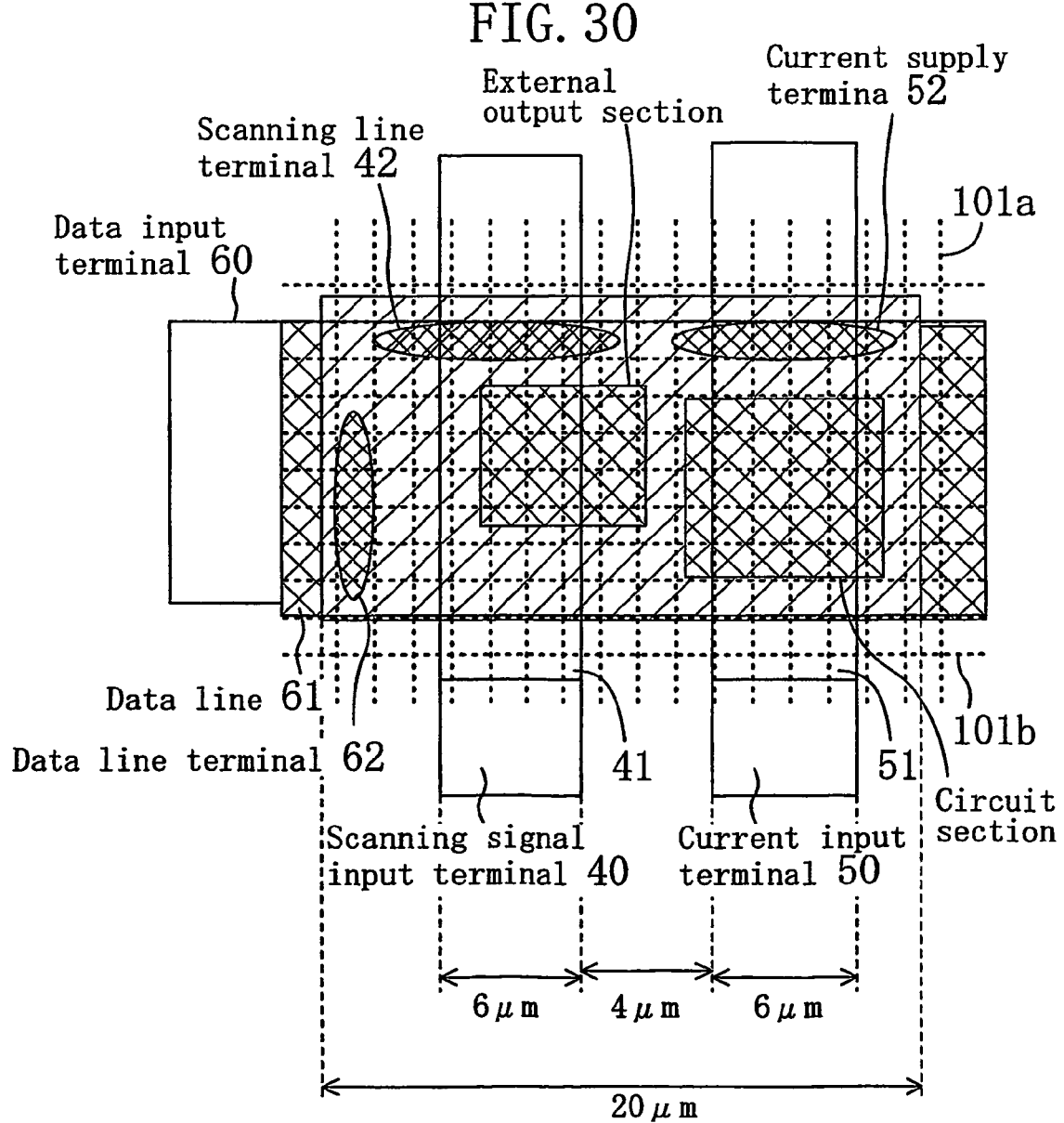
FIG. 30 is a plan view illustrating a configuration of the active device 1 used in Embodiment 7.
Figure 31:
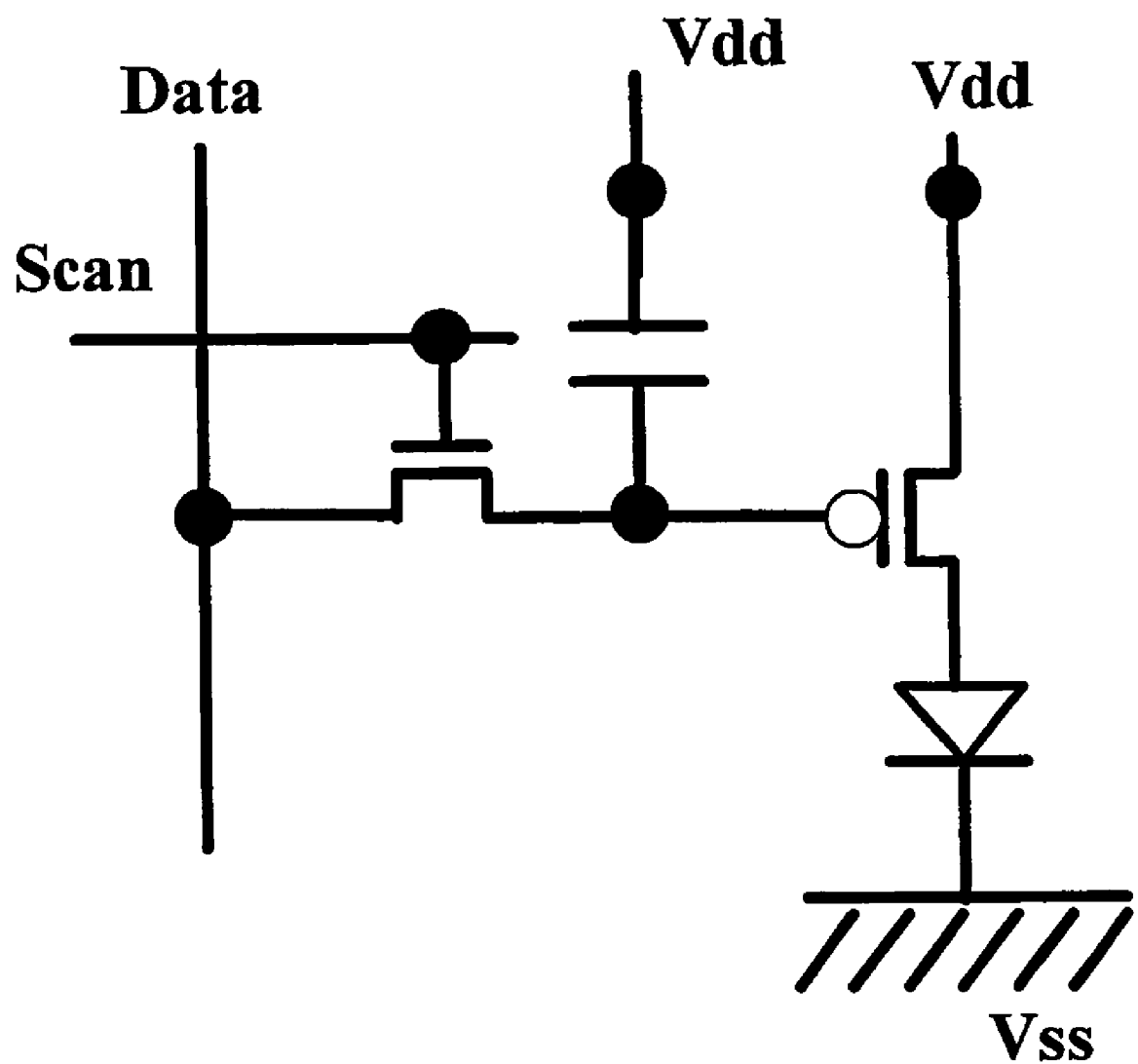
FIG. 31 is a diagram illustrating an equivalent circuit of the active device 1 of Embodiment 7.

A plurality of active devices are produced on a silicon substrate, and then the silicon substrate is divided into individual active devices. The obtained active devices 1 are arranged on a substrate. The mobility of the active device 1, which is one characteristic thereof is 600 or more. FIG. 30 is a plan view illustrating a configuration of the active devices 1 used in the present embodiment. In order to realize stable emission of light from organic EL devices, a plurality of transistors are typically provided in each pixel to stabilize the current value. A two-transistor arrangement, i.e., the simplest arrangement, is used in the present embodiment. FIG. 31 is a diagram illustrating an equivalent circuit of the active device 1 of the present embodiment. As illustrated in FIG. 30 and FIG. 31, the active device 1 includes three terminals, i.e., a scanning line terminal 42, a current supply terminal 52 and a data line terminal 62. The three terminals 42, 52 and 62 each have an elliptical shape as viewed from above, as in Embodiment 5.

A scanning signal input terminal 40 for receiving a scanning signal is connected to the upper electrode lines 4, and the linear conductors 101a that are electrically connected with the scanning signal input terminal 40 form a scanning line 41. Moreover, a current input terminal 50 for receiving a current to be supplied to a circuit section of the active device 1 is connected to the upper electrode lines 4, and the linear conductors 101a that are electrically connected with the current input terminal 50 form a current input line 51. A data input terminal 60 for receiving a data signal is connected to the lower electrode lines 5, and the linear conductors 101b that are electrically connected with the data input terminal 60 form a data line 61.

The scanning line 41 is parallel to the current input line 51, and is generally perpendicular to the data line 61. The scanning line terminal 42 and the current supply terminal 52 of the active device 1 are connected to the upper electrode lines 4, with the long sides thereof being generally perpendicular to the linear conductors 101a of the upper electrode lines 4. The data line terminal 62 of the active device 1 is connected to the lower electrode lines 5, with the long side thereof being generally perpendicular to the linear conductors 101b of the lower electrode lines 5. The active device 1 includes an external output section for outputting an electrical signal to the conductive film 2, and a circuit section as illustrated in FIG. 31.

In the present embodiment, the vertical and horizontal lengths of the active device 1 are 10 µm and 20 µm, respectively. Moreover, the size of the output section to the conductive film 2, which defines the control area 3, is 5 µm by 5 µm. Note that the vertical direction herein refers to the direction in which the scanning line 41 extends, and the horizontal direction refers to the direction in which the data line 61 extends.

In the present embodiment, the size of one pixel is 300 µm by 300 µm. One pixel includes R, G and B subpixels, and the size of each subpixel is 100 µm by 300 µm. The width of the data input terminal 60 is 100 µm and the interval between adjacent terminals 60 is 15 µm. Moreover, the width of each of the scanning signal input terminal 40 and the current input terminal 50 is 6 µm, and the interval between adjacent terminals 40 and 50 is 4 µm.

In the present embodiment, the upper electrode lines 4 are provided with the scanning line 41 and the current input line 51, whereby the active devices 1 need to be arranged so that the scanning line terminal 42 and the current supply terminal 52 of the active device 1 are connected to the scanning line 41 and the current input line 51, respectively.

Figure 32:
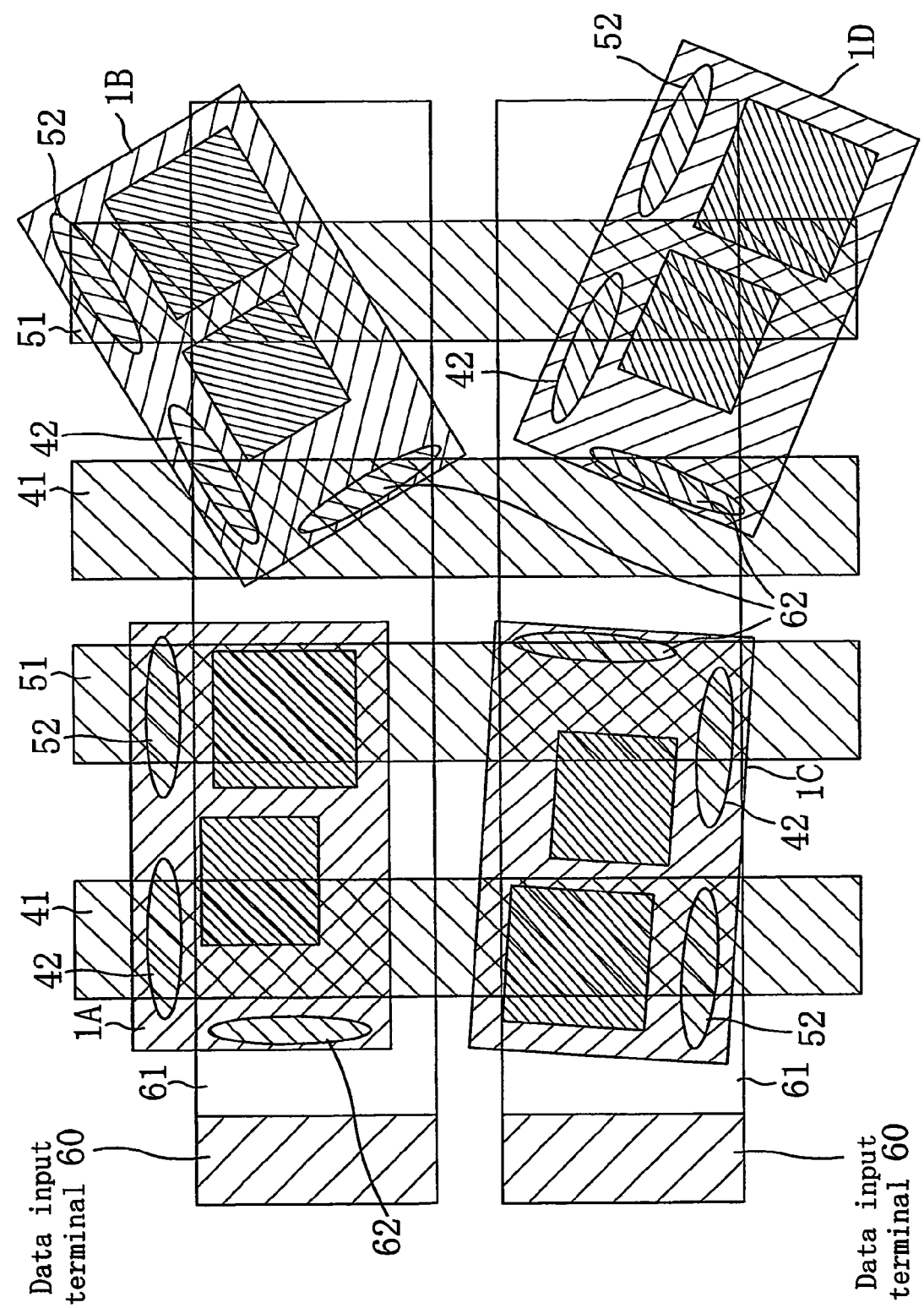
FIG. 32 is a plan view illustrating an arrangement of the active devices 1.

FIG. 32 is a plan view illustrating an arrangement of the active devices 1. The arrangement of the active devices 1 will be described with reference to FIG. 32. The active device 1A in FIG. 32 is in ideal placement, with the scanning line terminal 42, the current supply terminal 52 and the data line terminal 62 of the active device 1A being connected to the scanning line 41, the current input line 51 and the data line 61, respectively, whereby the active device 1A can operate normally. The active device 1 may in some cases operate normally even if it is placed in a skewed position as viewed from above. For example, although an active device 1B in FIG. 32 is placed in a skewed position, the active device 1B can operate normally because the scanning line terminal 42, the current supply terminal 52 and the data line terminal 62 of the active device 1B are connected to the scanning line 41, the current input line 51 and the data line 61, respectively.

However, an active device 1C in FIG. 32 cannot operate normally because the scanning line terminal 42 and the current supply terminal 52 of the active device 1C are connected to the current input line 51 and the scanning line 41, respectively. Moreover, an active device 1D in FIG. 32 cannot operate normally because the scanning line terminal 42 of the active device 1D is connected to the current input line 51.

Since the size of the active device 1 is 10 µm by 20 µm, and the size of each subpixel is 100 µm by 300 µm, about 150 active devices 1 can be included in one subpixel. In the present embodiment, about 20 active devices 1 are arranged in a scattered manner in each subpixel. If some of the about 20 active devices 1 operate normally, the area of the subpixel can be controlled. In the present embodiment, the control area 3 to be controlled by each active device 1 has a circular shape having a radius of about 30 µm. Therefore, if about seven or eight of the plurality of active devices 1 present in each subpixel operate normally, substantially the entire area of the subpixel can be controlled. It was confirmed by actually driving the active devices 1 that light was emitted from the entire surface of one subpixel.

Figure 33:
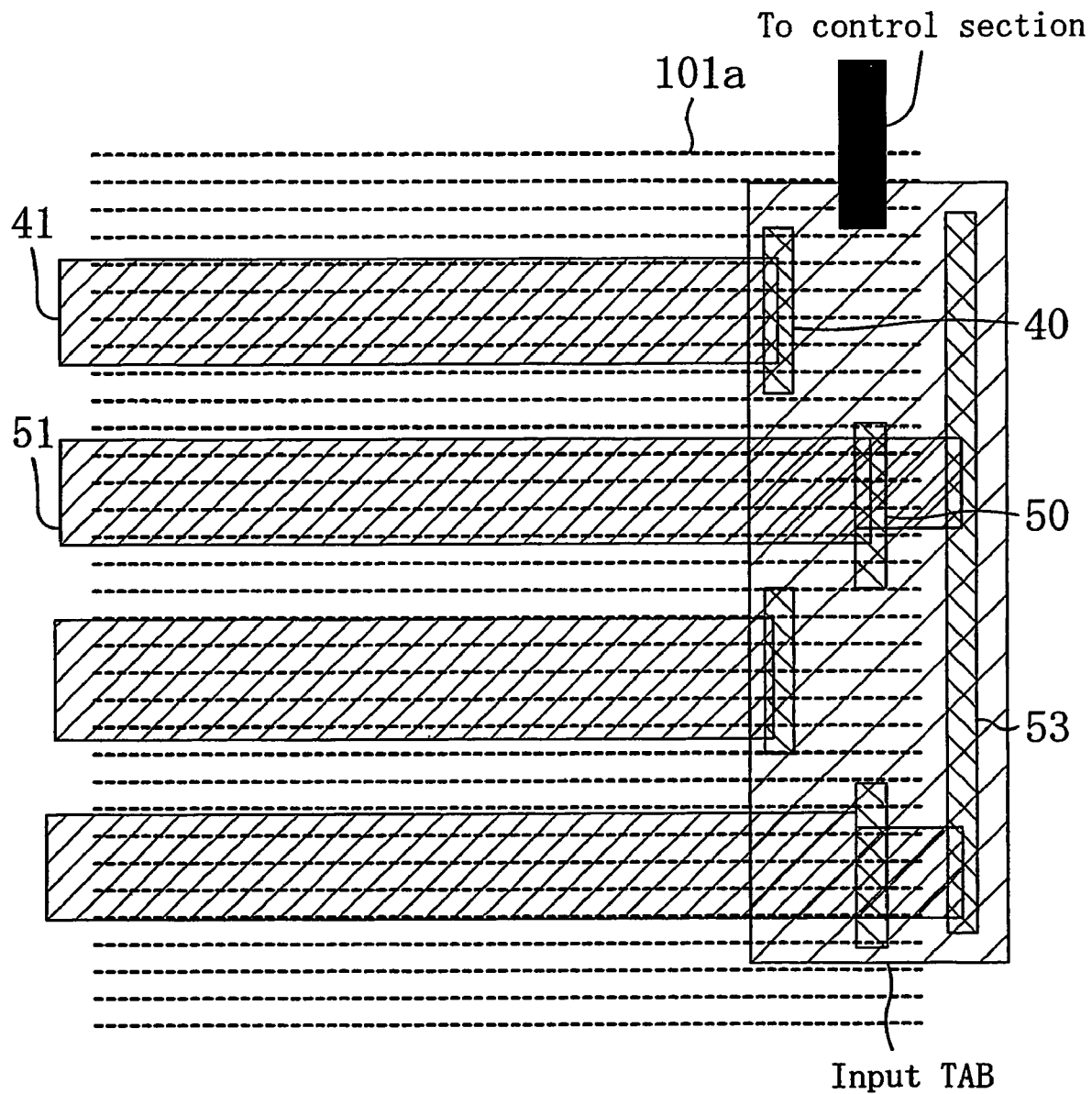
FIG. 33 is a plan view schematically illustrating a terminal section of the upper electrode lines 4 of Embodiment 7.

Since only the data lines 61 are formed in the lower electrode lines 5, it is only necessary to provide the data input terminals 60. On the other hand, the upper electrode lines 4 need to be provided with two different terminals for separately receiving two different signals, i.e., the scanning signal and the current input signal. FIG. 33 is a plan view schematically illustrating a terminal section of the upper electrode lines 4 of the present embodiment. A signal input TAB (Tape Automated Bonding) is bonded to the terminal section of the upper electrode lines 4. The input TAB includes the scanning signal input terminals 40, the current input terminals 50, a common line 53 connecting the current input terminals 50 together, a scanning signal input driver (not shown) and a current signal input driver (not shown). For example, the input TAB may be made of a polyimide film with the terminals 40 and 50 and the common line 53 being formed on one surface thereof.

In the present embodiment, the widths of the scanning line 41 and the current input line 51 are determined according to the widths of the scanning signal input terminal 40 and the current input terminal 50, respectively. Therefore, when the scanning signal input terminal 40 and the current input terminal 50 are successively provided on the upper electrode lines 4, the terminals 40 and 50 are very likely to be contacted and shorted with each other unless a proper alignment process is performed. Moreover, if the terminals 40 and 50 are shifted from their intended positions, even though the terminals 40 and 50 are not in contact with each other, the scanning line 41 and the current input line 51 may be connected to each other, in other words, the lines 41 and 51 may overlap with each other.

Since the scanning signal input terminals 40 and the current input terminals 50 are formed in advance on the input TAB, the scanning signal input terminals 40 and the current input terminals 50 are formed on the upper electrode lines 4 by bonding the input TAB on the upper electrode lines 4. Moreover, the linear conductors 101a to which the scanning signal input terminal 40 and the current input terminal 50 are connected form the scanning line 41 and the current input line 51, respectively. Therefore, it is possible to prevent the scanning line 41 and the current input line 51 from contacting each other without having to align the terminals 40 and 50 with each other, thus realizing a high production efficiency.

Figure 34:
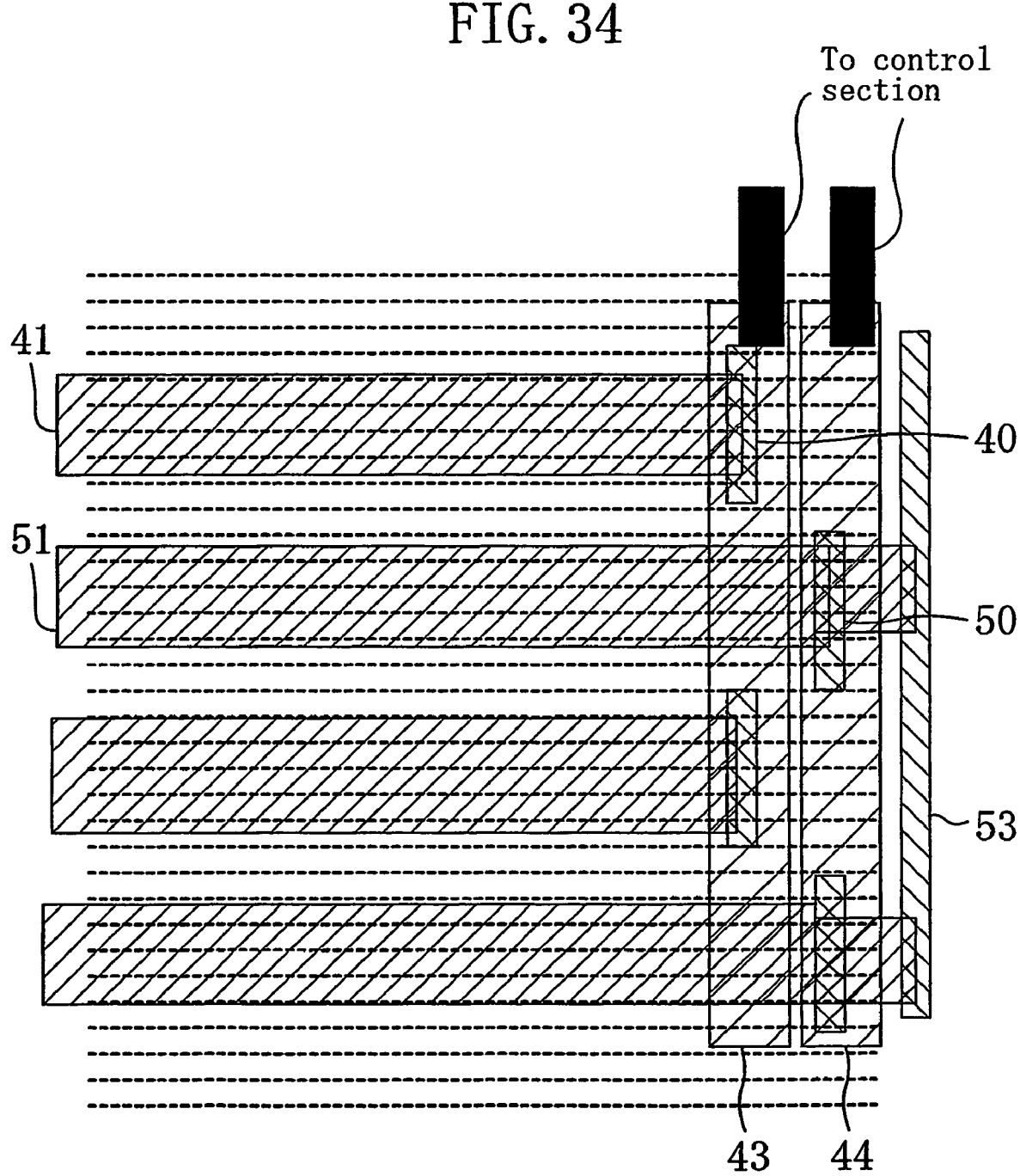
FIG. 34 is a plan view schematically illustrating another embodiment of the terminal section

The input TAB illustrated in FIG. 33 include both the scanning signal input terminal 40 and the current input terminal 50 formed thereon. Alternatively, the input TAB may be divided into a scanning signal input TAB 43 on which the scanning signal input terminal 40 is formed, and a current signal input TAB 44 on which the current input terminal 50 is formed, as illustrated in FIG. 34. Note however that in such a case, the TAB to be bonded later needs to be aligned with respect to the previously bonded TAB so that it does not contact the previously bonded TAB.

Note that instead of forming the scanning signal input terminals 40 and the current input terminals 50 on the input TAB, the terminals 40 and 50 may alternatively be formed directly on the upper electrode lines 4. In such a case, the input TAB having bumps thereon is attached to the upper electrode lines 4 via an anisotropic conductive film, and the bumps and the terminals 40 and 50 are electrically connected with each other.

The common line 53 is provided along the outer side of the terminal section, and is connected to the current input terminals 50. Thus, when driving the device, an equal potential of the current signal from the common line 53 is supplied to all of the current input lines 51.

The display device of the present embodiment is a color (multi-color) display device in which R, G and B subpixels are arranged in parallel arrays. Therefore, the scanning signal input terminal 40, the current input terminal 50 and the data input terminal 60 are attached to the upper electrode lines 4 and the lower electrode lines 5 according to the pitch of the R, G and B subpixels.

As illustrated in FIG. 23B and FIG. 23C, in the display device of the present embodiment, the control area 3 of the active device 1 changes by adjusting the amount of current to be input to a terminal. Therefore, it is possible to change the size of a pixel extending from the active device 1, and to change the amount of light emission according to the size of the pixel. According to the present embodiment, it is possible to produce an organic EL device substantially free of patterning and alignment processes.

Moreover, the display device is produced substantially free of a patterning process, and thus can be produced using a flexible substrate such as a plastic substrate. A significant problem in producing devices on a plastic substrate is the influence of a patterning process, in addition to the drying of a film. In a wet process, a plastic substrate is immersed in a solution (aqueous in many cases). In this process, absorption of water and expansion of the substrate are inevitable, and they lead to a decrease in the durability of the substrate. Moreover, expansion and/or contraction of the substrate occur through an exposure process or a wet process (development, etching, peeling, etc.), thereby reducing the patterning precision. Furthermore, peel-off, cracking, and the like, may occur when a number of films are layered together. In contrast the display device of the present embodiment can be formed only by applying films on a substrate, whereby the process is simple and is substantially free of any adverse influence of patterning processes. Thus, it is possible to improve the durability of the substrate. Therefore, it is possible to manufacture a light-weight display device at a low cost and with a desirable shock resistance.

While the present embodiment is directed to an organic EL device, the display device of the present invention may be any of various active driving display devices, which can be obtained by changing the display function layer 13 to various functional layers. For example, a liquid crystal layer may be used to provide a liquid crystal display device, an electrochromic layer to provide an electrochromic device, and an electrophoretic layer to provide an e-ink (electrophoretic) device. Thus, it is possible to produce various devices that can be driven by an active matrix.

Embodiment 8

Figure 35:
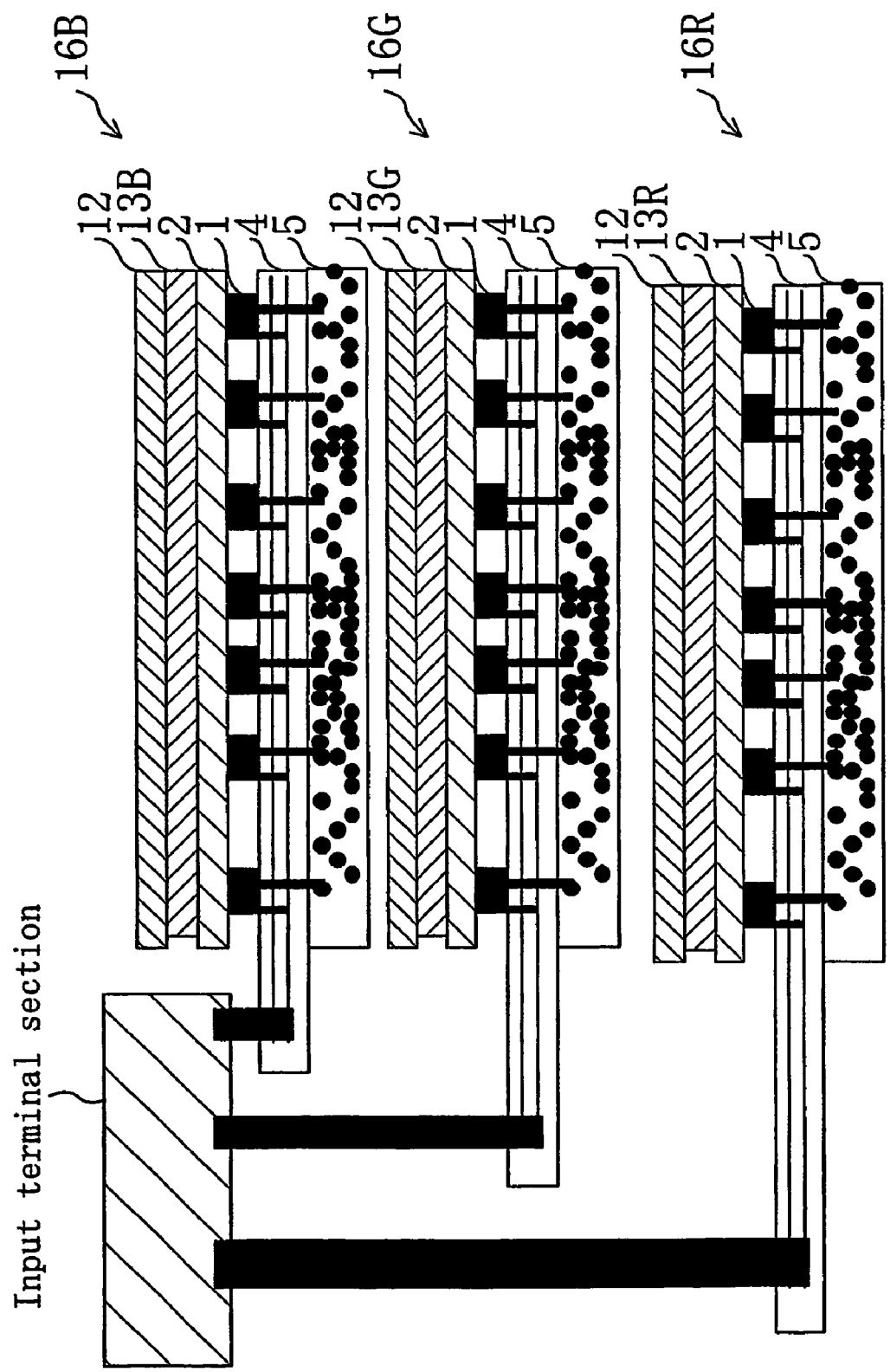
FIG. 35 is a cross-sectional view schematically illustrating a color display device of Embodiment 8.

While R, G and B subpixels are arranged in parallel arrays in the color (multi-color) display device of Embodiment 7, the R, G and B subpixels may alternatively be vertically stacked on one another. FIG. 35 is a cross-sectional view schematically illustrating a color (multi-color) display device of Embodiment 8. In the color display device of the present embodiment, the R, G and B subpixels are vertically stacked on one another. In FIG. 35, those components that are substantially the same in function as those of the display device of Embodiment 5 are denoted by the same reference numerals and will not be further described below.

The color display device of the present embodiment employs patterning-free electrode lines and pixels as in Embodiment 5 to 7, and thus can be produced through an application process and a printing process without performing a patterning process. Moreover, the electrode lines and the pixels (the conductive film 2) can be formed in a thin film that is nearly transparent. In a case where nanoparticles are used as the material of the conductive film 2, since the particle diameter is on the order of nanometers, visible light can be transmitted therethrough and quite a high level of transparency can be obtained. Although the active devices 1 are optically opaque or only slightly transparent, it gives little influence on the entire optical transmittance since the active devices 1 occupy only a small portion of the total area. Even if ten of the active devices 1 of Embodiment 6 or 7 are provided in each subpixel having a size of 100 μm by 300 μm, for example, the occupancy is 15%, and light is transmitted through 85% of the total area of the film. Thus, when the patterning-free electrode lines and pixels are layered with the active devices 1 and further with the counter electrode 12 and the display function layer 13 to form a single-layer device, the optical transmittance of the device as a whole will be quite high.

In the present embodiment, a display device 16R emitting R light, a display device 16G emitting G light and a display device 16B emitting B light are produced, and the three layers are vertically stacked on one another to obtain a color display device. With such a stacked type device, an image is displayed in color by changing the hue of each of the three, R, G and B, layers. According to the present embodiment, the definition can be tripled as compared with a case where R, G and B subpixels are arranged in parallel arrays as in Embodiment 7. Moreover, there is no need for a technique of painting a single plane separately in different colors of R, G and B, and the light emitting section can be produced by a simple application method, thus simplifying the process.

The color display device of the present embodiment is generally the same in structure as that of Embodiment 7, except that R, G and B single-color layers are provided separately instead of painting the same layer into the light emitting layers 13R, 13G and 13B as in Embodiment 7. Moreover, the present embodiment also differs from Embodiment 7 in that the number of active devices 1 that are arranged randomly in each subpixel is reduced with the size of the control area 3 being 60 μm in diameter, whereby one pixel is controlled by a smaller number of active devices 1 and thus the optical transmittance of the display device is increased.

Figure 36:
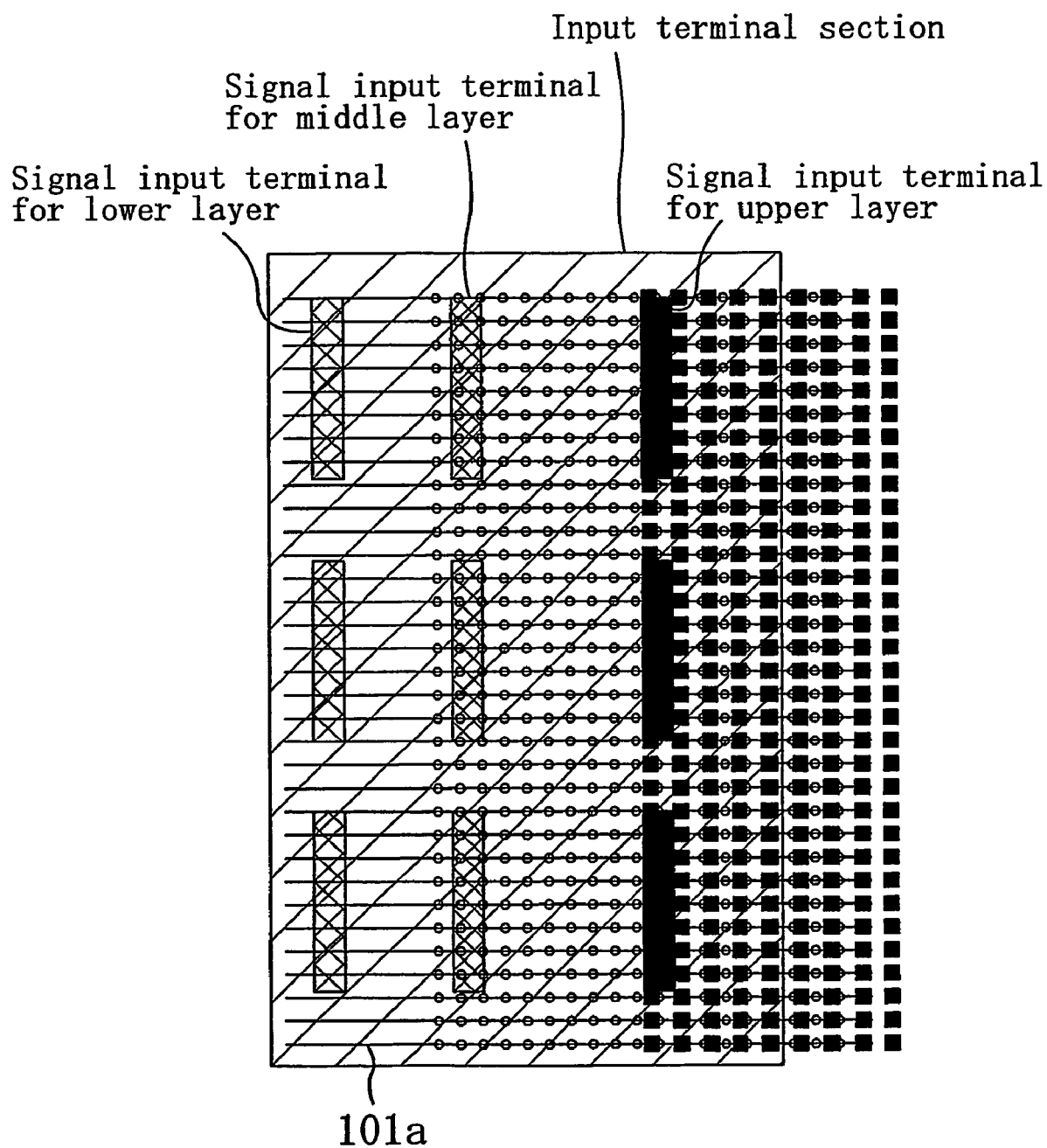
FIG. 36 is a plan view illustrating how the upper electrode lines 4 of each of display devices 16R, 16G and 16B are connected with input terminal sections according to Embodiment 8.

With the stacked type display device of the present embodiment, it is necessary to simultaneously control corresponding portions of the three layers. FIG. 36 is a plan view illustrating how the upper electrode lines 4 of each of the display devices 16R, 16G and 16B are connected with input terminal sections according to the present embodiment. As illustrated in FIG. 36, the line length of the upper layer of the three layers (the display device 16B emitting B light in the present embodiment) is shortest, and the line length of the lower layer (the display device 16R emitting R light in the present embodiment) is longest. Three input terminals for R, G and B are arranged in an input terminal section while being shifted from one another as viewed from above. The three input terminals for R, G and B are connected to the upper electrode lines 4 for the display devices 16R, 16G and 16B, respectively. Thus, signals can be input from the input terminal section to the upper electrode lines 4 for R, G and B via the three input terminals for R, G and B, respectively. In the present embodiment, three signal input terminals for the upper, middle and lower layers, respectively, are arranged in the input terminal section in the direction in which the linear conductors 101a of the lines 4 for R, G and B extend. Similarly, three signal input terminals for the upper, middle and lower layers, respectively, are provided for the lower electrode lines 5 of the display devices 16R, 16G and 16B, respectively. Thus, subpixels of the R, G and B display devices 16R, 16G and 16B are superposed on one another. Therefore, as long as the signal input terminals for the upper, middle and lower layers are aligned with one another in the input terminal section, the subpixels of the display devices 16R, 16G and 16B are aligned with one another as viewed from above, thereby forming a color display device with no color shifting, or the like.

The organic EL display device of the three-layer stacked type of the present embodiment has a high definition. Moreover, the three layers (the display devices 16R, 16G and 16B) can be produced without performing any alignment process. Furthermore, it is possible to easily produce a color display device simply by stacking the three layers while connecting the layers with input terminals, i.e., without aligning the three layers with one another or performing a patterning process. While the display devices 16R, 16G and 16B have different operating lifetimes, when the lifetime of one of the display devices 16R, 16G and 16B expires, the color display device can be reused only by replacing the display device whose lifetime has expired, thus providing an economical advantage.

Embodiment 9

Figure 37A:
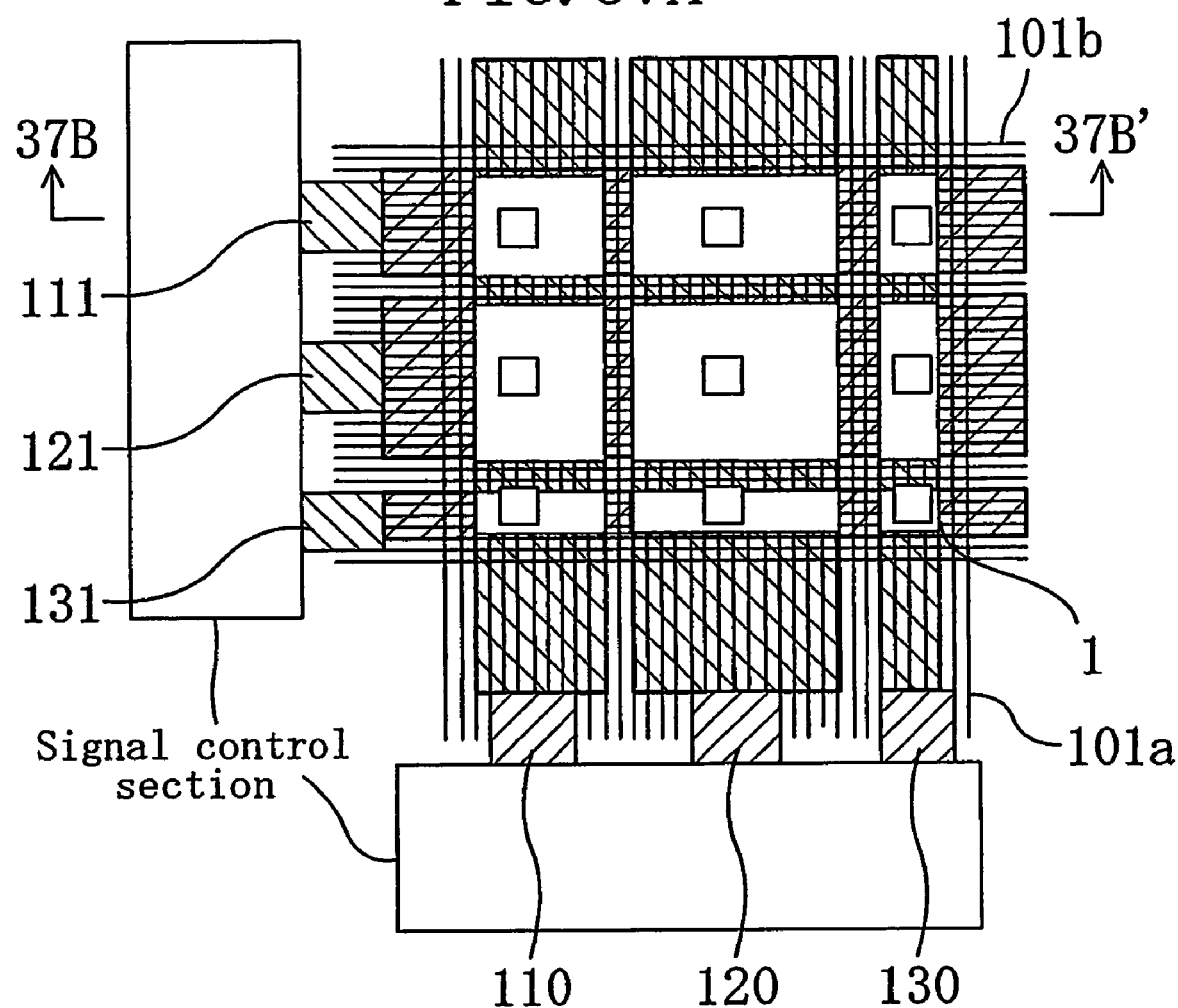
FIG. 37A is a plan view illustrating a display module in which the display device of Embodiment 5 is provided with signal control sections.
Figure 37B:
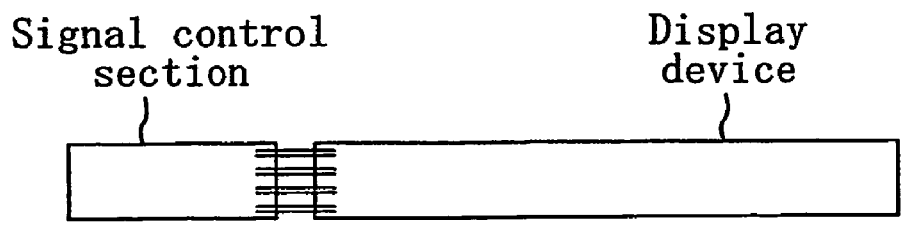
FIG. 37B is a simplified cross-sectional view taken along line 37B–37B' of FIG. 37A.

In any of the display devices of Embodiment 5 to 8, a signal control section (driver circuit) for driving and controlling the display device may be formed along one edge of each of the upper electrode lines 4 and the lower electrode lines 5. FIG. 37A is a plan view illustrating a display module in which the display device of Embodiment 5 is provided with signal control sections, and FIG. 37B is a simplified cross-sectional view taken along line 37B–37B' of FIG. 37A. In the present embodiment, a signal control section is connected along one edge of each of the upper electrode lines 4 and the lower electrode lines 5 via the flexible input terminals 110, 120, 130, 111, 121 and 131. Note that a driver circuit may be formed on the flexible input terminals.

Embodiment 10

The use of patterning-free lines and pixels is advantageous in that the size of the lines and pixels can be controlled without performing a patterning process. However, when an organic material is used as a primary material of a conductive material, it may be difficult to increase the conductivity, and the area that can be made conductive may be very small. Particularly with a large-size display device, it is sometimes difficult to maintain a high conductivity from one end to the other of the display device. In such a case, if input terminals are formed only at one end of the lines, as in Embodiment 9, electrical signals may not reach the other end of the lines.

Figure 38A:
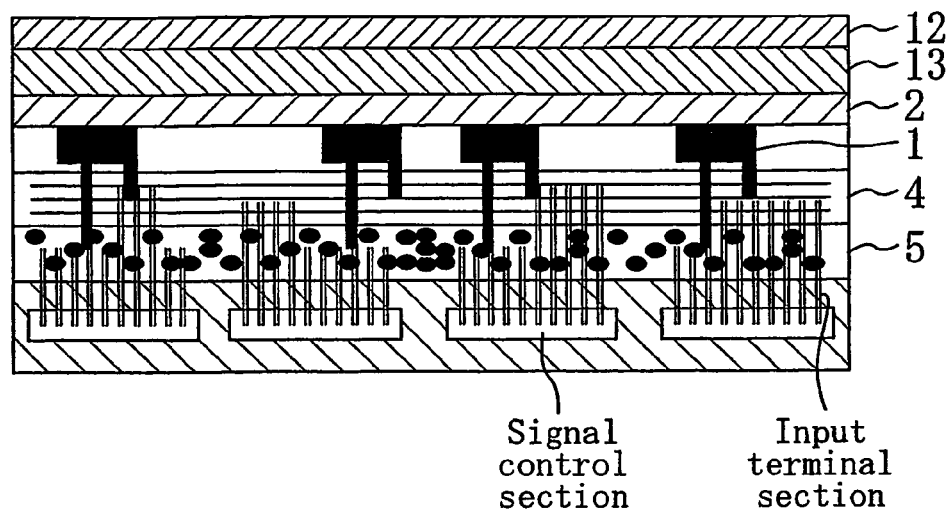
FIG. 38A is a cross-sectional view schematically illustrating a display device of Embodiment 10.
Figure 38B:
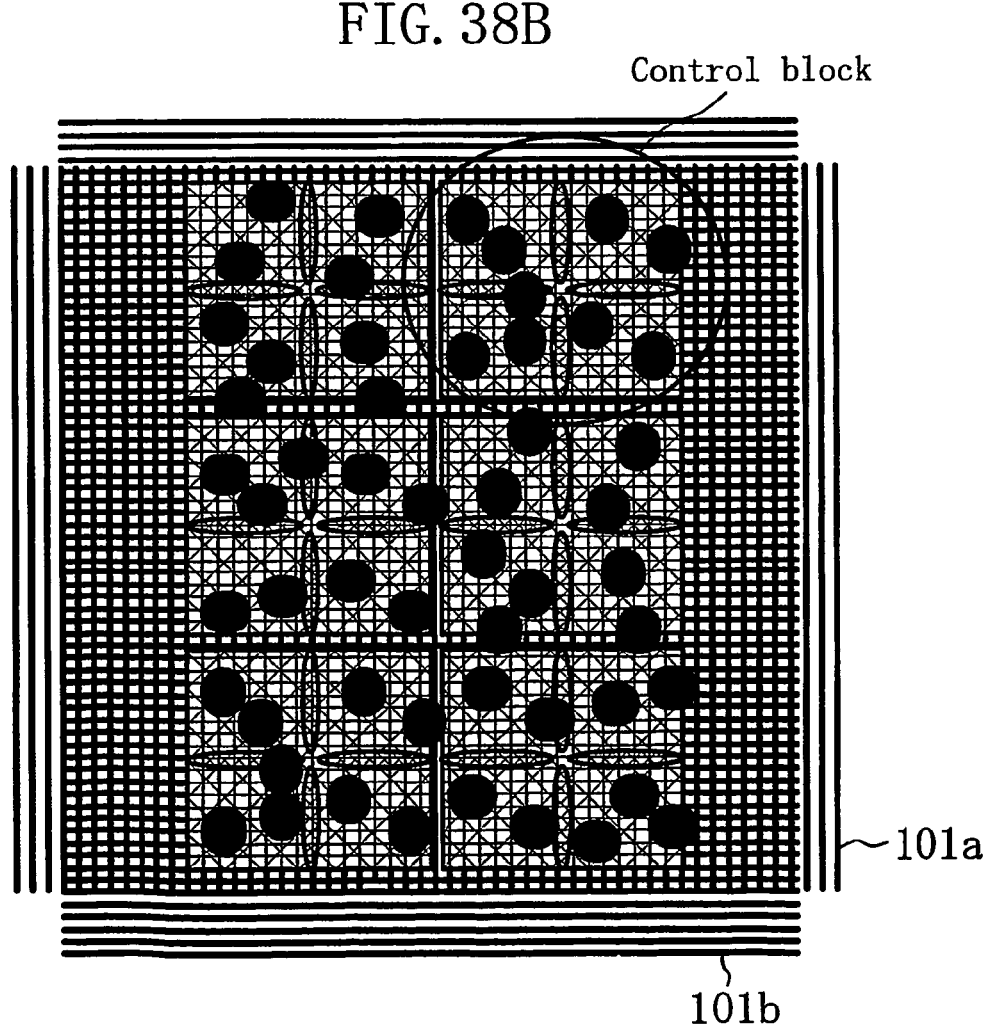
FIG. 38B is a plan view thereof

In the present embodiment, input terminals are formed in a lower portion of the display device. FIG. 38A is a cross-sectional view schematically illustrating the display device of the present embodiment, and FIG. 38B is a plan view thereof. As illustrated in FIG. 38A, the display device of the present embodiment includes control sections and input terminal sections connected to the control sections in a lower portion of the display device. Each input terminal section is connected to patterning-free lines, thus defining a line width. Electrical signals controlled by the signal control section are supplied to the upper electrode lines 4 and the lower electrode lines 5 via the input terminal section. Thus, the active device 1 is controlled. The interval with which the input terminal sections are arranged is determined according to the area across which an electrical signal input from one input terminal section expands, i.e., the size of the conductive area of the patterning-free lines. A plurality of control blocks, each of which is controlled by an electrical signal from one input terminal section, are formed on the display device, and an image display as a whole is produced by the collection of blocks. With such a blocked configuration, it is possible to drive a large-size display device even if the conductivity of the conductive material is not very high.

Embodiment 11

The display device and the display module of the present invention can be produced substantially free of a patterning process. The display device can be easily produced with a single-unit apparatus including systems capable of performing different types of printing processes. The display device of the present invention can be produced by using, for example, a printing machine capable of performing different printing processes, including patterning of nanoparticles by electronic printing, and film formation by ink jet or plate printing. The patterning-free lines can be formed by a laser printing technique, and the conductive film 2 can be formed by an application method. Since the active devices 1 may be arranged randomly, they can be formed by simple transfer pressing, or the like. Furthermore, the display device itself can be produced by using techniques that are generally available. For example, an organic EL device can be produced by forming a light emitting layer by an ink jet method.

Thus, the component films can be produced by printing processes. Therefore, if a printing machine including these printing functions is provided in company offices or households, the display device and the display module of the present invention can always be produced all through printing processes. Device using organic compounds as primary materials have limited operating lifetimes and age quite quickly as compared with those using inorganic materials. In view of this, it is worthwhile creating such a system that allows the user to easily produce a display device at any time. Then, the problem of the short operating lifetime is overcome, and it is possible to provide a new display device at any time.

The present invention provides a wiring structure capable of accommodating various resolutions and various gray scales. Moreover, the present invention provides a patterning-free active device substrate. Furthermore, the present invention provides an active device substrate capable of accommodating various resolutions and various gray scales.

INDUSTRIAL APPLICABILITY

The present invention can be used for a device having a wiring structure. For example, the present invention can be used for a passive or active functional device. Specific examples include organic EL devices and liquid crystal display devices.

While the present invention has been described in preferred embodiments, it will be apparent to those skilled in the art that the disclosed invention may be modified in numerous ways and may assume many embodiments other than those specifically set out and described above. Accordingly, it is intended by the appended claims to cover all modifications of the invention that fall within the true spirit and scope of the invention.

The invention claimed is:

1. An active device substrate, comprising:
   active devices formed on a substrate;
   a conductive film formed over the active devices,
   wherein the conductive film is electrically connected to the active devices and transmits an electrical signal output from each active device within a finite range,
   wherein the conductive film is continuous so as to be provided over a plurality of the active devices;
   wherein the conductive film has a two-layer structure, including an upper layer and a lower layer; and
   wherein the lower layer has a function of transmitting an electrical signal from each active device to the upper layer, and the upper layer has a function of expanding the electrical signal.

2. An active device substrate, comprising:
   active devices formed on a substrate; and
   a conductive film formed over the active devices, wherein the conductive film is electrically connected to the active devices, and wherein the conductive film is continuous so as to be provided over a plurality of the active devices,
   wherein the conductive film has a function of transmitting an electrical signal output from each active device across a predetermined area, and a proportion of an area across which the electrical signal is transmitted with respect to a total area of an upper surface of the conductive film varies depending on an arrangement of the active devices.

3. The active device substrate of claim 1, wherein the conductive film comprises at least one material selected from the group consisting of a metal nanoparticle, a metal microparticle, a metal-coated nanoparticle, a conductive polymer, a carbon nanotube and a deoxyribonucleic acid.

4. The active device substrate of claim 1, wherein:
   the active devices are three-terminal devices connected to upper electrode lines and lower electrode lines; and
   the upper electrode lines and the lower electrode lines each include: a plurality of linear conductors extending generally parallel to one another; a first input terminal for inputting an electrical signal to a first group of linear conductors selected from among the plurality of linear conductors; and a second input terminal for inputting an electrical signal to a second group of linear conductors, different from the first group of linear conductors, selected from among the plurality of linear conductors, the second input terminal being adjacent to the first input terminal, wherein a plurality of the linear conductors are present between the first group of linear conductors and the second group of linear conductors, and wherein the upper electrode lines and the lower electrode lines are arranged so that the plurality of linear conductors of the upper electrode lines cross the plurality of linear conductors of the lower electrode lines.

5. The active device substrate of claim 4, wherein the active devices are arranged randomly on the substrate.

6. The active device substrate of claim 1, wherein the active devices are each a system active device having a switching function and at least one other function.

7. The active device substrate of claim 4, wherein:
   the active devices each include an elliptical upper electrode terminal connected to the upper electrode lines, an elliptical lower electrode terminal connected to the lower electrode lines, and a main body connected to the upper electrode terminal and the lower electrode terminal; and
   $d1>d2$, $d3>d4$, $d3>>P1$ and $d4<P2$, where P1 is a pitch of linear conductors of the upper electrode lines, P2 is a pitch of linear conductors of the lower electrode lines, d1 is a length of a long side of the upper electrode terminal, d2 is a length of a short side thereof, d3 is a length of a long side of the lower electrode terminal, and d4 is a length of a short side thereof.

8. A method for manufacturing the active device substrate of claim 4, wherein the active devices each include an elliptical upper electrode terminal connected to the upper electrode lines, an elliptical lower electrode terminal connected to the lower electrode lines, and a main body connected to the upper electrode terminal and the lower electrode terminal, the method comprising the steps of:
   forming the lower electrode lines;
   forming the lower electrode terminal on the lower electrode lines;
   forming the upper electrode lines after forming the lower electrode terminal; and
   forming the upper electrode terminal on the upper electrode lines.

9. An active functional device, comprising:
   the active device substrate of claim 1;
   a counter electrode opposing the active device substrate; and
   a functional layer provided between the active device substrate and the counter electrode.

10. The active functional device of claim 9, wherein the functional layer is a display function layer.

11. The active functional device of claim 10, wherein the display function layer is a light modulating layer or a light emitting layer.

12. The active functional device of claim 11, wherein the display function layer is one of a liquid crystal layer, an inorganic or organic electroluminescence layer, a light emitting gas layer, an electrophoretic layer and an electrochromic layer.

13. A multi-color display apparatus, comprising at least two active functional devices of claim 9 stacked on one another, wherein the at least two active functional devices display hues that are different from one another.

14. The multi-color display apparatus of claim 13, wherein input terminals for inputting electrical signals respectively to the at least two active functional devices are shifted from one another as viewed from above.

15. A display module, comprising:
    the active functional device of claim 9;
    a control section for driving and controlling the active functional device; and
    an input terminal connecting the active functional device and the control section with each other,
    wherein the control section and the input terminal are formed along one edge of the active functional device.

16. A display module, comprising:
    the active functional device of claim 9;
    a control section for driving and controlling the active functional device; and
    an input terminal connecting the active functional device and the control section with each other,
    wherein the control section and the input terminal are formed under the active functional device.

17. The active functional device of claim 9, which is formed by a plurality of printing systems integrated into a single unit.

18. The display module of claim 15, which is formed by a plurality of printing systems integrated into a single unit.

19. An active functional device, comprising:
   the active device substrate of claim 2;
   a counter electrode opposing the active device substrate; and
   a functional layer provided between the active device substrate and the counter electrode.

20. A multi-color display apparatus, comprising at least two active functional devices of claim 19 stacked on one another, wherein the at least two active functional devices display hues that are different from one another.

21. A display module, comprising:
   the active functional device of claim 19;
   a control section for driving and controlling the active functional device; and
   an input terminal connecting the active functional device and the control section with each other,
   wherein the control section and the input terminal are formed along one edge of the active functional device.

* * * * *